United States Patent [19]
Abraham

[11] Patent Number: 6,014,386
[45] Date of Patent: Jan. 11, 2000

[54] SYSTEM AND METHOD FOR HIGH SPEED COMMUNICATION OF VIDEO, VOICE AND ERROR-FREE DATA OVER IN-WALL WIRING

[75] Inventor: Charles Abraham, Wayne, Pa.

[73] Assignee: Videocom, Inc., Hunt Valley, Md.

[21] Appl. No.: 08/680,329

[22] Filed: Jul. 12, 1996

Related U.S. Application Data

[63] Continuation-in-part of application No. 08/180,421, Jan. 11, 1994, abandoned, which is a continuation-in-part of application No. 07/884,123, May 18, 1992, Pat. No. 5,351,272, and application No. 07/822,326, Jan. 17, 1992, abandoned, which is a continuation-in-part of application No. 07/515,578, Apr. 26, 1990, abandoned, which is a continuation-in-part of application No. 07/429,208, Oct. 30, 1989, abandoned.

[51] Int. Cl.[7] .................................................. H04J 1/02

[52] U.S. Cl. .......................... 370/485; 370/401; 370/407; 375/212; 340/310.01

[58] Field of Search ...................................... 370/485, 407, 370/295, 281, 260, 401, 402; 375/212, 222, 228, 260; 340/310.01, 310.03, 310.05, 310.06, 310.07, 310.8

[56] References Cited

U.S. PATENT DOCUMENTS

| | | | |
|---|---|---|---|
| 4,016,429 | 4/1977 | Vercellotti et al. | 340/310.06 |
| 4,475,193 | 10/1984 | Brown | 370/295 |
| 5,351,272 | 9/1994 | Abraham | 375/260 |
| 5,592,482 | 1/1997 | Abraham | 375/260 |
| 5,625,863 | 4/1997 | Abraham | 340/310.01 |
| 5,664,002 | 9/1997 | Skinner, Sr. | 340/310.01 |
| 5,684,826 | 11/1997 | Ratner | 340/310.01 |

*Primary Examiner*—Douglas W. Olms
*Assistant Examiner*—Shick Hom
*Attorney, Agent, or Firm*—Panitch Schwarze Jacobs & Nadel, P.C.

[57] ABSTRACT

A communication network and method, including an information signal line which carries a plurality of selectable information signals. Electrical lines run throughout a building, with electrical outlets connected to the electrical line. An electrical line distribution panel connects the information signal line and the electrical line for distributing the selectable information signals over the electrical line to the location of a given electrical outlet. Dielectric-core couplers which are impedance-matched with the electrical line are connected to the electrical outlets. At least one communication station is connected to a dielectric-core coupler for receiving the selectable information signals.

14 Claims, 44 Drawing Sheets

POWER LINE SPREAD SPECTRUM TRANSMITTER

POWER LINE SPREAD SPECTRUM RECEIVER

SYSTEM AND METHOD FOR HIGH SPEED COMMUNICATION OF VIDEO, VOICE AND ERROR-FREE DATA OVER IN-WALL WIRING

RELATED APPLICATIONS

This application is a continuation-in-part of U.S. Ser. No. 08/180,421, filed Jan. 11, 1994, abandoned, which is a continuation-in-part of U.S. Ser. No. 07/884,123, filed May 18, 1992 which issued as U.S. Pat. No. 5,351,272, which is a continuation-in-part of U.S. Ser. No. 07/822,326, filed Jan. 17, 1992, now abandoned, which is a continuation-in-part of U.S. Ser. No. 07/515,578, filed Apr. 26, 1990, now abandoned, which is a continuation-in-part of U.S. Ser. No. 07/429,208, filed Oct. 30, 1989, now abandoned.

FIELD OF THE INVENTION

The present invention relates to a communication network and method used to send and receive video, voice and high-speed data over conventional, existing AC wiring, telephone wiring, or coaxial wiring to communicate with external service systems, such as video or cable television systems, telephone systems and data communication systems.

BACKGROUND OF THE INVENTION

To access current communication services, for video, voice and/or data (VVD communication services), such as cable television and telephone services, it is often necessary to install separate wiring for each type of service. This wiring is in addition to the AC wiring used to distribute electrical power throughout a customer's premises. Conventional wiring used in buildings, such as residential homes, varies depending upon the application for which it is being used. Typically, cable television and video transmissions use coaxial cable wiring, telephones use bundled telephone wire and PBX telephone systems use twisted pair wiring. AC power is usually distributed over copper electrical wiring. Aluminum wiring has also been used for AC power. Computer networks typically use either, or both, coaxial cable or twisted pair wiring. Some homes use antenna wire (300 ohm) for receiving television/and or radio signals. Conventional wiring can also include any other type of wiring that is used for carrying electricity for either power or electrical signal communication.

Houses and buildings (customer premises), which were not originally wired with coaxial cable for video transmission and cable television, require the addition of coaxial cabling to every room where a television set is desired. In running new coaxial cable to each of these rooms, it is often necessary to drape the cable over the outside walls of the house and then drill holes into each room to run the cable into the room. Inside the room, the cable receptacle is often placed at the entry point into the room. This avoids the cost and effort involved in pulling cable through walls. If an outlet is located away form the entry point, the cable is run along the baseboard to a desired location for the receptacle or outlet. Cable run in this manner is often unsightly and can provide a hazard if it comes loose from the baseboard.

A similar problem exists with respect to telephones when extra telephone outlets or additional lines are desired at a customer premises. With the advent of facsimile machines and computer modems, it is not uncommon to have several telephone lines running into a building, even a home. Particularly in a home situation, the number of telephone lines may exceed the number of paired wire present in the standard bundled telephone wire run to each room. Although some home telephone wiring is bundled in three pair (six wires), allowing up to three separate lines, it is more common to use wiring bundles of 2 pair wire, allowing only two separate lines at the end of a given cable run (i.e., a room). A separates lines for a telephone, a facsimile machine and a computer modem requires more than the number of possible lines allowed if a home is wired with two pair telephone line. Additional telephone lines may be necessary for use in a home office or business.

If a local area network (LAN) is desired, it is necessary to install either or both coaxial wiring and twisted pair wiring to connect the nodes of the network to the network server and/or each other node. Adding network wiring is oftentimes more expensive than adding cable television or telephone wiring. Network wiring must be installed carefully to ensure that there are no cuts or kinks in the wire which could impede data flow or integrity of the data being transmitted.

Although fiber optic cable could also be an option for VVD wiring, it is very expensive for inter home or building use. At the present time, fiber optic cabling is more commonly used in high volume VVD applications, rather than intra building applications.

In Applicant's co-pending applications, U.S. Ser. Nos. 07/822,326, filed Jan. 17, 1992 and 07/884,123, filed May 18, 1992, copies of which are attached hereto as Appendices A and B respectively and made a part hereof, there are described systems and methods for transmitting and receiving information over electrical power lines using a dielectric core coupler, such as an air-core coupler. Information signals are transmitted over the electrical power lines at the same time electricity for AC power is transmitted. The information and the electrical power are both accessible at the same time and at the same location at a customer's premises.

Systems other than those described in Applicant's copending applications use AC power lines for transmitting information signals. One of the limitations of these systems is that they do not allow high-speed data/signal communication. The approximate data flow limit of 19.2 Kbaud of line-carrier modems, for instance, would be wholly inadequate for the transmission speeds of up to 10 Mbaud, achieved by a LAN, such as an Ethernet system. The transmission of video signals typically requires transmission rates on the order of 6 megabits per second (Mbps). Therefore video transmission can not be achieved in systems which do not allow high speed data transmission, such as systems using line-carrier modems.

Existing technologies for VVD communication include:

Cable Network Systems which deliver services over separately owned cable installations to set top converters and/or cable ready television set;

Asymmetrical Digital Subscriber Line (ADSL) technology which delivers full duplexing data, video and voice at 1.544–6 Mbps over twisted pair wire;

Broadband integrated Services Digital Network (B ISDN) Synchronous Optical Network (SONET) and Asynchronous Transfer Mode (ATM) Access technologies which will initially deliver interactive video and data at a 6 Mbps data rate; and Direct Broadcast Satellite, which requires a satellite dish at each location and then distributes television channels from a tunable receiver over coaxial line to a TV set (one receiver per television set). This technology is not data or voice oriented.

SUMMARY OF THE INVENTION

The present invention comprises a communication network, including an information signal line which carries a plurality of selectable information signals. Electrical lines are run throughout a building, with electrical outlets connected to the electrical line. An electrical line distribution panel connects the information signal line and the electrical line for distributing the selectable information signals over the electrical line to the location of a given electrical outlet. Dielectric-core couplers which are impedance-matched with the electrical line are connected to the electrical outlets. Finally, at least one communication station is connected to a dielectric-core coupler for receiving the selectable information signals.

In a preferred embodiment, the information signal line is a video transmission line, such as a cable television line. These lines are typically either fiber optic or coaxial cable which is tapped into at each customer premises for receiving video service. For a cable television system embodiment, the communication station includes a cable television tuner for selecting a cable television station. The distribution panel of a cable television embodiment includes a tuner capable of tuning a cable television signal from the information signal line in response to a signal from the first station.

In another embodiment of the present invention, the information signal line includes a telephone line which is tapped into at each customer premises to provide telephone service. In this embodiment, the first station is comprised of a telephone device, such as a telephone, facsimile machine, or computer. In this embodiment, the distribution panel includes a tuner for selecting the phone line for which the voice or data information will be transmitted over.

In still another embodiment, telephone service is provided directly to the electrical wiring of a customer premises without a tuner, allowing selection and "tuning" of a telephone line at the telephone location in the customer premises.

BRIEF DESCRIPTION OF THE FIGURES

The invention will now be described by way of non-limiting example, with reference to the attached drawings in which.

DETAILED DESCRIPTION

In order to fully understand the application of the invention disclosed herewith, it is necessary to understand power lines and coupling technology. Power line coupling technology has been the subject of U.S. Pat. No. 5,351,272 issued Sep. 27, 1994, and European Patent No. EP90-907-855.2. The following extended explanation reviews power line coupling technology as described and as necessary to practice the video distribution system disclosed herewith.

BACKGROUND OF POWER LINE COUPLER TECHNOLOGY

"Power-line carriers" are well known in the field of power system communications. The principal elements of such power-line carriers are transmitting and receiving terminals, which include one or more line traps, one or more coupling capacitors, as well as tuning and coupling equipment. Detailed information regarding the description and typical composition of conventional power line carriers may be found in Fundamentals Handbook of Electrical and Computer Engineering, Volume II: Communication, Control, Devices, and Systems, John Wiley & Sons, 1983, pp 617–627, the contents of which are incorporated herein by reference.

A significant problem associated with prior art power-line carriers is their requirement for one or more line traps, one or more capacitors, one or more coupling transformers or one or more carrier frequency hybrid circuits and frequency connection cables. The new power-line carrier system presents a solution to the fundamental problem of matching the electrical line characteristic impedance with the line coupler. The novel signal coupler design is easily adaptable for operation on distribution and low voltage lines.

All traditional couplers incorporate a ferrite or iron core transformer which causes signal distortion due to the non-linear phase characteristic of the transfer function between the transmit coupler and the receive coupler. The distortion is created by the presence of magnetic core material which exhibits hysteresis. For distribution power-line carriers, the distortion is particularly severe because the signal must propagate through three such non-linear devices, the distribution transformer and two power-line couplers, that use ferrite core transformers. The distortion leads to envelope delay distortion which limits communication speeds.

Figure 13:
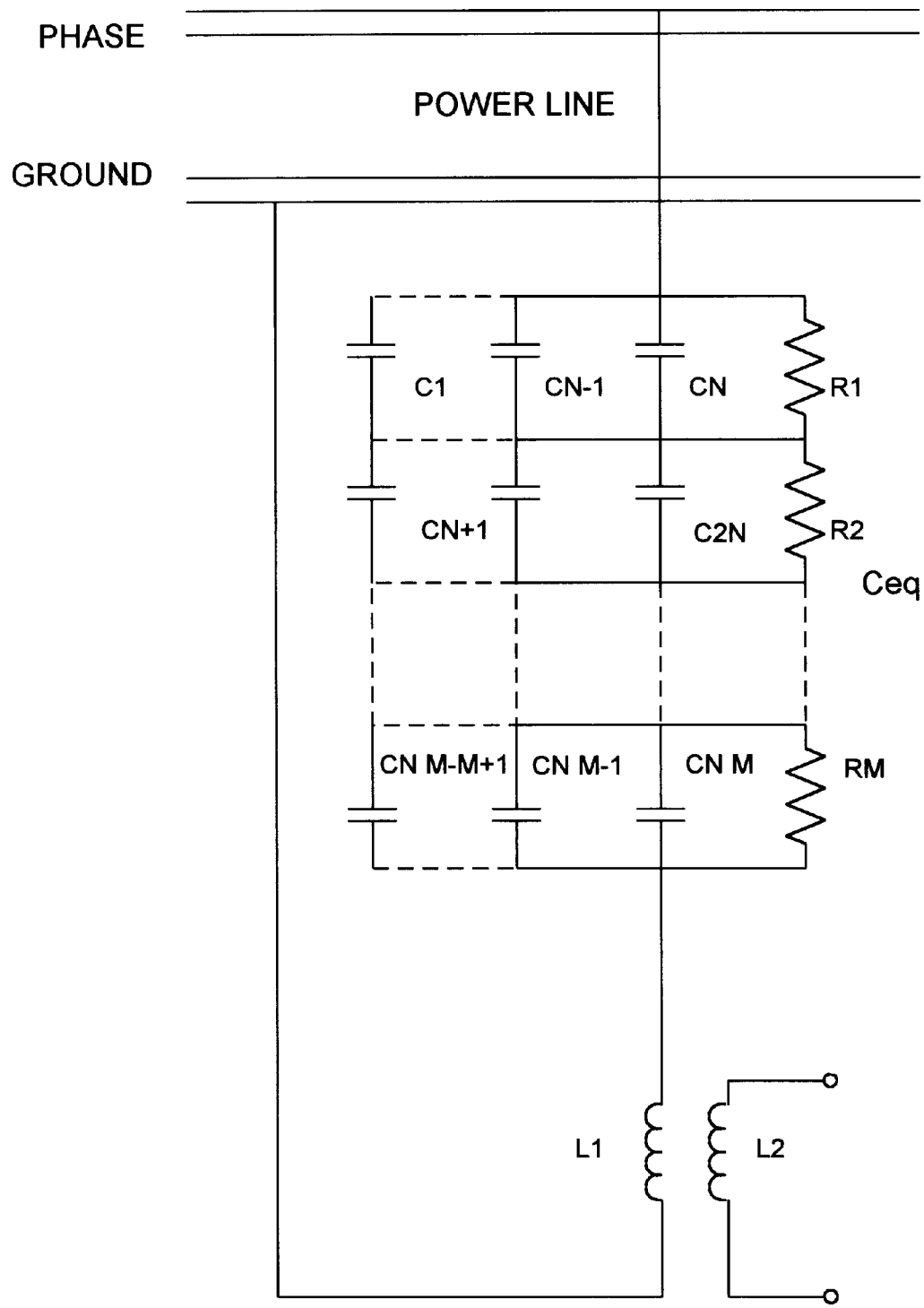
FIG. 13 schematically represents the general circuit diagram of the phase shift linear coupler of the present invention.

A line with characteristic impedance Zo is ideally matched by terminations equal to Zo at both ends. Since Zo is primarily resistive at the frequencies of interest, the input impedance of the couplers should also be primarily resistive and equal to Zo at the carrier frequencies. A general configuration to achieve this is shown in FIG. 13. It uses a serially connected equivalent capacitor, Ceq. on the primary off a transformer. The design is based on two principles. First, the resonance between the coupling capacitor, Ceq and the primary winding inductance, L1, provides a low resistive impedance at the desired transmit carrier frequency. Second, Ceq has a large enough impedance at 60 Hz to block the line frequency. Note that this approach is not new, however, previous efforts at achieving satisfactory impedance matching encountered problems discussed below.

Figure 10:
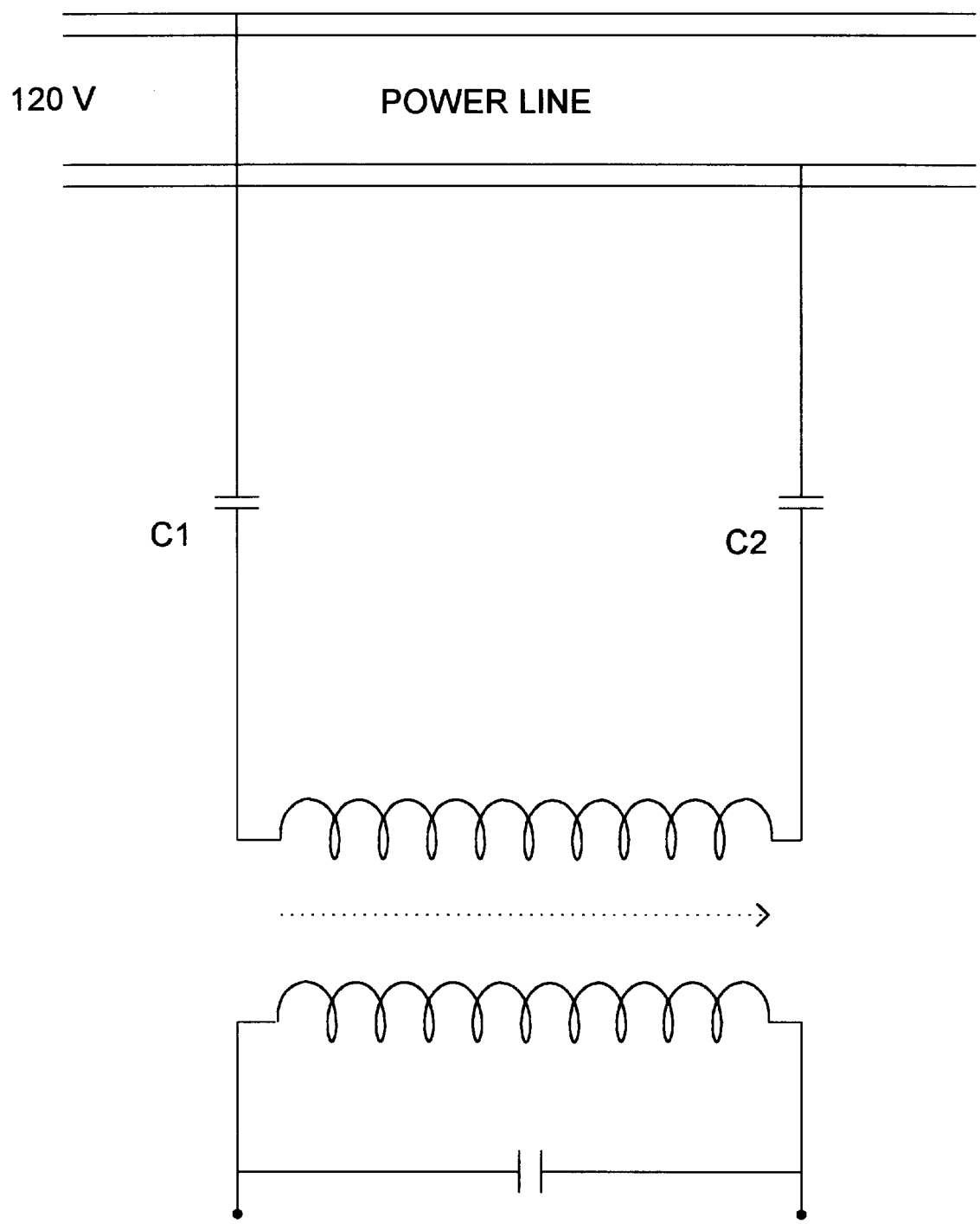
FIGS. 10 and 11 schematically represent traditional duplexing couplers on both low and high voltage power lines.
Figure 11:
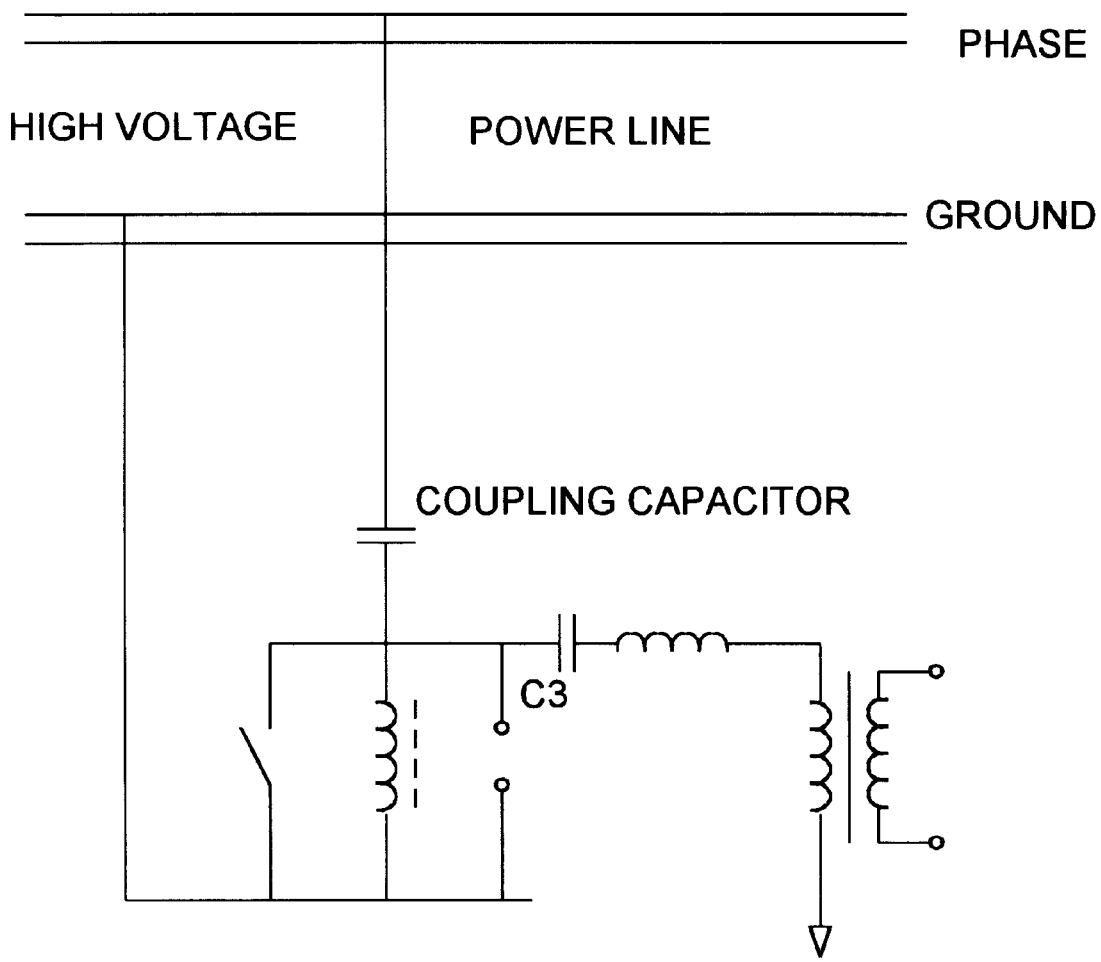

The major shortcoming of previous designs resulted from the use of ferrite or iron core transformers in the signal couplers. The inductance, L1, is altered to some unknown valve due to the non-linearity of the core. This results in a mistuning of the desired carrier frequency. Also, the impedance of the primary winding at the desired carrier frequency is no longer purely resistive. This may lead to a mismatch with respect to the line characteristic impedance. In recognition of this fact, other designs (FIGS. 10, 11) attempt to merely couple the signal onto the power line with a low transceiver input impedance by using a large coupling capacitor (approx. 0.5 μF). This results in a significant coupling loss of up to 20 dB at carrier frequency.

Figure 30:
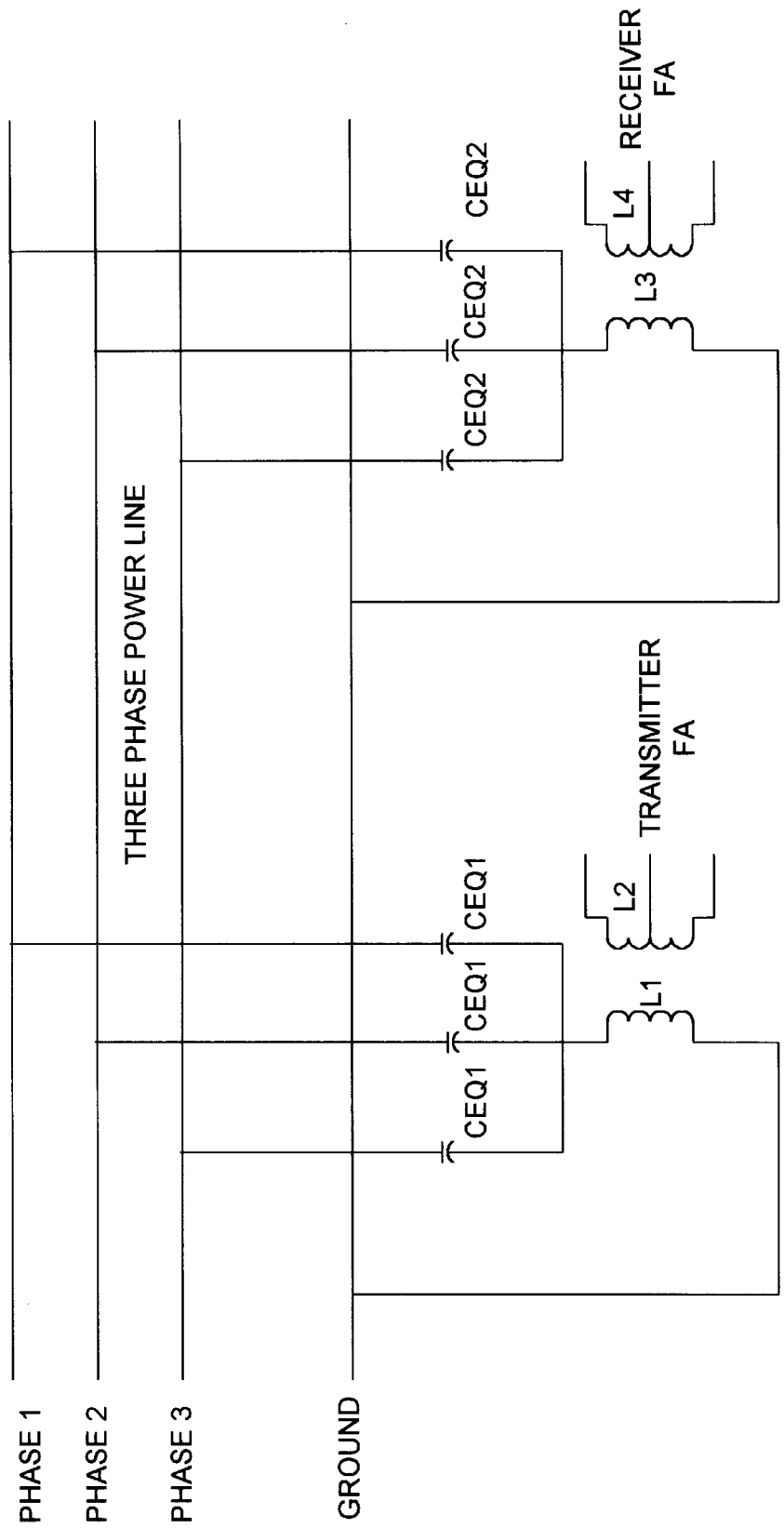
FIG. 30 is a schematic representation of a three phase coupling to the power line, three phases to ground.
Figure 37:
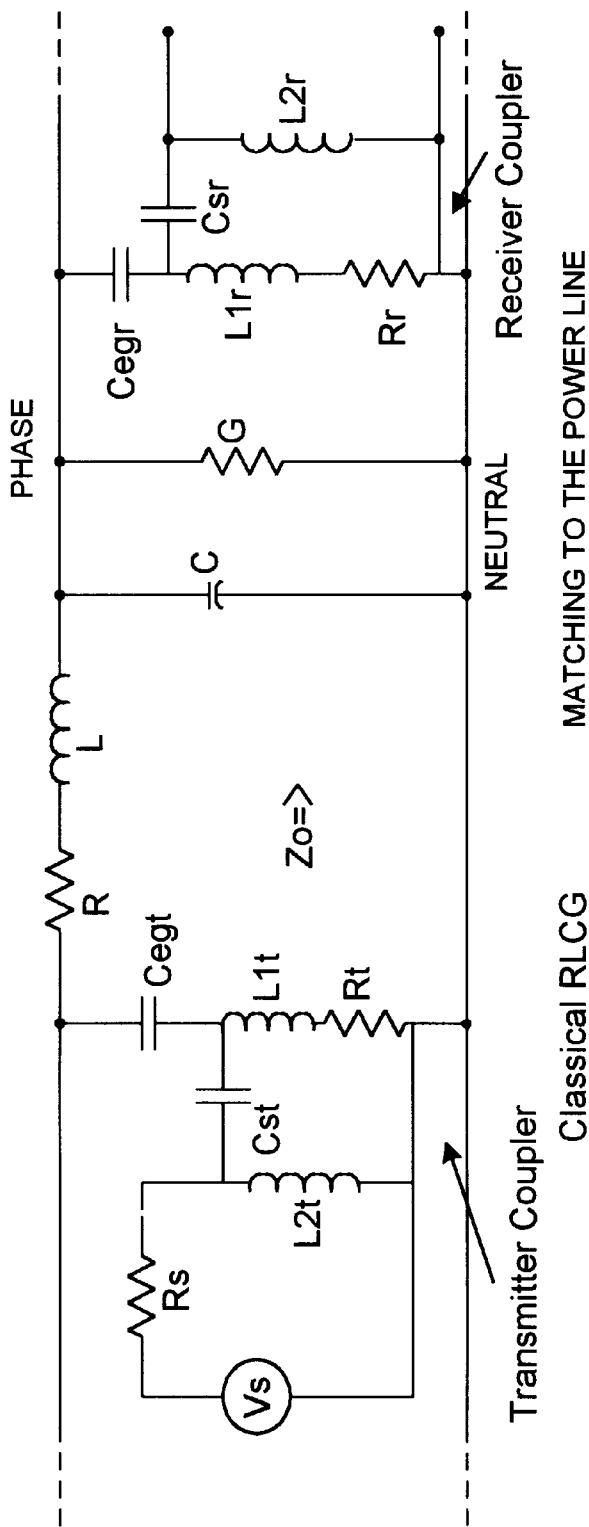
FIG. 37 is an equivalent circuit model for a power-line carrier communication system with resistive matching to the power line characteristic impedance by the coupler.

The present invention, characterized in FIG. 30, has two coaxial solenoids or air-coils of different diameter with primary and secondary inductances L1 and L2 respectively. Both L1 and L2 are inductively and capacitively coupled creating an air-core transformer (see FIG. 19). The air-gap is filled with resin which insulates the AC current from the transceiver. The size of the gap is selected to reduce inductive loading effects from coupler secondary to the primary. Since the coupling capacitor, Ceq, is significantly larger than the static capacitor, Cs the static capacitor (FIG. 37) does not mistune the desired carrier frequency. Inductive loading effects from the secondary to primary of the air-core transformer are minimized at the transmit frequency. The effective transceiver input independence, as seen at the primary, is equal to the resistance of the primary winding (Rt or Rr). This value can be chosen to optimally match the line characteristic independence. When Zo equals the resistance of the primary winding, Rt, of the air-core transformer about 25% of the source power can be coupled into the line through the power line coupler. Note that Zo varies between 5 and 150 Ohms on distribution lines and 1 and 20 Ohms on 120/240 V network lines depending on loading conditions. Since insertion loss increases rapidly for termination impedances were the primary winding impedance is greater than Zo (as compared to primary winding impedance less than Zo), a prudent design choice is to use a value of primary winding resistance approximately equal to the minimum value of the line characteristic impedance, Zo.

Figure 12:
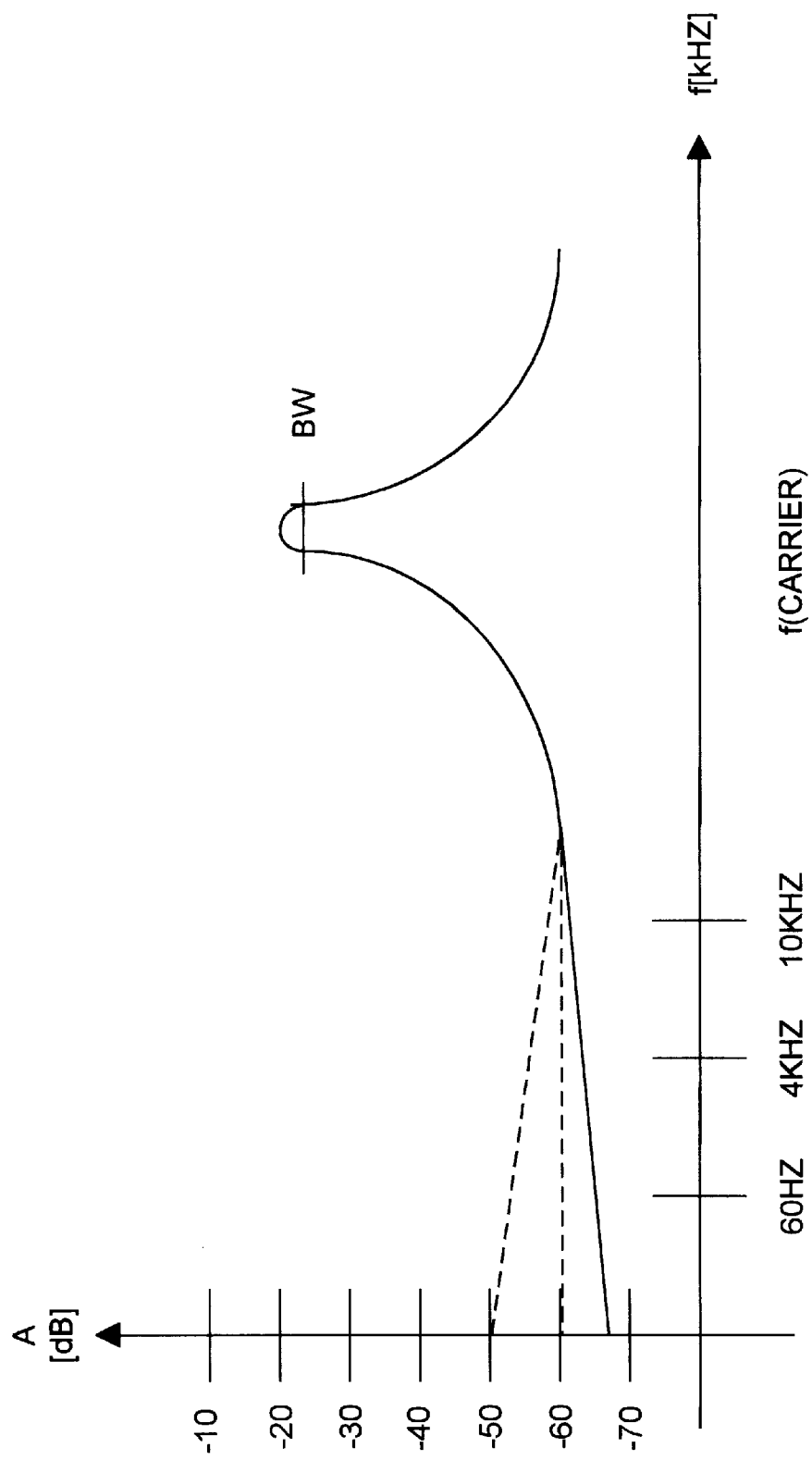
FIG. 12 illustrates the frequency characteristics of traditional serial LC couplers.
Figure 14:
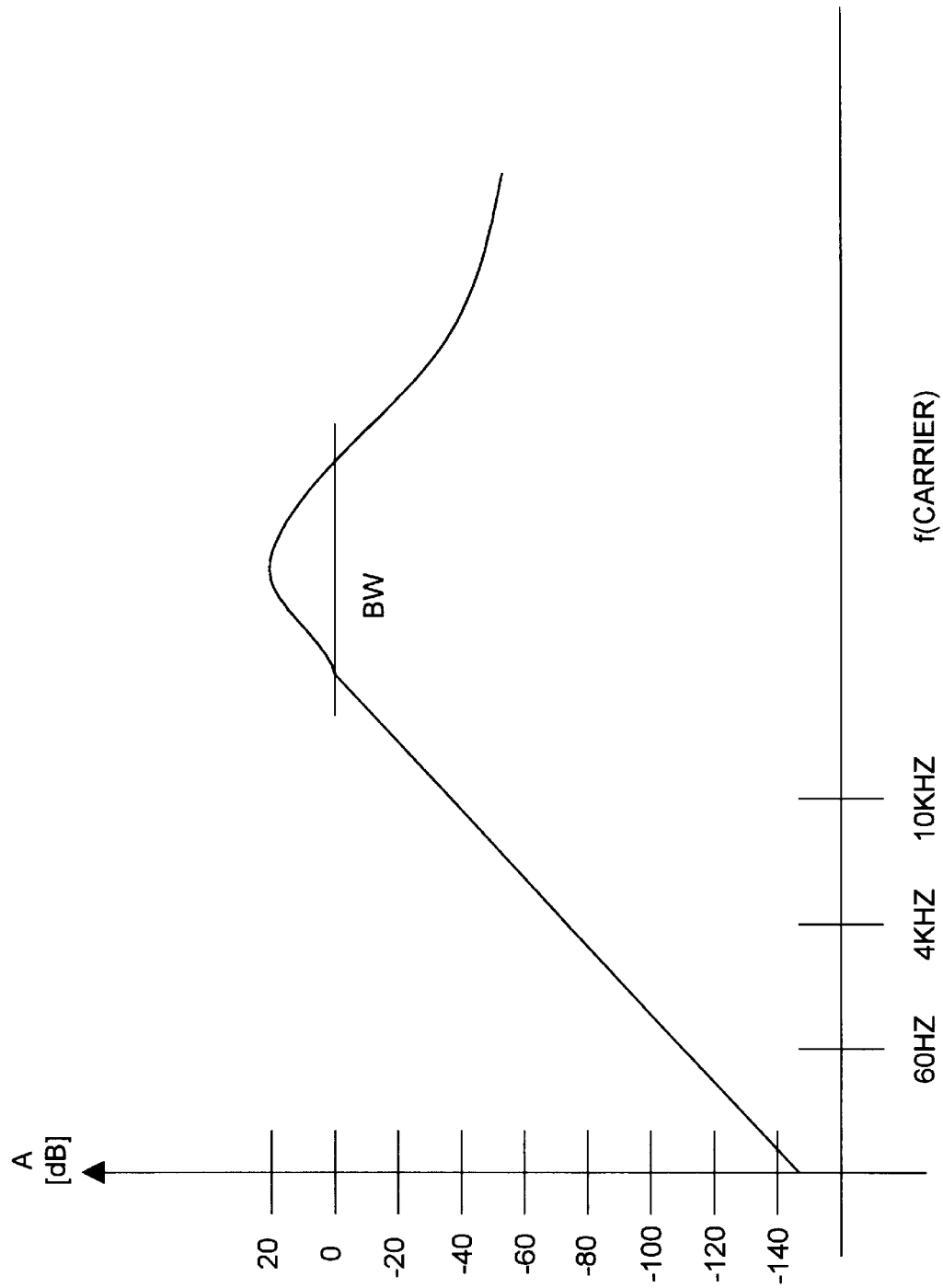
FIG. 14 illustrates the frequency characteristics of the phase shift linear coupler of the present invention.

The advantage of an air-core transformer in the novel coupler is exhibited by the frequency response shown in FIG. 14. There is a considerably greater band width around the center frequency when comparing it to the response of a traditional coupler which uses a magnetic-core transformer (FIG. 12).

A significant reduction of 60 Hz harmonics are observed at the secondary side of the novel coupler. This reduction can exceed 20 dB over a wide band. Most noise generated on power lines by AC motors and equipment has a large reactive source impedance. This type of noise experiences significant loss through the novel couplers due to the coupler's low resistive impedance at or around the carrier frequency of the transmission or reception. In contrast, the transfer characteristic of ferrite or iron core couplers-typically has a high Q (FIG. 12), which is advantageous in theory for reducing the effects of the harmonics outside the bandwidth, but in actuality constrains the useful transmission bandwidth of the power-line carrier and does not provide noise attenuation inside the bandwidth. The wide bandwidth noise rejection of the novel coupler obviates the need for a sinx/x type receive filter for harmonic rejection.

This implies that no separate receiver is required, other than the coupler, for high speed transmission.

Another significant aspect of the design is the phase linearity achieved. The matching of the line impedance and the use of air-core transformers are responsible for the amount of phase linearity achieved. In fact, the phase response of the overall transmission system is linear over a very wide range of frequencies. This implies that almost any desired frequency range can be selected for communication. Also, standing waves are virtually suppressed due to the low resistive matching at both ends of the line. The peak amplitude of the first reflection is around 4 mV, which is small compared to the transmitted signal amplitude of a few volts. Thus, setting the receiver threshold above 4 mV can eliminate any remaining source errors. There is also an elimination of standing waves on the line. This implies that there are no anti-nodes, places where the magnitude of the standing wave is zero and no transmission can occur, at points on the line situated at odd multiples of lambda/4 away from the end of the liner The best frequency range 120/240 V power lines is 70–160 KHz (this includes LAN operations). For data transmission through power line transformers the optimal frequency to use is the 25–45 KHz band. For very high speed LAN applications a frequency range of 70–480 KHz is appropriate. Finally, the novel coupler of the present invention is equally applicable to any voltage AC, DC, phone, twisted pair or coaxial line.

DETAILED DESCRIPTION OF THE INVENTION

Figure 15:
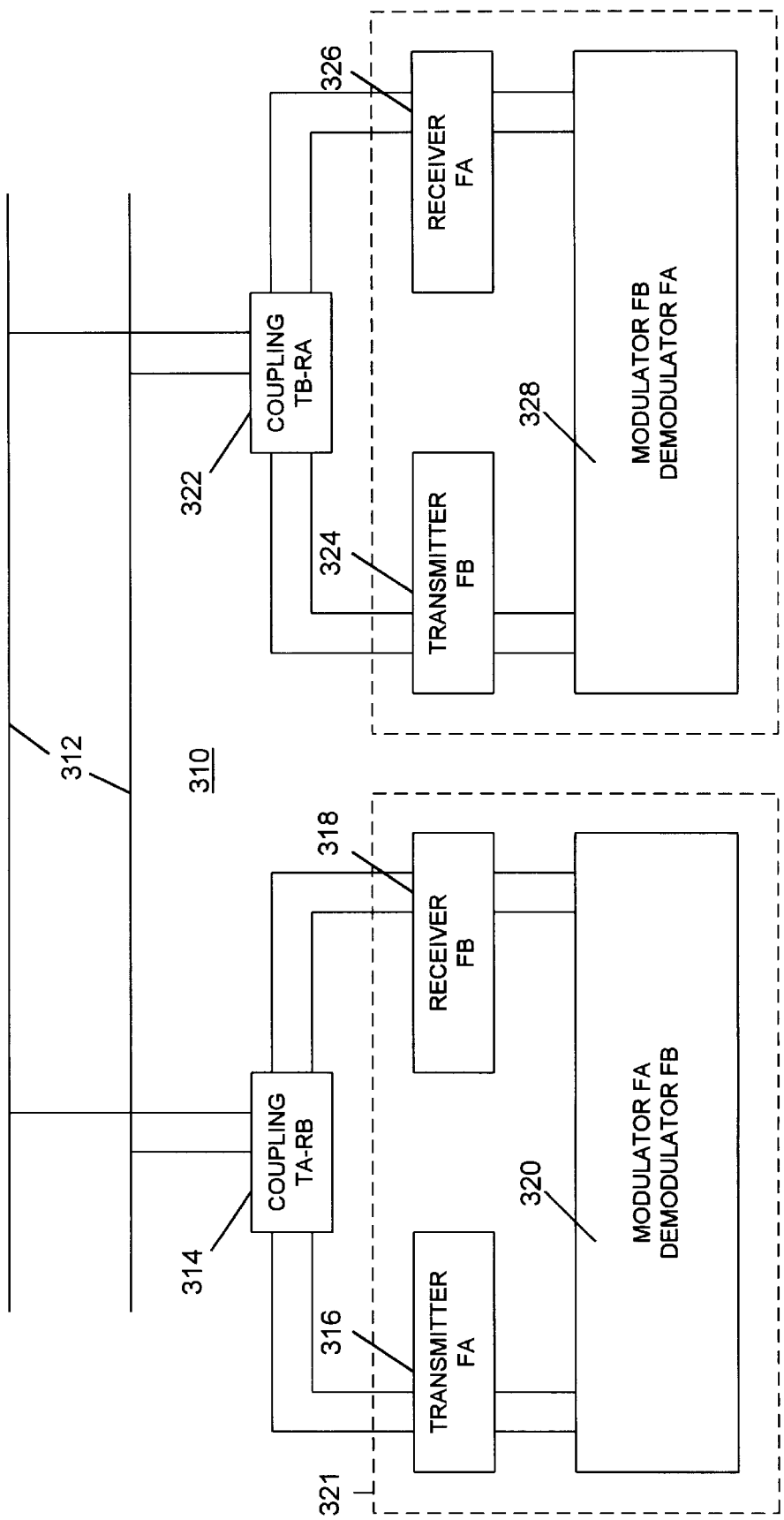
FIG. 15 is a block diagram of a power-line communication apparatus in accordance with the present invention.
Figure 16:
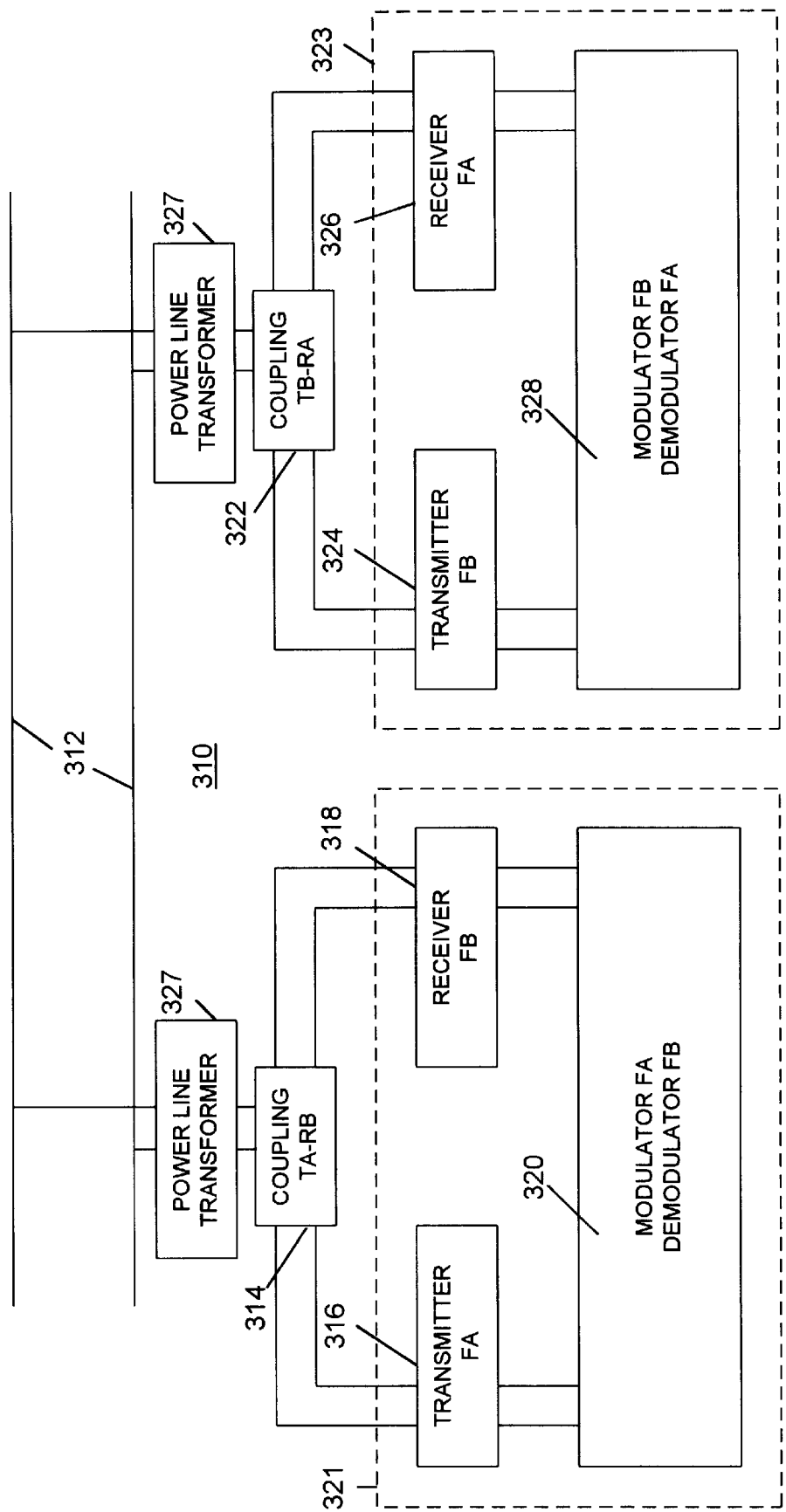
FIG. 16 is a block diagram of a power-line communication apparatus in accordance with the present invention including power-line transformers.

Referring now to the Figures, wherein like numbers designate like or corresponding parts throughout each of the several views, there is shown in FIGS. 15 and 16 block diagrams of a power line communication apparatus 10 according to the present invention for use in low power applications (up to 480 VAC).

The communications apparatus 10 shown is coupled to a pair of power lines 312, and generally comprises first coupling means 314, first transmitter means 316, first receiver means 318, and first modulator/demodulator means 320 at a first location along the power lines 312. The combination of transmitter means 316, receiver means 318 and modulator/demodulator means 320 comprise a first modem means 321. At a second location along power line 312 are second coupling means 322 second transmitter means 324 second receiver means 326 and second modulator-demodulator means 328. The combination of transmitter means 324, receiver means 326 and modulator/demodulator means 328 comprise a second modem means 323.

As will be explained in greater detail herein below, both coupling means 314, 322 include a pair of serial LC circuits (FIGS. 17 and 18) which are coupled to the pair of power lines 312. Referring to FIG. 16, the apparatus is coupled to power line transformers 327. Each of the serial LC circuits in a respective one of the coupling means 314, 322 resonate at a given frequency. The LC circuits include a plurality of capacitors which are connected in a series and parallel configuration. See FIG. 13. The coupling means 314, 322 further incorporates novel air-core transformers for both transmission and reception which serve as the inductive (L) component of the respective LC circuits. It is to be noted that while the present invention is being described in the context of two identical communications apparatus, either circuit may be configured to function as a simple receiver or transmitter.

The first transmitter means 316, coupled to the first coupling means 314, is capable of transmitting digital data signals carried by a first carrier frequency FA across the pair of power lines 312, and as shown in FIG. 16, through power line transformers. The first receiver means 318, coupled to the first coupling means 314, is capable of receiving digital data signals carried by a second carrier frequency FB from the pair of power lines 312. The modulator/demodulator means 320, coupled between the first transmitter means 316 and the first receiver means 318, modulates the digital data signals to be carried by the first carrier frequency FA, and demodulates the digital data signals carried by the second carrier frequency FB.

In a similar manner, at the second location along the power lines 312, the second transmitter means 324 is coupled to the second coupling means 322. Second transmitter means 324 is capable of transmitting the digital data signals to be carried by the second carrier frequency FB across the pair of power-lines 312, and as shown in FIG. 16 through power-line transformers. Accordingly, the second receiver means 326 is coupled to said second coupling means 322, and is capable of receiving the digital data signals carried by the first carrier frequency FA from the pair of power lines 312. The second modulator/demodulator 328, coupled between the second transmitter means 324 and the second receiver means 326, modulates the digital data signals to be carried by the second carrier frequency FB and demodulates the digital data signals carried by the first carrier frequency FA.

The first and second carrier frequencies FA, FB preferably comprise frequencies up to 11 MHZ. For most high voltage, long distance communications, the first and second carrier frequencies FA, FB will typically comprise frequencies that are less than about 160 KHz, having bandwidths of less than 20 KHz. When used for communication through power line transformers, FA and FB will typically comprise frequencies below 90 KHz (preferably 25–45 KHz) with bandwidth of about 6 KHz. The serial LC circuits (FIGS. 17 and 18) of both coupling means 314, 322 each comprise resistive matching means which will be described in greater detail below.

Figure 17:
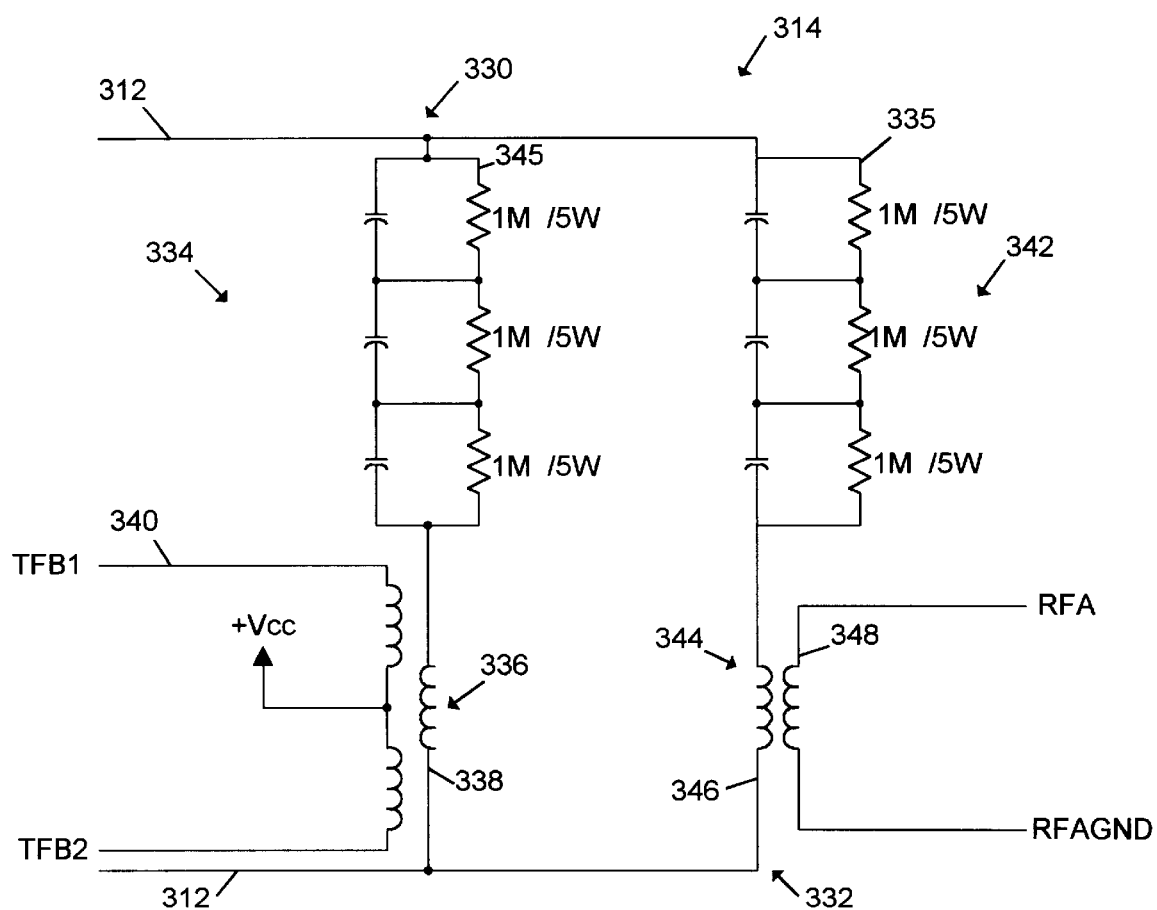
FIG. 17 is a schematic diagram of first coupling means in accordance with the present invention, which corresponds to the coupling TA-RB shown in FIGS. 15 and 16.
Figure 18:
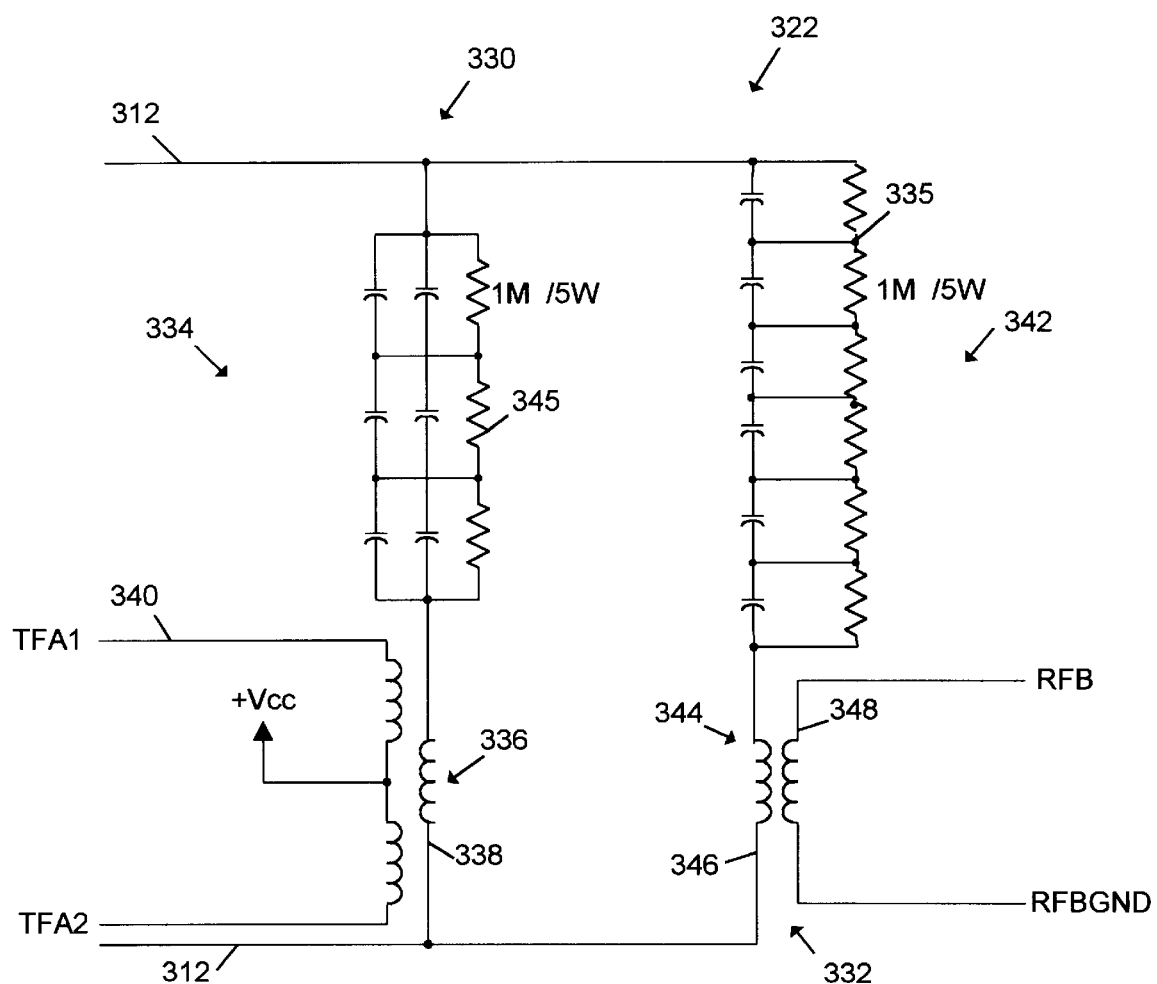
FIG. 18 is a schematic diagram of second coupling means in accordance with the present invention, which corresponds to the coupling TB-RA shown in FIGS. 15 and 16.

With reference next to FIGS. 17 and 18, the specific circuitry for representative coupling means 314, 322 is now described in greater detail. The coupling means 314 (FIG. 17), 10 (FIG. 18) each include a pair of serial LC circuits 330, 332 which resonate at the carrier frequencies FA, FB. It will be appreciated by those skilled in the art that for FSK (Frequency Shift Key) applications FA will correspond to F1 and F2 and FE will correspond to F3 and F4. The serial LC circuit 330 shown in FIG. 17 resonates at the second carrier frequency FB, while serial LC circuit 332 resonates at the first carrier frequency FA. Similarly, the serial LC circuit 330 of FIG. 29 resonates at the first carrier frequency FA, and serial LC circuit 332 resonates at the first carrier frequency FB.

The LC circuits include respective serially and parallel connected capacitor networks 334, 342. To each capacitor in series is connected a resistor 335 and 345 which evenly divides down the AC voltage. Preferably, the resistor values should be rated at 1 Megohm per 5 watts and the capacitors should be 200 VAC capacitors. The resistors should preferably be thick film (i.e. carbonless). The Q point of the capacitors should similarly be high. In operation, the couplers (LC) should be placed into a resin for good insulation when used with operating voltages up to 660 V. At operating voltages above 660 v, the capacitors should be separately placed in an oil filled insulator and the air coil transformer placed into a resin. The use of the resistors 335, 345 serve to minimize the DC current so as to prevent spiking and afford lightning protection.

It is to be appreciated that the capacitor networks 334, 342 create equivalent capacitances Ceq1 and Ceq2 for transmission and reception, respectively. The capacitor networks are connected to air-core transformers to be discussed below which function as the inductive element (L) of the LC circuit Ceq1 and Ceq2 resonate with the primary windings of the air-core transformers.

The air coil means comprise a first air coil 336 which includes a primary winding 338 and a smaller secondary, winding 340 situated coaxially within the primary winding. The second serial LC circuit 332 includes second air coil 344 including a primary winding 346 and smaller secondary winding 348 situated coaxially within the primary winding.

The first plurality of capacitors 334 are connected together in series between one of the power lines 312 and the primary winding 338 of the first air coil 336. The primary winding 338 of the first air coil 336 is thereafter serially connected to the other power line 312. The secondary winding 340 of the first air coil 336 is connected to its respective transmitter means 316. The second plurality of capacitors 342 are serially connected together between one of power lines 316 and the primary winding 346 of the second air coil 344. The primary winding 346 of the second air coil 344 thereafter being serially connected to the other power line 312. As noted above resistors, 335 and 345 function to evenly divide the voltage and serve to minimize spiking and afford lightning protection.

Referring to FIGS. 30A–30C, the phase shift linear air-core transformers of the present invention are described in greater detail. The phase shift linear transformer of the present invention involves a dielectric core coupler which uses a dielectric material disposed between the primary and secondary windings. A dielectric is a material which is an electric insulator or in which an electric field can be sustained with a minimum dissipation in power. Examples of other dielectric materials include plastic, paper, wood, resin compounds, glue based compounds, as well as other materials understood by those skilled in the art to be dielectric and suitable for the core of a transformer as described herein. A dielectric is used to insure that the AC voltages are not transferred from the primary winding to the secondary winding. Even the several hundred kilovolts which can be contained in a lightening strike which may hit the primary, would be insulated from the secondary by the use of a dielectric material such as a resin.

In a preferred embodiment, an epoxy core is used. The epoxy core of this embodiment is made up of a resin and an activator. It is desirable to minimize the shrinkage of the resin. For this reason, a medium shrinkage resin such as that contained in EP5342 of Eager Plastics Company, Chicago, Ill. can be used. Other suitable resins and activators (epoxies) will be understood by those skilled in the art. Multiple pours of the epoxy as well as fillers (such as slate, flour or sand) can be used to minimize shrinkage and the exothermic heat it generates.

In another embodiment of the phase shift linear transformer of the presents invention, an air-core coupler is used. The air-core coupler of this embodiment is constructed by wrapping the secondary and primary windings around plastic tubes having a hollow section. The tube with the secondary winding is fitted within the tube wrapped with the primary winding. Where air-coil couplers or structures are referred to throughout the specification, dielectric core, couplers or structures, such as resin core couplers, can be used interchangeably.

The tube of the phase shift linear transformer over which the primary winding is wound and within which the dielectric material is filled, can be made of a plastic or similar dielectric material as recited above. In addition, the tube/dielectric material combination can be a single piece forming a solid bar of dielectric material such as a medium-shrinkage resin. The secondary winding is then wrapped around this dielectric bar and then the dielectric bar with the secondary winding is enveloped in a casing of a dielectric material such as the low-shrinkage resin over which the secondary is wound or another dielectric material such as a plastic. The primary winding is then wound around the secondary dielectric material encasing the secondary winding.

Both the primary and secondary windings in a preferred embodiment are wound very tightly, so that the insulation from one wire abuts the insulation of an adjacent wire. Therefore, the distance between adjacent wires is the thickness of the insulation on each adjacent wire.

The particular gauge wire as well as the diameter of the overall winding, depends upon the frequency for which the particular phase shift linear transformer is being designed. Example wire can be between 320 and 336 gauge for the many applications although higher or lower gauge wires can be used depending upon the particular application. Further, the primary and secondary windings may have different gauge wires used again to tune the device to the particular frequency for a specific application. It is also possible for a particular application that the primary and the secondary would use the exact same wire for their windings. Examples of wires which can be used for the primary or secondary winding are copper/magnet wires such as Belden Heavy Armored Poly-Thermaleze and single Beldso® Solderable wires of Belden Wire and Cable. Other wires suitable for the primary and secondary windings will be understood by those skilled in the art.

In a preferred embodiment, both the primary and secondary are single layer windings, not multiple layer windings. Also, in a preferred embodiment, both the primary and secondary windings are adhered to the resin or resin tube. One method for adhering the wire to the dielectric tube or dielectric bar is through the use of a glue.

Figure 19:
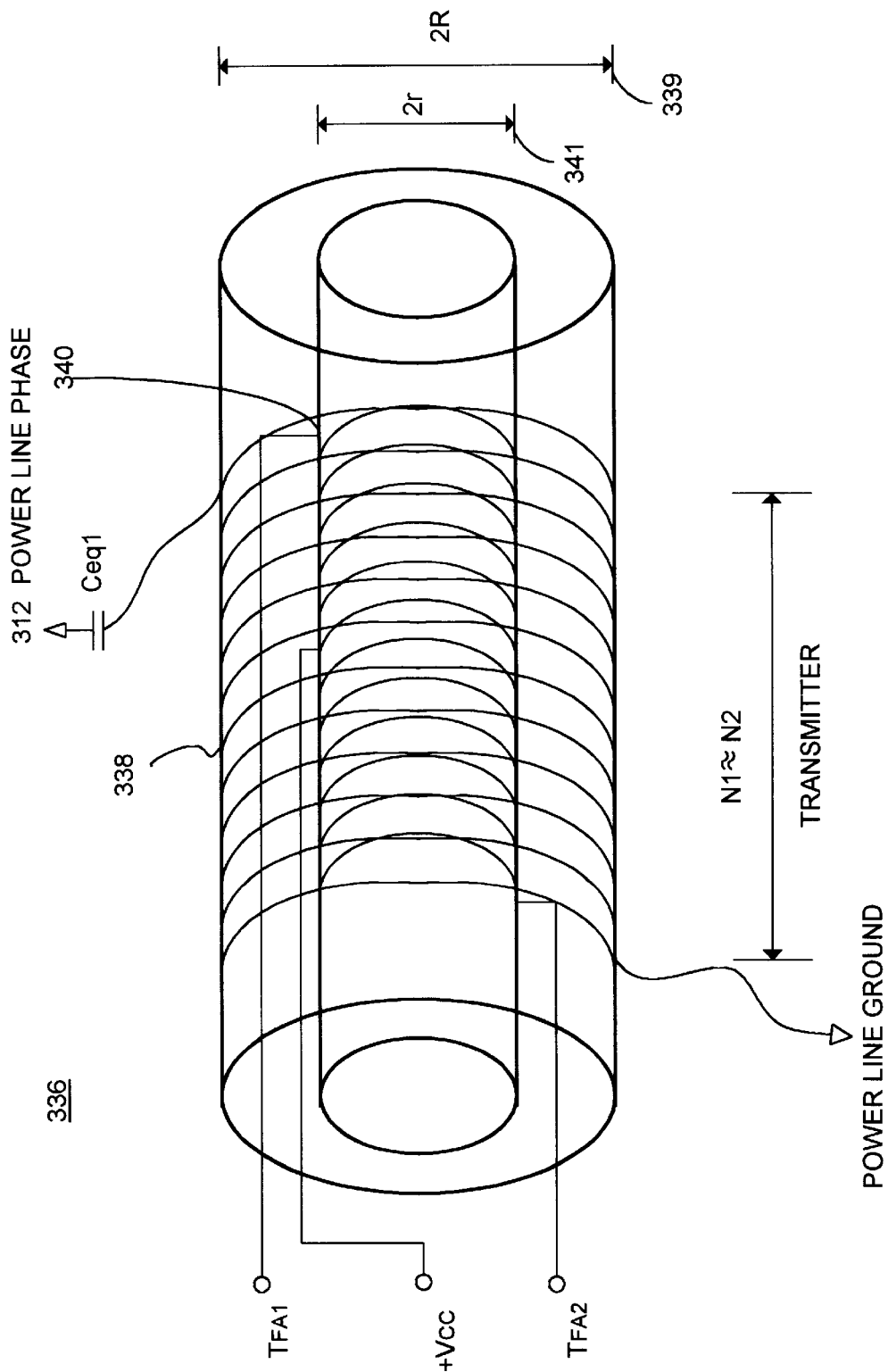
FIGS. 19 and 20 illustrate the coaxially extended air-core transformer with coupling capacitor utilized in the present invention.

The novel air coil structures function as respective inductively and capacitively coupled air-core transformers for both transmission and reception. FIG. 30A illustrates the transmitter transformer 336 with coupling capacitor network Ceq1. As shown in FIG. 19, the transmitter transformer 336 is connected in series with Ceq1 and the power line 312. The transformer is phase shift linear and comprises a primary winding 338 and coaxial smaller secondary, winding 340 which is placed between the primary winding. The primary winding 338 has a winding diameter 2R 339 which is greater than the diameter of the secondary winding 2R 41 and accordingly creates an air gap between the two. Of particular significance is the fact that both the primary and secondary windings 338, 340 in the transmitter air coils have the same number of turns (designated by N1–N2), and are thus at a 1:1 ratio. Accordingly, the transmitter doesn't require a high transmission voltage, as is characterized by prior art devices. Further Ceq1 is set to resonate with the primary winding at the carrier frequency FA, thus creating a band pass filter at the carrier frequency FA. This maximizes the current at the carrier frequency FA.

The values of Ceq1 and the resistors, 335, 345 are set to generate a large voltage loss at frequencies less that 10 KHz (thus encompassing the 60 Hz and its harmonics). Thus, the significantly reduced 60Hz signal cannot generate a large enough current to pass the static capacitance. That is, for transmission, the resistivity of the primary coil is roughly equal to the lowest known value of the characteristic impedance of the power line.

Figure 20:
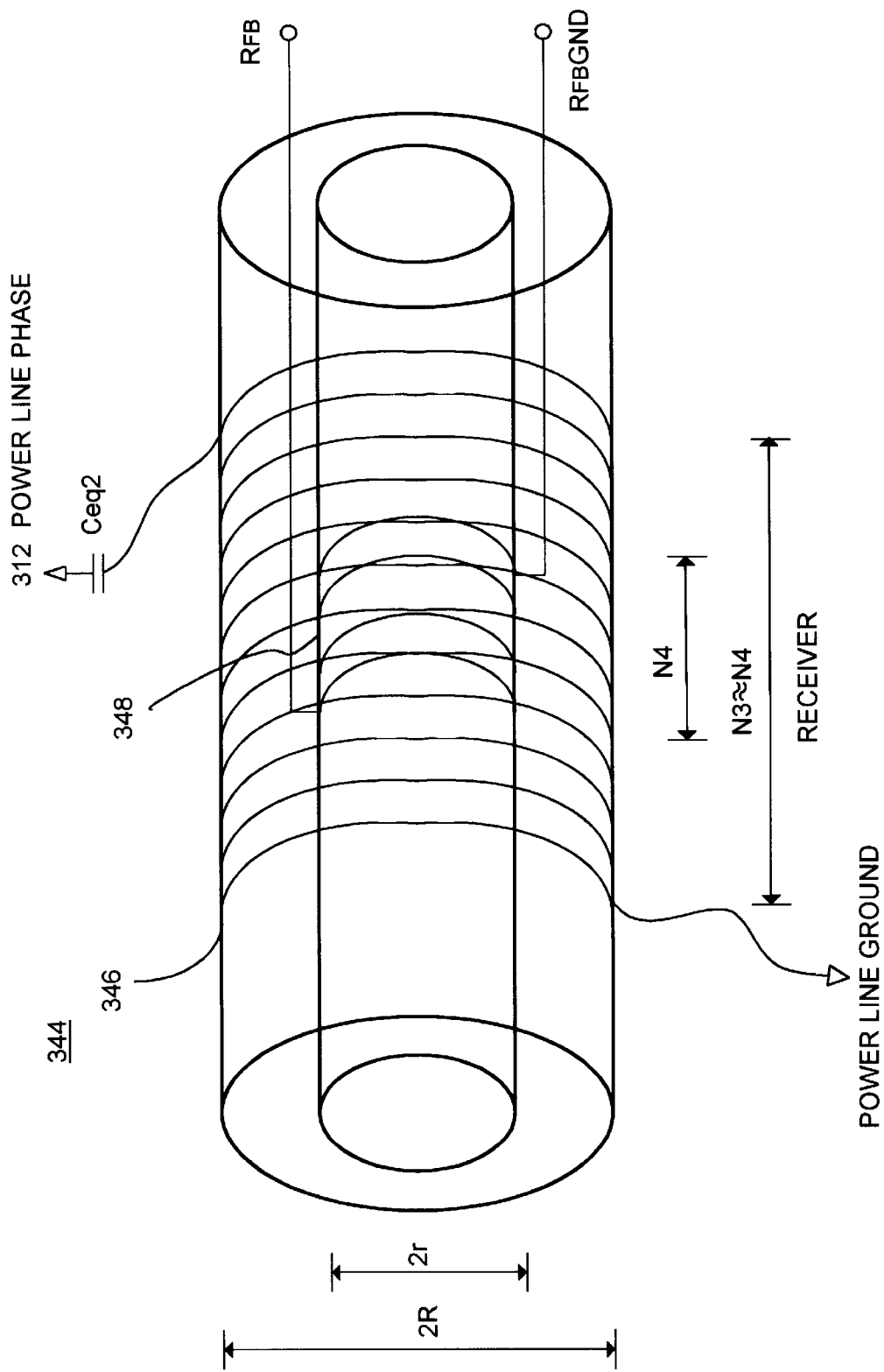

The receiver transformer is now described with respect to FIG. 20. The receiver is connected to the power line 312 via Ceq2. As with the transmitter of FIG. 19, the receiver air coil comprises a phase shift linear transformer having a primary winding 46 with a first diameter 2R 347 and a secondary coaxial winding 348 having a second diameter 2R 349. Accordingly, an air gap, and thus a static capacitance, is similarly created between the respective primary and secondary windings 346, 348. In the receiver transformer, the ratio of the primary and secondary windings can be about 1:1. While this ratio can be altered or modified, such a change requires a resultant alternation in the size of the air gap, i.e. the relative ratio of 2R and 2r. The capacitor network Ceq2 is set to resonate with the primary winding at carrier frequency FB, thus creating a bank pass filter at carrier frequency FB.

In operation, the power line voltage is significantly reduced by Ceq2 and the resistors. Thus, the static capacitance with the secondary winding significantly attenuates the 60 Hz and its harmonics, thus effectively functioning as a high pass filter. The carrier frequency voltage is thereby maximized. The air-core transformer produces a wider phase linear bandwidth than previous systems. The bandwidth characteristics off the present invention are shown in FIG. 14. For good reception, the resistivity off the primary can be equal or greater than the lowest characteristic impedance of the power line.

From a design standpoint, the philosophy is to minimized the 60 Hz line current and its harmonics at the output of the coupler. For higher voltage power-line coupling the coupling capacitor, Ceq1 should have a smaller value:

(f)2(carrier)/(f)2(60 Hz) ratio determines the Vcarrier/V60 Hz ratio at the output of the coupler. Preferably, a higher carrier frequency should be used for higher power line voltages. Vcarrier is measured at the preselected carrier frequency at the secondary output of the receiver coupler in volts. V60 hz measured at the same location of Vcarrier, is the voltage of the 60 Hz.

The above relationships coupled with the capacitive transformers serve to block the 60 Hz line current. The resistive matching serves to reduce power line noise at the bandwidth. The above makes it possible to communicate directly through power line transformers. The use of an air-core transformer reduces reflected impedances from the secondary side as well as from the power line transformer to the primary side of the air-core transformer.

Figure 41:
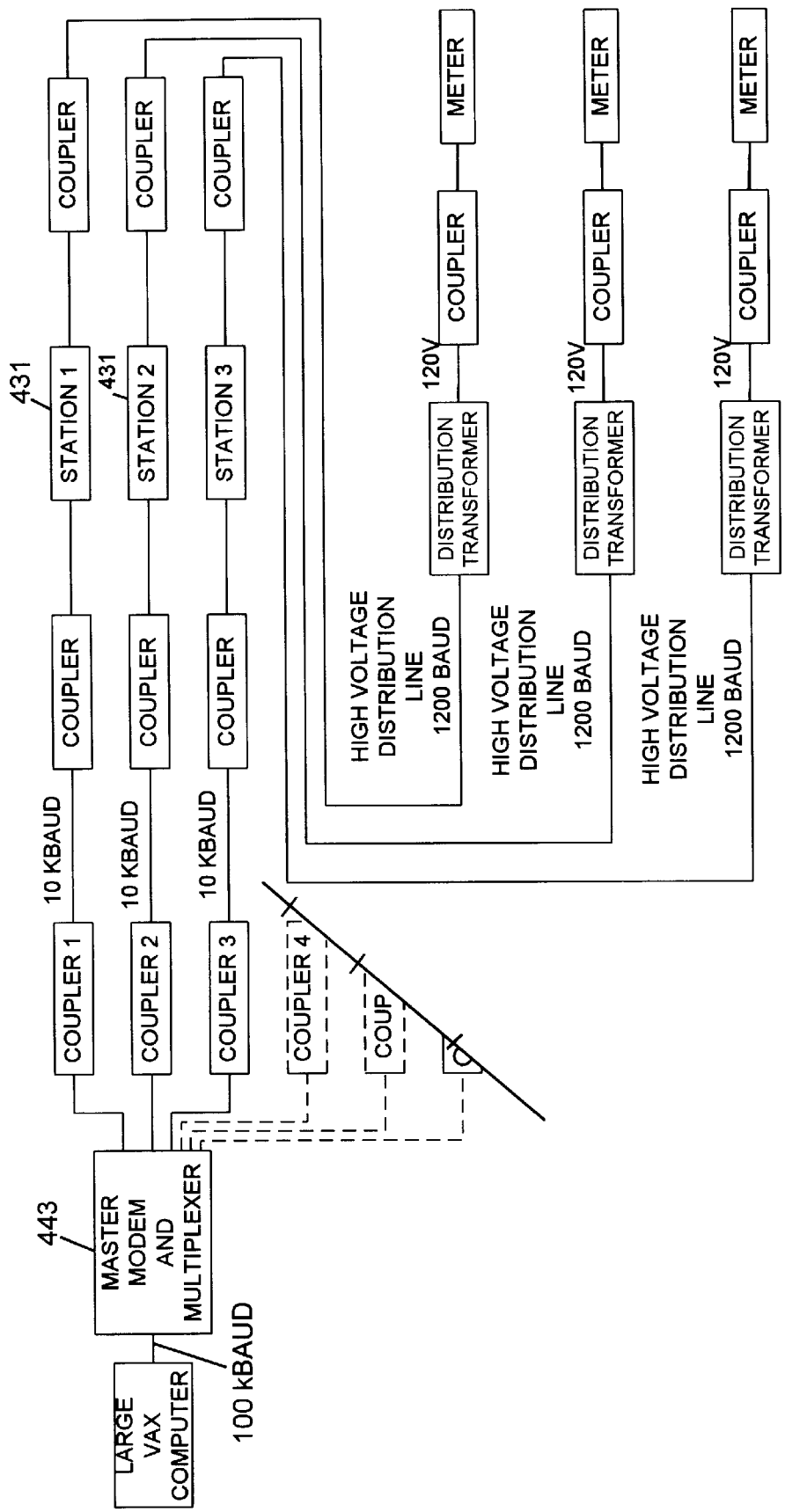
FIG. 41 is a block diagram of the system of FIG. 38 as applied to a multiplicity of substations.

The theoretical operation off the circuit is seen with reference to FIG. 41, an equivalent circuit model for a power line carrier communication system with matching resistors Rt and Rr. At primary resonation, the LC impedances will be zero at transmission and reception such that the resistivity of the primary coil Rt matches the characteristic impedance of the power line. On the receiver side, Rr can be equal or larger than the characteristic impedance of the power line. Due to the use of the air-core transformer and resistive matching, the whole power line system can be phase shift linearized even through a power line transformer. These relationships facilitate error free and high speed communications over long distances.

Figure 44:
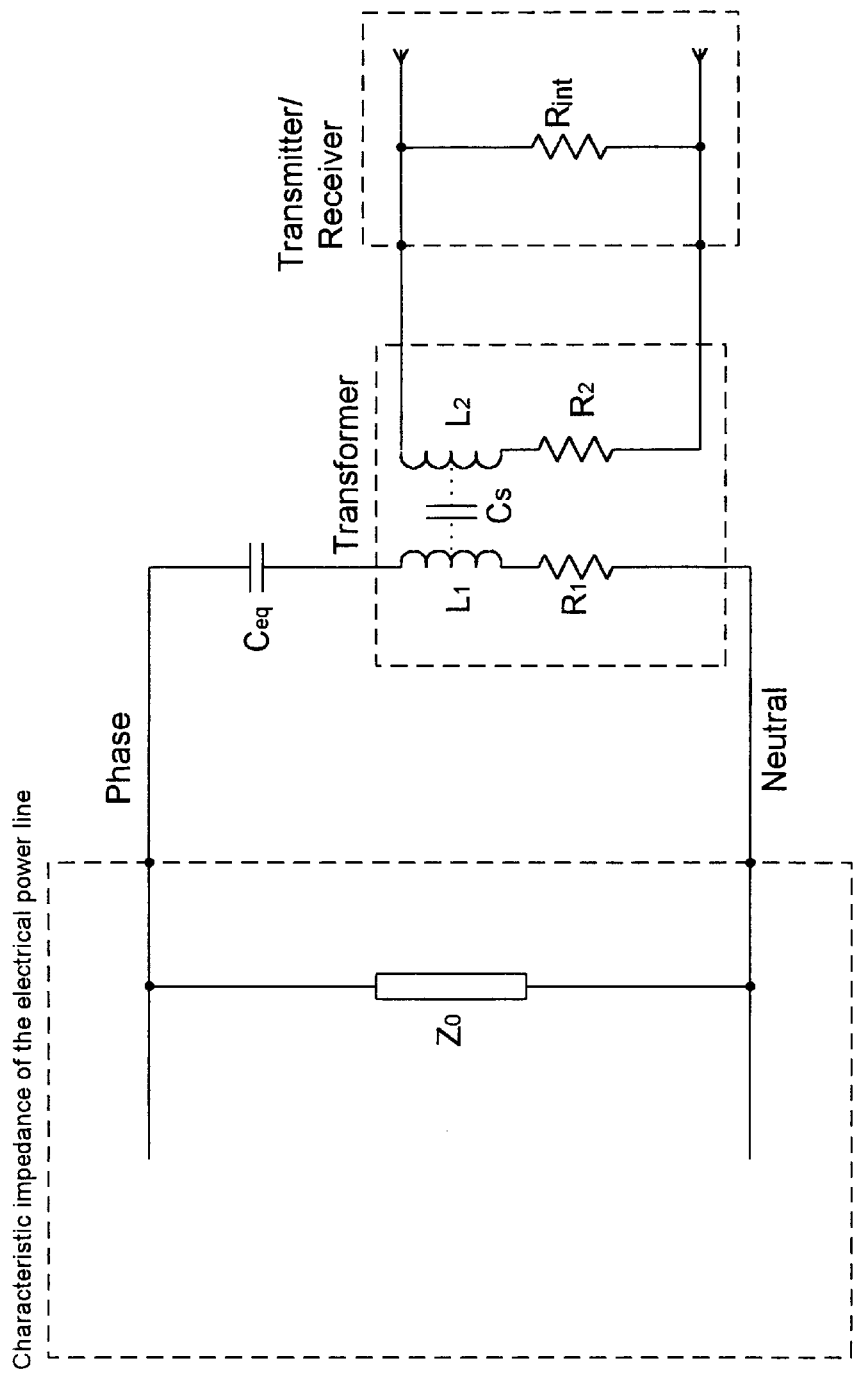
FIG. 44 is an equivalent circuit model for a power-line carrier communication system with resistive matching to the power line characteristic impedance by the coupler.

FIG. 44 shows a power line communications system for matching the characteristic impedance of an electrical line using an air-core (or dielectric) coupler (or transformer) which is capacitively and inductively coupled to the electrical line. In FIG. 47, Zo is the characteristic impedance of the electrical line where Zo is approximately equal to the square root of L/C and L and C are the inductive and capacitive components, respectively, of the electrical line.

Ceq and L1 are the equivalent capacitance and the inductive component of the Primary of the air-core coupler. R1 is the resistive value of L1, L2 is the inductive component of the secondary of the air-core coupler. R2 is the resistive value of L1. Rint is the impedance of the transmitter or the input impedance of the receiver, depending upon whether the air-core coupler is operating as a transmitter or receiver. FIG. 44 illustrates the air-core coupler of the present invention working either as a transmitter or a receiver (or transceiver).

The air-core coupler primary winding is matched to the electrical line characteristic impedance at a preselected frequency band, as well as to the other couplers attached to the electrical line at the same frequency. The secondary winding is matched to the transceiver (transmitter and/or receiver) input impedance. Since the values of L1 and Ceq approach zero at the preselected frequency F1, where F1 is given by equation (1).

$$F1 = \frac{1}{2\pi L1 C1} \qquad (1)$$

(where F1, L1 and C1 are approximately zero), R1 (and the rest of the R1 values for any other couplers) will match Zo and $\omega L2$ will match Rint if standard copper magnetic wire is used for the primary and secondary windings.

If a resistance wire, such as Deltalloy wire having a specific resistivity of 675 OHM CIR. MIL. FT. with a composition of 15% Chromium and 60% nickel, available from Delta/PWF Corp., R2 can be increased and a wider bandwidth can be achieved. A preferred resistance wire has a light magnetic attraction of approximately 5–10 ohms per foot for #24–434 gage wire (for example, 8.25 ohms per foot for #30 gage wire) which is coated/insulated.

The wider bandwidth results from R2 being greater than $\omega L2$ as $Q=\omega L/R$. The larger R2 value from the resistance wire will also provide a more stable band. By matching resistance values a more linear band is also achieved, as compared to matching inductance values to resistance values.

The coupling means 314, 322 shown in FIGS. 15, 17, 18, 19 and 20 are suitable for communication in association with wide range of power line voltages. As will be discussed herein, they can be utilized for high voltage, low voltage, twisted pair, coaxial, and phone line communications, as well as for communication directly through power line transformers.

Communications Options

1. Computer Communication through Power, Coaxial and Twisted Pair Lines

The couplers of the present invention can be applied to LAN (local area network) communications and facilitate communication speeds up to 10 Kilobaud. For this application, the coupling means 314 preferably use a first carrier frequency FA of around 75 KHz (and, 81.5 KHz for FSK) and a second carrier frequency FB of around 111 KHz (and 117.5 KHZ for FSK) over power lines 312 of up to about 1 KVAC. The coupler preferably uses first pluralities of capacitors 334 as shown therein, the coupling capacitor equivalent circuit is equal to 90 nanofarads. The first air coil 336 should have a primary winding 338 with a coil diameter of 2.2 cm, #26 gauge magnet wire and a secondary winding 340 with a coil diameter of about 1.7 cm, #28 gauge magnet wire. The second plurality of capacitors 342 has an equivalent circuit equal to 15 nanofarads. The second plurality of capacitors 342 has an equivalent circuit equal to 15 nanofarads. The second air coil 344 should have a primary winding 346 of 2.2 cm, #30 gauge magnet wire and a secondary winding 348 with a coil diameter of about 1.7 cm, #28 gauge magnet wire. The system utilizes the modems shown in FIGS. 31A, 32 and 33A. Using a suitable transistor for transmitting, the communication speed can be increased above 9.6 kbaud over power, twisted pair, and coaxial lines.

On the other side of the system, coupling means 322 comprises first plurality of capacitors 334 as shown therein, the coupling capacitor equivalent circuit is equal to 40 nanofarads (this includes the static capacitance of the air-core transformer). As above, the first air coil 336 should have a primary winding 338 with a coil diameter of 2.2 cm, #26 gauge magnet wire and a secondary winding 340 with a coil diameter of 1.7 cm, #26 gauge magnet wire. The second plurality of capacitors 342, as shown therein, coupling capacitance equivalent circuit is equal to 33 nanofarads. The second air coil 344 should similarly have a primary winding 346 of about 2.2 cm, #34 gauge magnet wire and a secondary winding 348 with a coil diameter of about 1.7 cm of the #30 gauge magnet wire.

For duplex operation the resistive matching at the frequencies should be less than 1 Ohm for transmission and 3 Ohms for reception. For half duplex operation the resistive matching should be about 1 Ohm for both transmission and reception.

2. High Voltage Power Line Communications

The couplers are also applicable to high voltage power line communication applications in which a 15 KVDC/4.5 KVAC capacitor can be used for power-line voltages of up to 765 KV. The couplers of the present invention can be utilized for communication speeds up to 9600 baud. In this application first FA and second FB carrier frequencies of 80 KHz and 115 KHz, respectively, are preferred, and the connections of first 334 and second 342 pluralities of capacitors are somewhat modified over what is shown in FIGS. 17 and 18. The first plurality 334 comprises a 2 nanofarad coupling capacitor for 80 KHZ transmission. The second plurality 342 comprises a 0.5 nanofarad coupling capacitor for reception. It is to be appreciated that the above system will be comparatively large, having a height of approximately fifteen feet and will typically be located at a ground station adjacent to large high voltage transmission line.

Referring to the air-core transformers for this application, the first air coil 336 of the coupling means 314 suitably comprises a primary winding 338 with a coil diameter of 8.9 cm, #24 gauge magnet wire, and a secondary winding 340 with a coil diameter of 6.0 cm of #16 gauge magnet wire. The second air coil 344 likewise suitably comprises a primary winding 346 of 7.3 cm, #26 gauge magnet wire, and a secondary winding 348 with a coil diameter of 4.8 cm, #16 gauge magnet wire. The inductivity of the primary is calculated according to the equation $L=1/2\ f2\ Ceq$.

The identical coupling means 322 under the same circumstances also includes the capacitor pluralities 334, 342. The first plurality 334 suitably comprises a 1 nanofarad coupling capacitor for transmission at 115 KHz, while the second plurality 342 comprises a 1 nanofarad coupling capacitor for 80 KHz reception. The first air coil 336 comprises-a primary winding 338 with a coil diameter of 8.9 cm, 24 gauge magnet wire and a secondary winding 340 with air-coil diameter of 6.0 cm, #12 gauge magnet wire. The second air coil 344 likewise suitably comprises a primary winding 346 of 8.9 cm, #26 gauge magnet wire and a 348 with a coil diameter of about 6.0 cm, #16 gauge magnet wire. No ferrite transformer is found within the transmitter and receiver. It is also possible that no receiver is needed. The resistive matching for transmission is about 5 Ohms and for reception is about 10 Ohms for duplexing operations. A resistive match of approximately 5 Ohm is needed for half duplexing operation where transmission and reception occurs in several locations.

Figure 38:
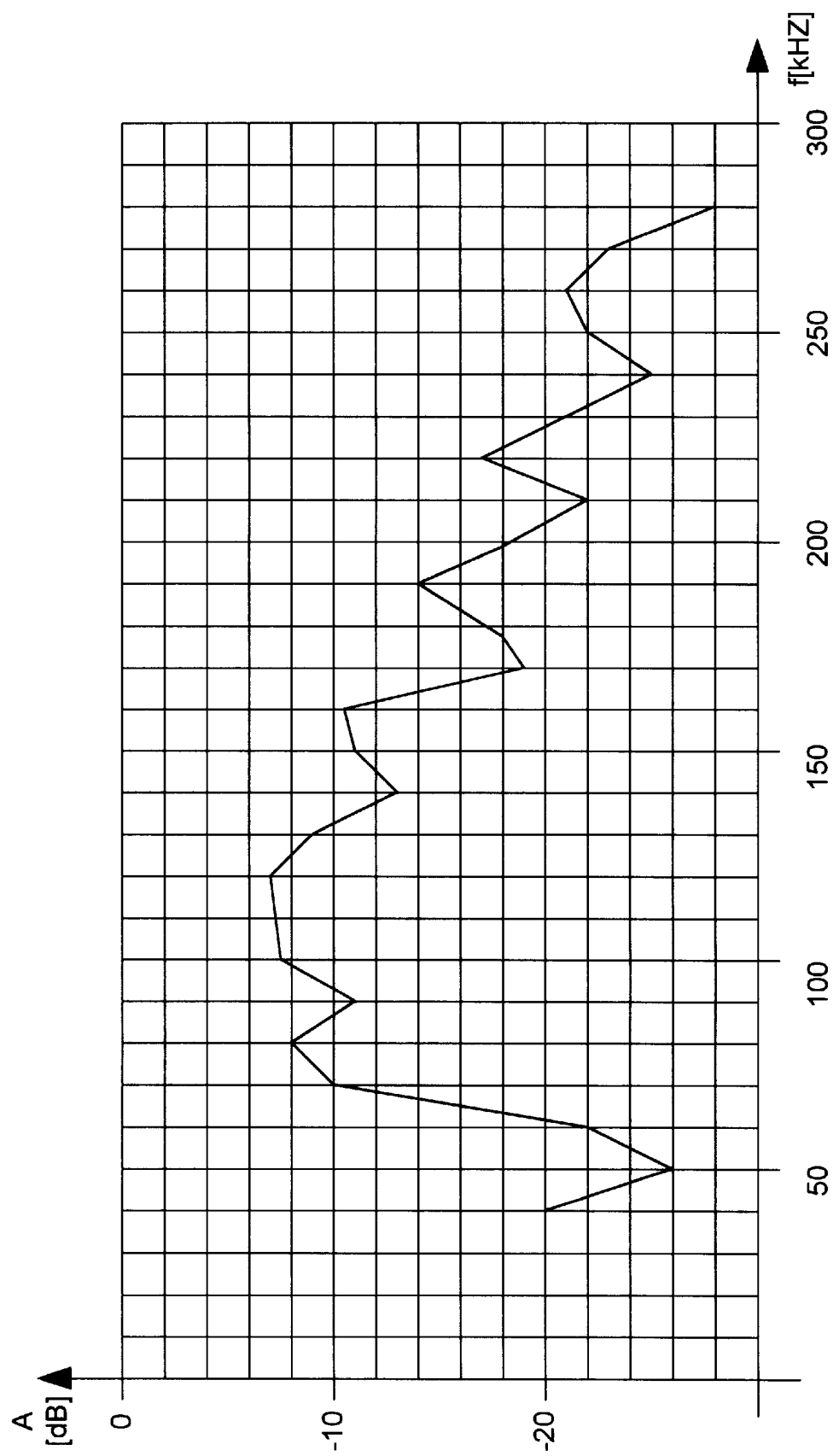
FIG. 38 is a graph of power line attenuation versus carrier frequency on the 35 KVAC power line for a 20 KM distance.

FIG. 38 is a graph of power line attenuation versus carrier frequencies on the 35 KVAC power line for 20 KM distances. A 150 Ohm load was used for the matching conditions. The best range of communication can be seen here from 70 to 160 KHz. As the number of transformers on the power line increases, the attenuation of the power line will increase especially above 100 KHz. Note that the diameter of the coils is partially determined by the available size of the PVC pipe because the windings are made on said pipe.

3. Communication Through Power Line Transformers

Figure 39:
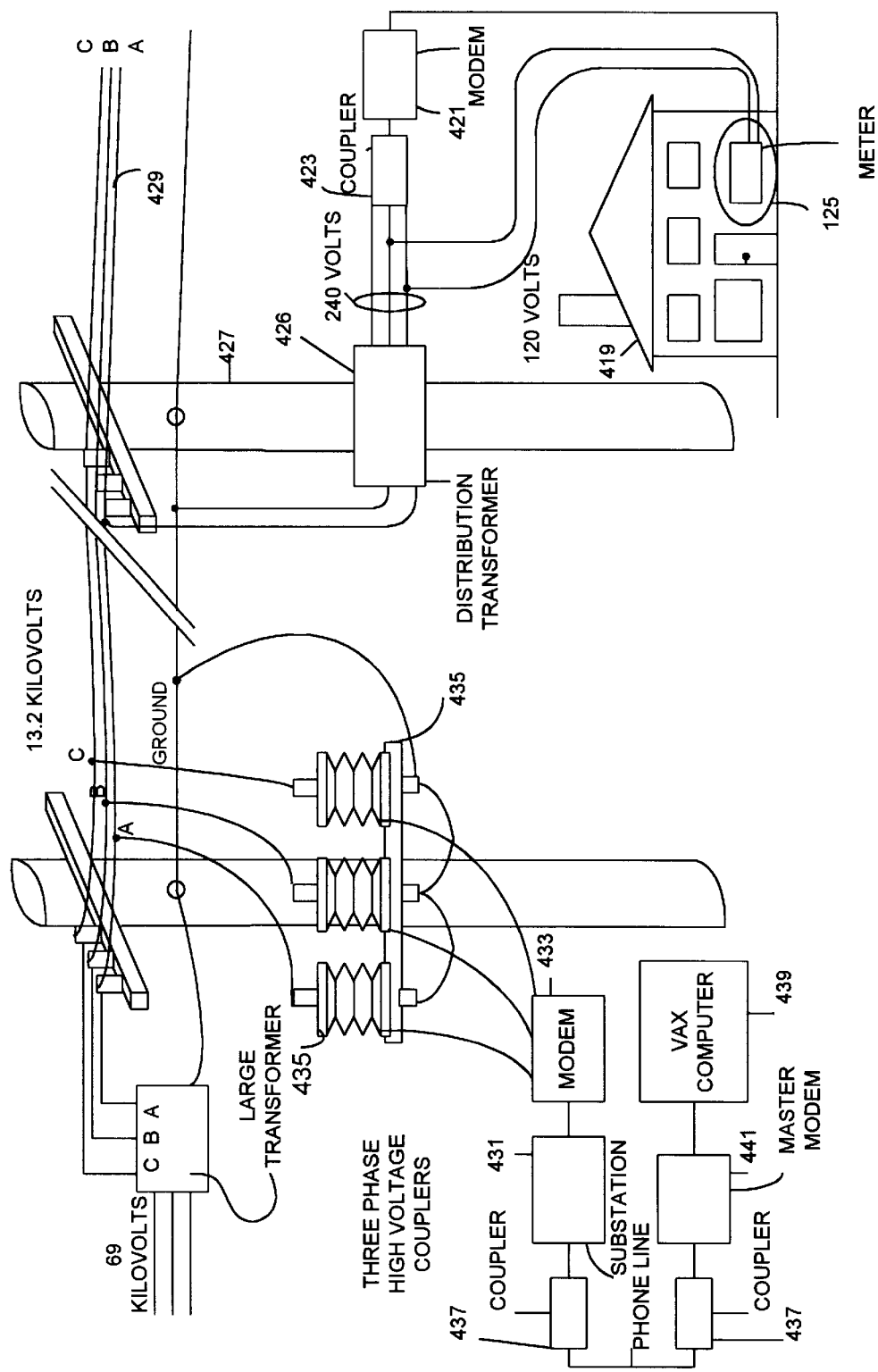
FIG. 39 is an illustration of an electric meter reading system incorporating the communication system of the present invention which may be implemented by a public utility.

As noted above, the communication apparatus of the present invention may also be utilized for communication through power line transformers (See FIG. 39). The couplers permit communication through transformers at communication speeds of over 1200 baud. It is to be appreciated that for communication through the transformer in FSK, PSK, ASK, FDM or Spread Spectrum using half-duplex with F1=30 KHz and F2=31.6 KHz, using five serial and 100 nanofarad (4.5 KVAC) capacitors connected serially with 6 Megohm, 5 watt resistors (up to 22 KV power-line), the bandwidth of the couplers will cover the F1 and F2 frequencies.

Figure 21:
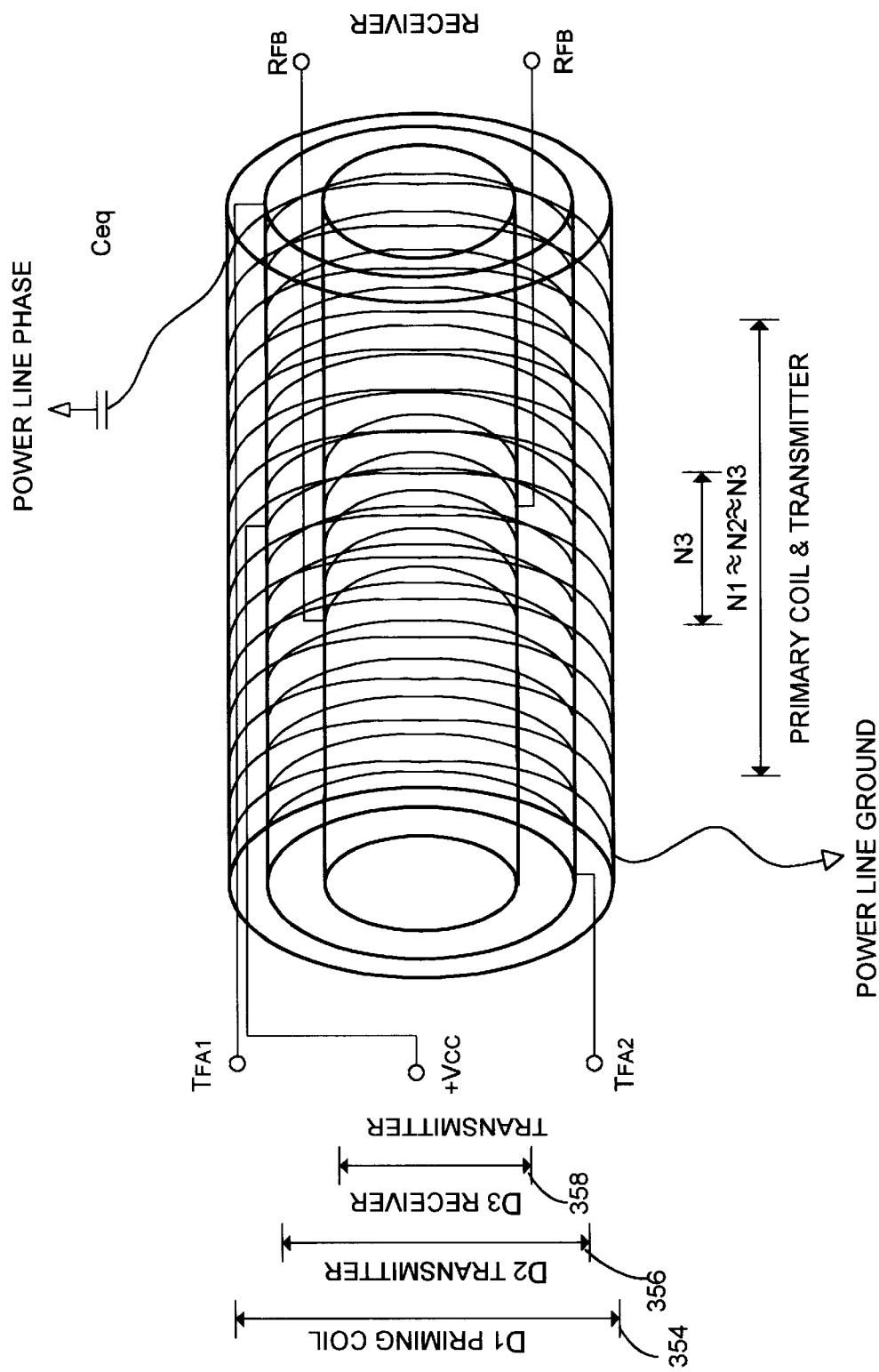
FIG. 21 illustrates a half duplexing coupler in accordance with the present invention for data communications through distribution transformers.

FIG. 21 illustrates a half-duplex coupler for data communication through the high voltage side of distribution transformers. In this system two or three solenoids (air-coils) having two or three different diameters are utilized. The diameter of outer coil 354 is 6.0 cm, #26 gauge magnet wire, the middle 356 is 4–8 cm, #20 gauge magnet wire and the smallest 358 is 4.2 cm, #22 gauge, magnet wire. The largest diameter outer coil 354 is the primary which resonates with the capacitor, the middle is the transmitter and/or receiver coil 356 and the smallest is the receiver coil 358 (if it is needed). For reception, the transmitter coil must be uncoupled. In order to have transmission, the receiver coil is uncoupled.

On the low power side of the power line distribution transformer corresponding to the 120, 240 and 480 V power lines, the system can be configured to use the same carrier frequency, with one coupler on the low voltage side (i.e. a single primary and single secondary). (See FIG. 39). The transformer is coupled to 66 nanofarad capacitors—500 VAC)—In this situation, the primary coil 338 has a diameter of 2.7 cm using #24 gauge magnet wire with the secondary coil 340 having a diameter of 2.2 cm using #26 gauge magnet wire. The transmitter and receiver do not contain a ferrite transformer. It is also possible that no receiver will be needed. Theoretically, a real time 4800 baud can be achieved through power line transformers over long distances. It is to be appreciated that the couplers of the present invention will permit more than one carrier frequency to be simultaneously transmitted through the same power line.

B. Transmitter and Receiver Devices

Figure 26:
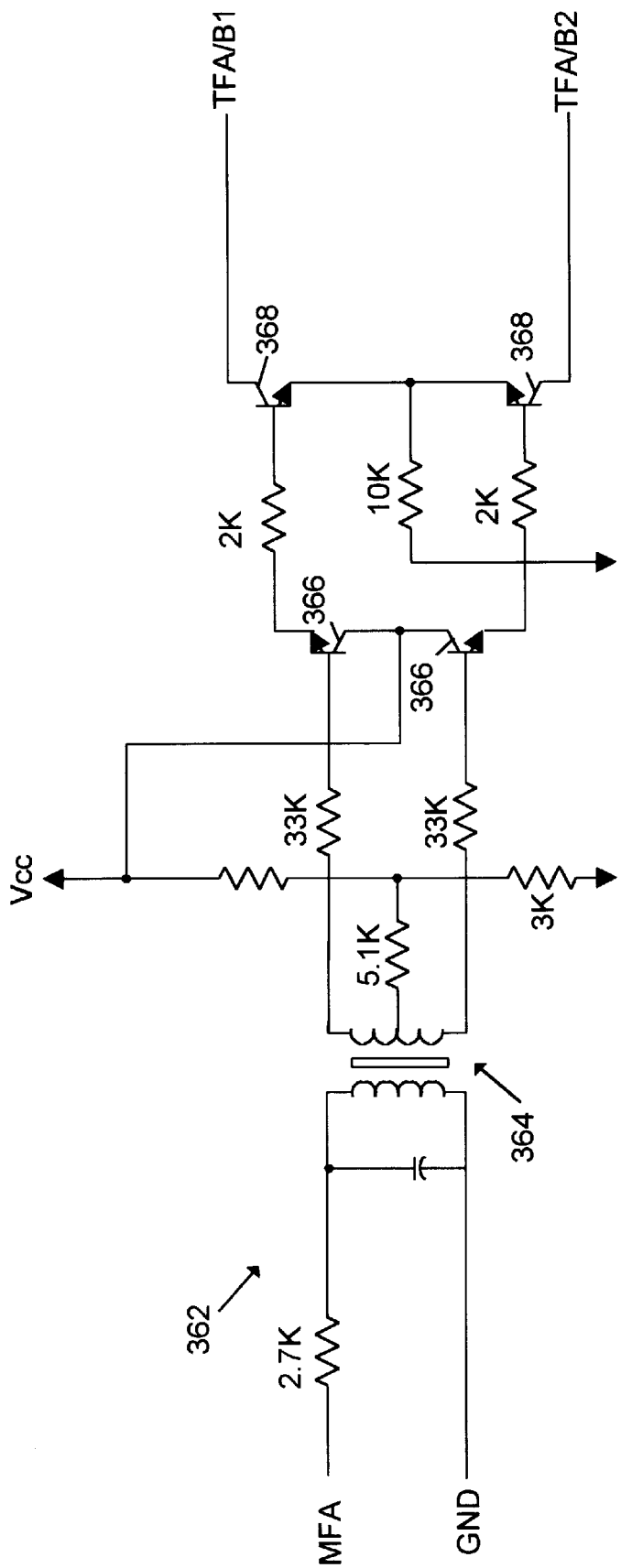
FIG. 26 is a schematic diagram of a transmitter means used in the present invention.
Figure 32:
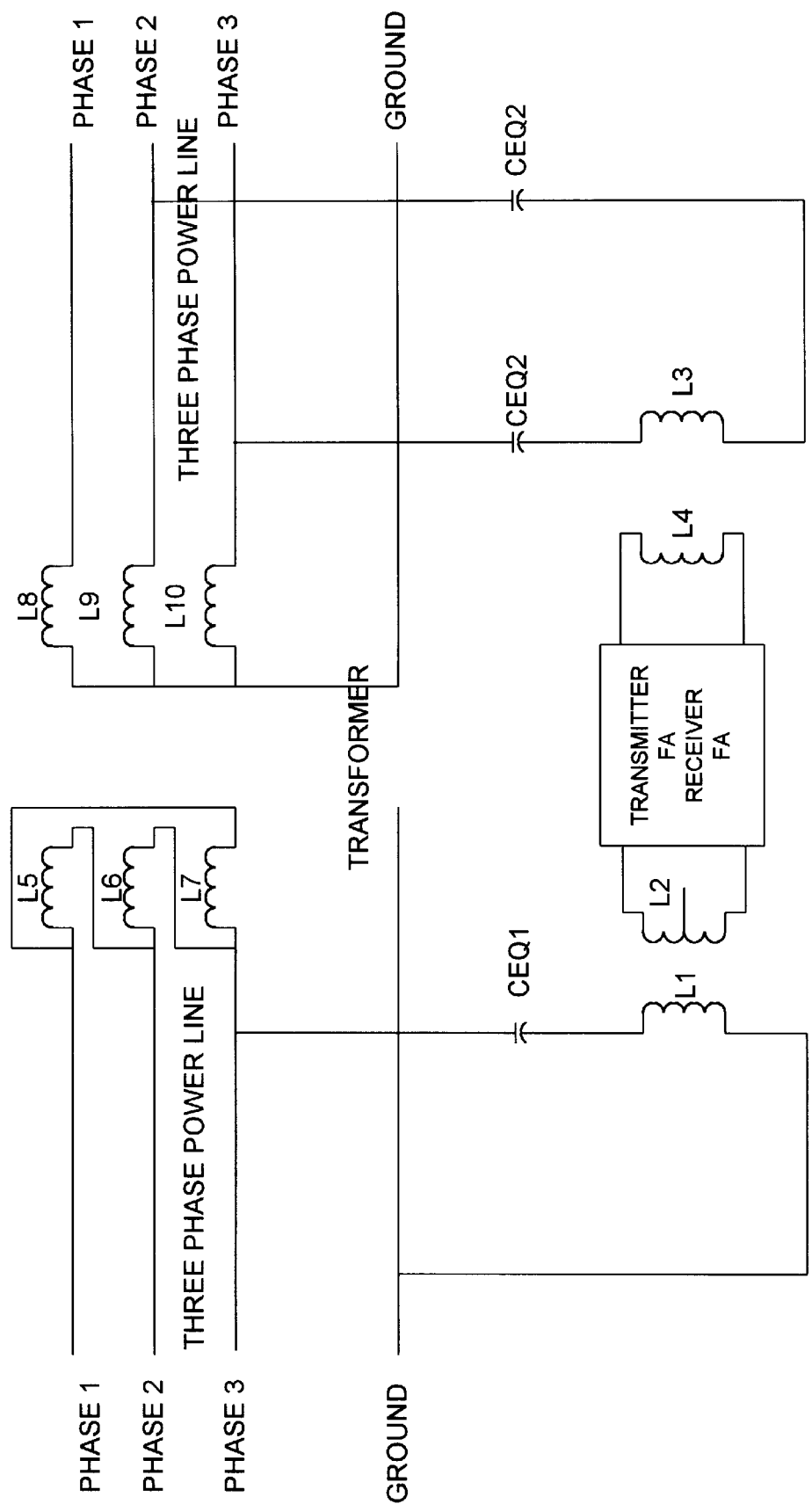
FIG. 32 shows a three phase transformer coupling of the type predominantly used in Europe.

The preferred transmitter 316, 324 useful in the power line communication of data signals over long distances is shown in FIG. 26. This transmitter can be utilized in all of the applications of the present invention, including transmission through power line transformers. The transmitter means generally comprises a driver 362 which is connected to the coupling means 314, 322 by way of their respective connections TFA/B1, TFA/B2. Because of its use of a magnetic coil 364 and transistors 366, 368, the transmitter 316 while comparatively slow, is especially useful over high voltage power lines. Suitable transistors 366 for this transmitter are conventional SK 3444, while the transistors 368 may suitably, comprise conventional SK3024. For higher power transmission, 2N3055 transistors may be utilized instead of SK3024. The particular value of each resistor and capacitor shown in FIG. 26 will depend upon the specific operating characteristics of the driver but they would be readily ascertainable without undue experimentation by one of ordinary skill in the art of electronics. Nevertheless, exemplary values of the resistors and capacitors are shown in FIG. 32. It Is also understood that without a ferrite transformer, this modified transmitter is able to transmit at a high communication speed.

Figure 27:
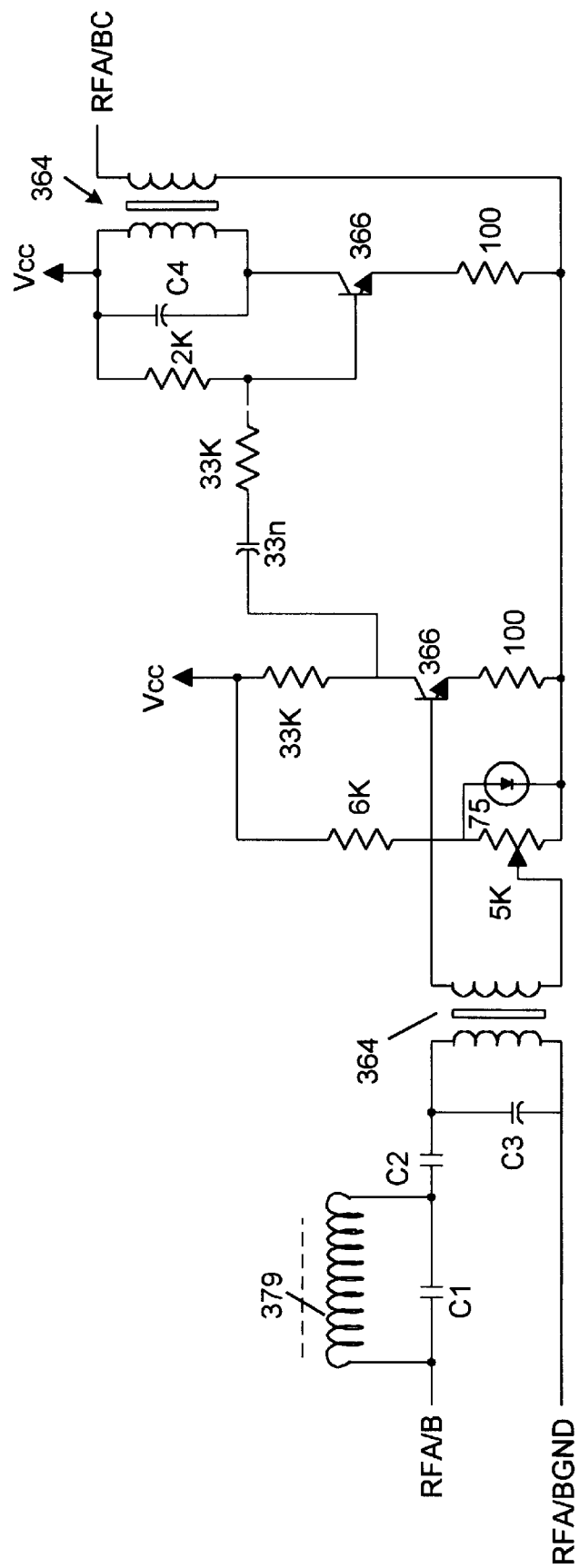
FIG. 27 is a schematic diagram of receiver means used in conjunction with the transmitter means shown in FIG. 26, in the power-line communication of data signals over long distances.

The preferred receiver means 318, 326 which is useful in the power line communications of data signals over long distances is shown in FIG. 27. The receiver means 318, 326 is similarly connected to the coupling means 314, 322 by way of their respective connections RFA/B, RFA/BGND and RFA/BC. It will be readily apparent that the receiver means 318, 326 is more successful at attenuating out of band noise especially on high voltage power lines. Suitable transistors 366 are also conventional SK3444. The particular value for each resistor and capacitor shown in FIG. 27 would depend upon specific operating characteristics off the receiver 318, but they would be readily ascertainable without undue experimentation by one of ordinary skill in the art off electronics. Nevertheless, exemplary values off the resistors and capacitors are shown in FIG. 27. A key feature off the receiver off FIG. 27 is the inclusion of potentiometer 375 with which the bandpass filter receiver bandwidth can be changed. Another feature is the notch filter 379 coupled to magnetic coil 364 (band pass filter) which filters out transmission frequencies on the same side.

Figure 28:
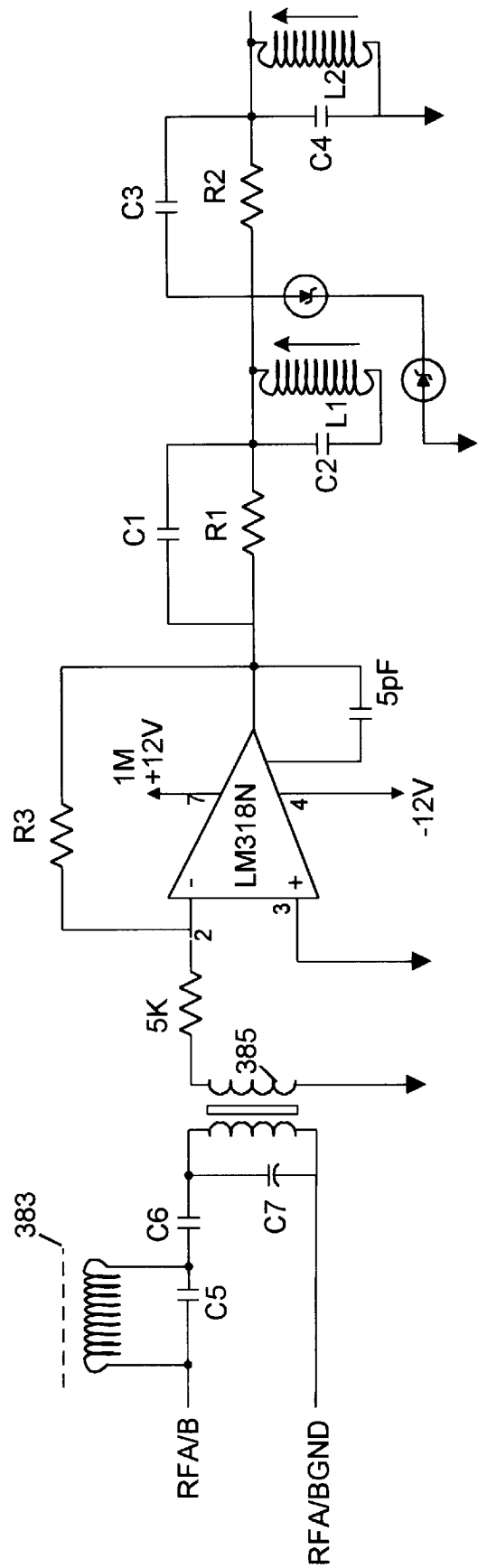
FIG. 28 is a schematic diagram of a receiver which can be used for high speed communications.

FIG. 28 shows an additional receiver 318', 326' which can be utilized between 120 V and 240 V including FSK, and which is particularly suited for low voltage LAN communications. In this receiver, C1 and R1 are used for F1; and C3 and R2 are used for F2 in a high pass configuration. In a low pass configuration, C2 and L1 are used for F1 and C4 and L1 are used for F2. The receiver further utilizes a notch filter 383 coupled to band pass filter 385 which filters out transmission frequencies. It is also appreciated that using no receiver or a modified receiver which does not contain a ferrite transformer the communication speed can be significantly increased.

C. Modulator/Demodulator Circuits

Figure 22:
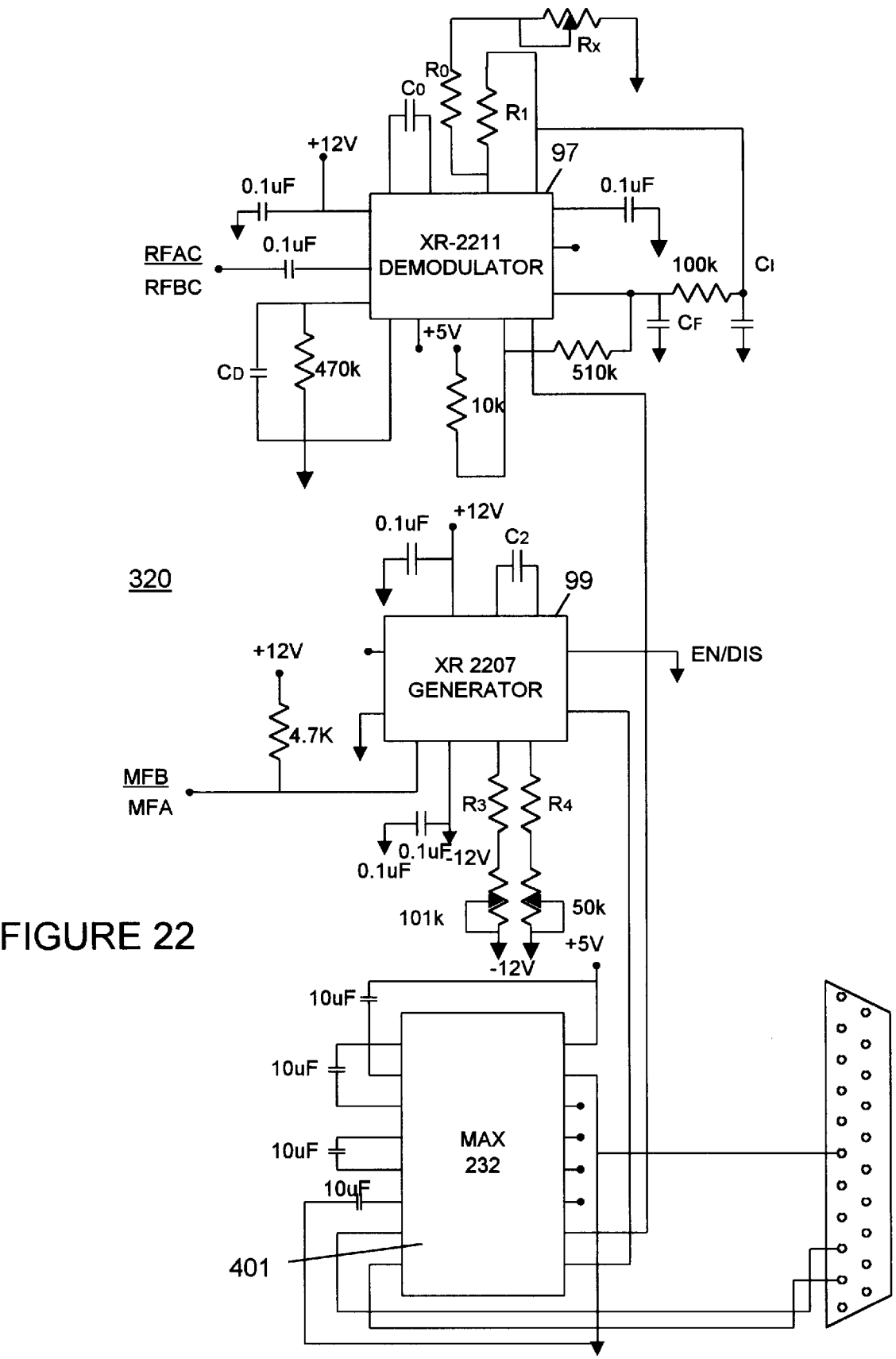
FIG. 22 is a schematic diagram corresponding to the modulator FA/demodulator FB shown in FIG. 15.

The modulation and demodulation of the data signals is now described with reference to FIGS. 22 and 23. FIG. 22 illustrates an FM modulator and demodulator 320. This circuit is particularly applicable for high voltage communication and particularly high voltage communication through power line transformers. The circuit comprises an XR-2211 FSK demodulator 397 XR-2207 FSK generator 399 and MAX232 computer input/output interface 401. The values for R0, C0, C1, C2, C3 and C4 are utilized to alter the carrier frequencies (FA and FB). The values of C1, R3 and R4 are varied to alter the FA and FB carrier frequencies.

Figure 23:
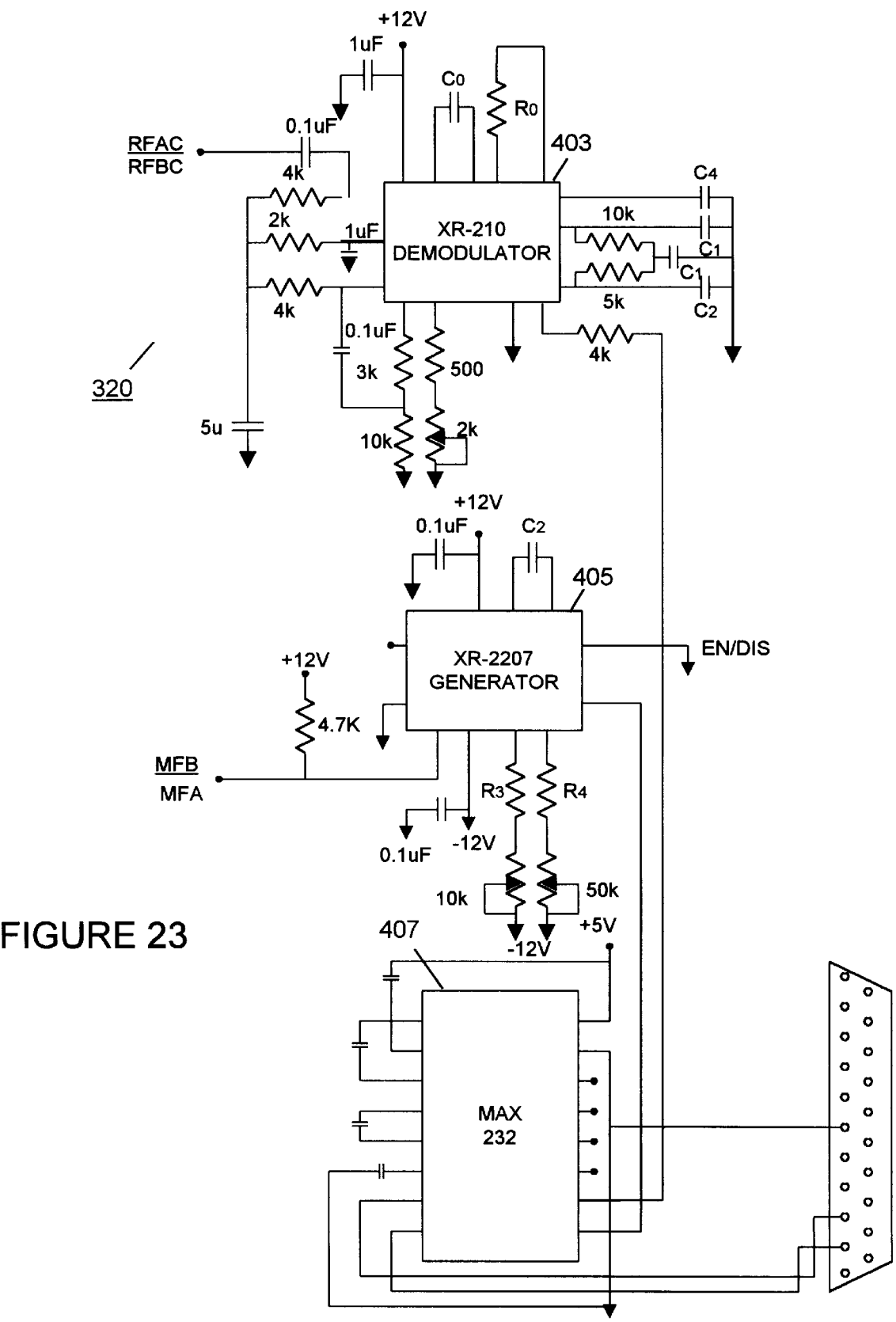
FIG. 23 is a schematic diagram of an alternative modulator FA/demodulator FB for the system in FIG. 15.

FIG. 23 illustrates an alternative FM modulator and demodulator 320' for high frequency communication for LAN and phone line communication. The circuit incorporates the XR-210 FSK demodulator 403, XR-2207 FSK generator 405 and MAX232 computer input/output interface 407. The values for R0, C0, C1, C2, C3 and C4 are utilized to alter the carrier frequencies (FA and FB). The values of C1, R3 and R4 are varied to alter the FA and FB carrier frequencies.

Figure 24:
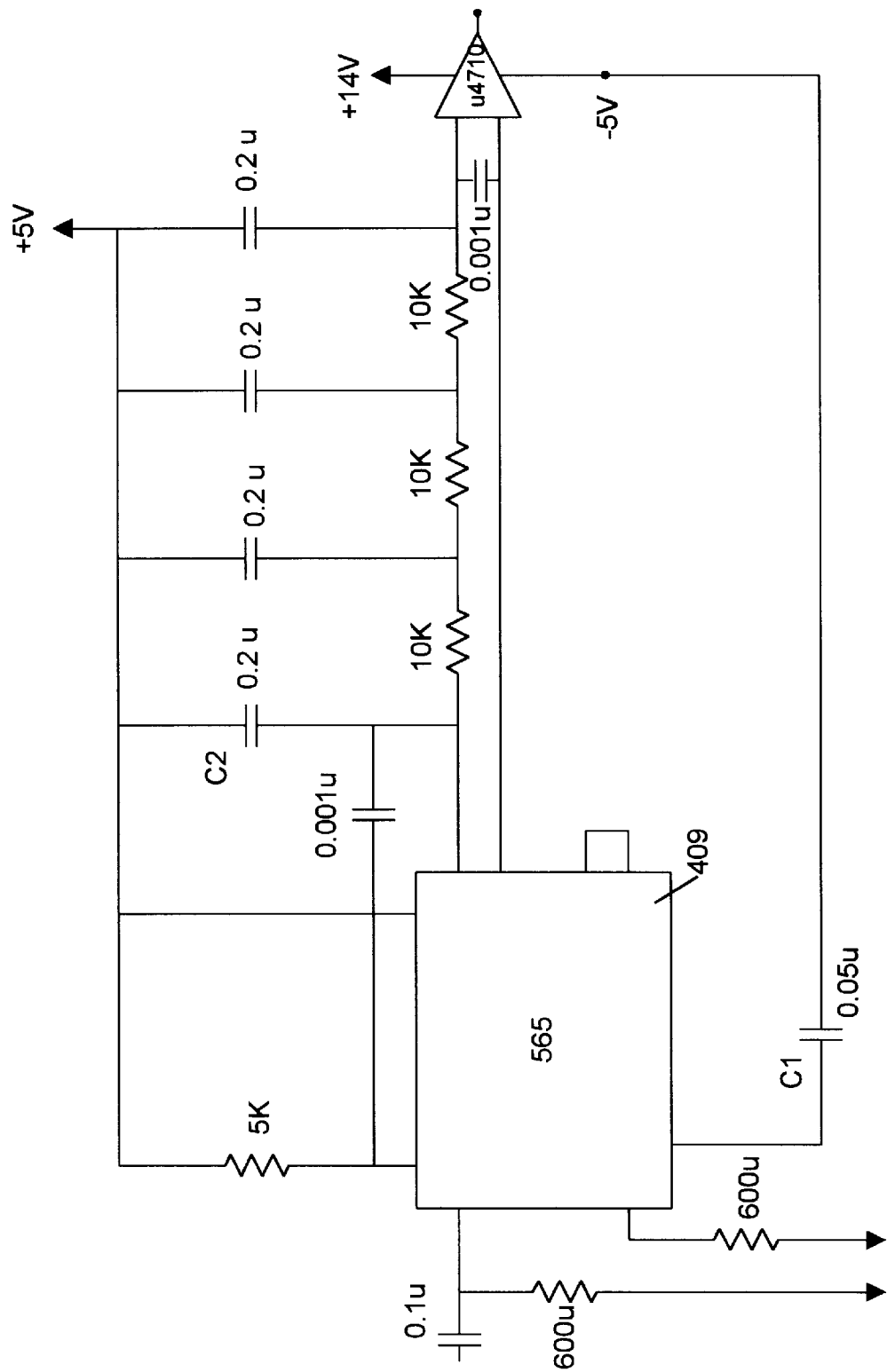
FIG. 24 is an FSK decoder phase lock loop which can function as the modulator/demodulator circuit of FIG. 15.
Figure 25:
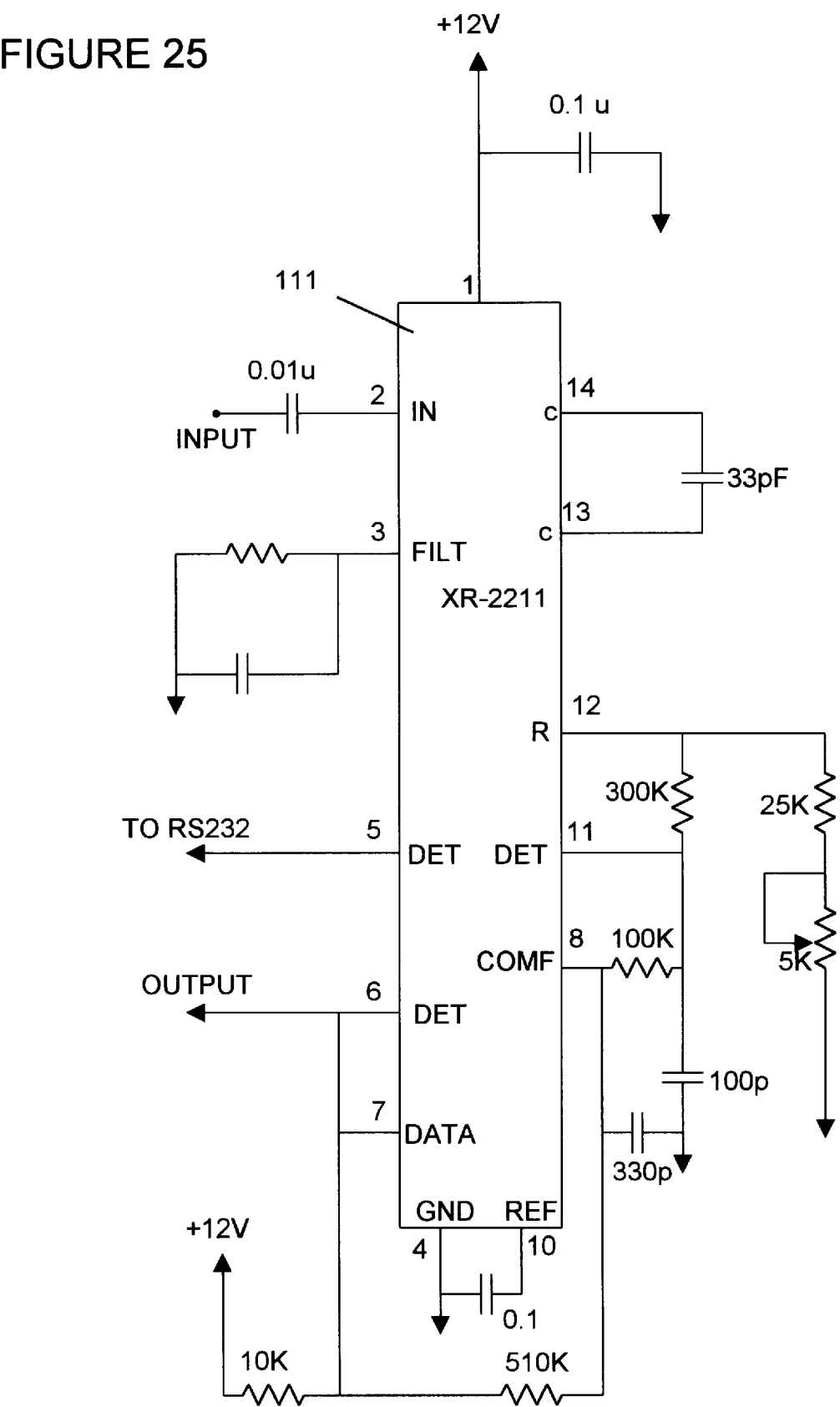
FIG. 25 is the primary phase lock loop of FIG. 22.

FIGS. 31C and 31D illustrate additional modulator/demodulator circuits 320", 320'" which can be utilized in the present invention. FIG. 24 shows an FSK decoder using the 565 interface 409. The loop filter capacitor is chosen to set the proper overshoot on the output and a three-stage RC ladder filter is used to remove the noise frequency component. As shown in FIG. 25, another FSK chip, the XR2211 411 can be used to demodulate and the XR2207 (not shown) can be used for modulation.

MODEM CIRCUITS

Figure 34:
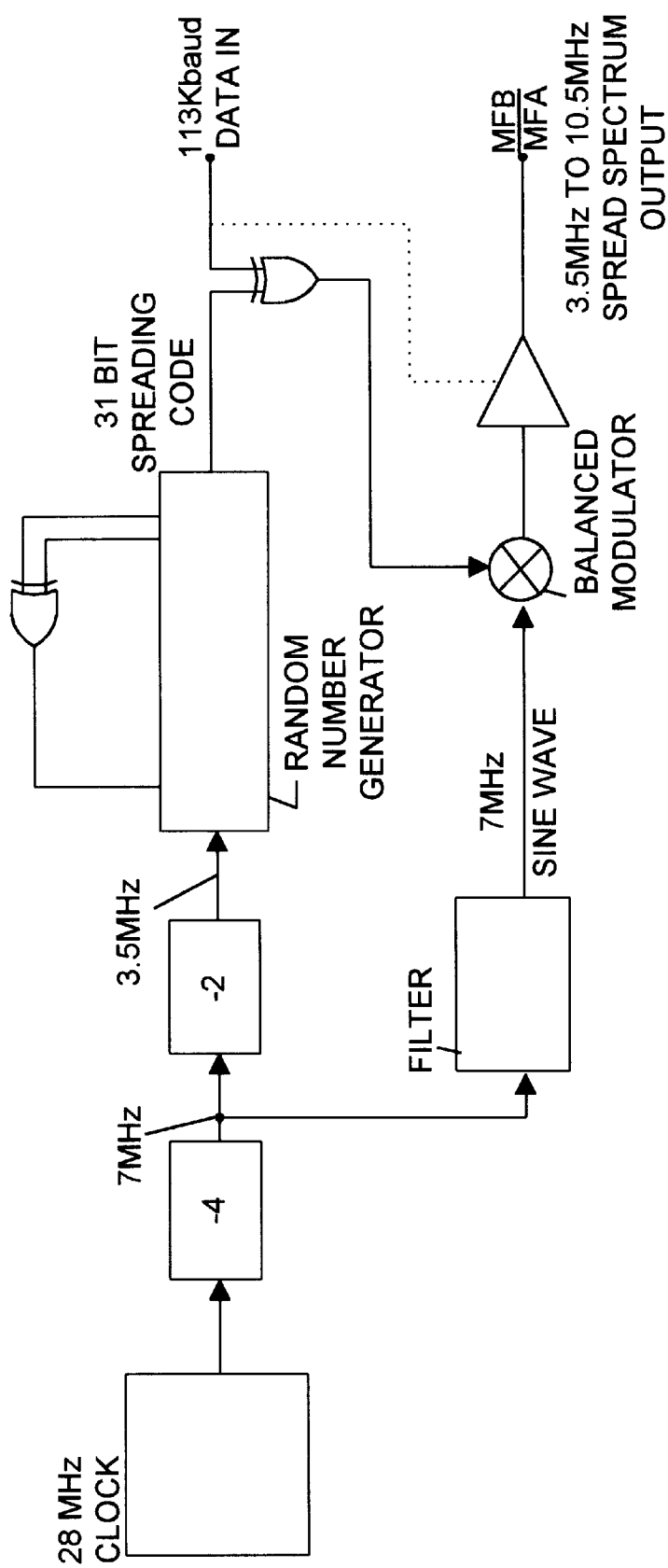
FIGS. 34 and 35 show a spread spectrum transmitter/receiver in accordance with the present invention which is particularly applicable for communication in between noise.
Figure 35:
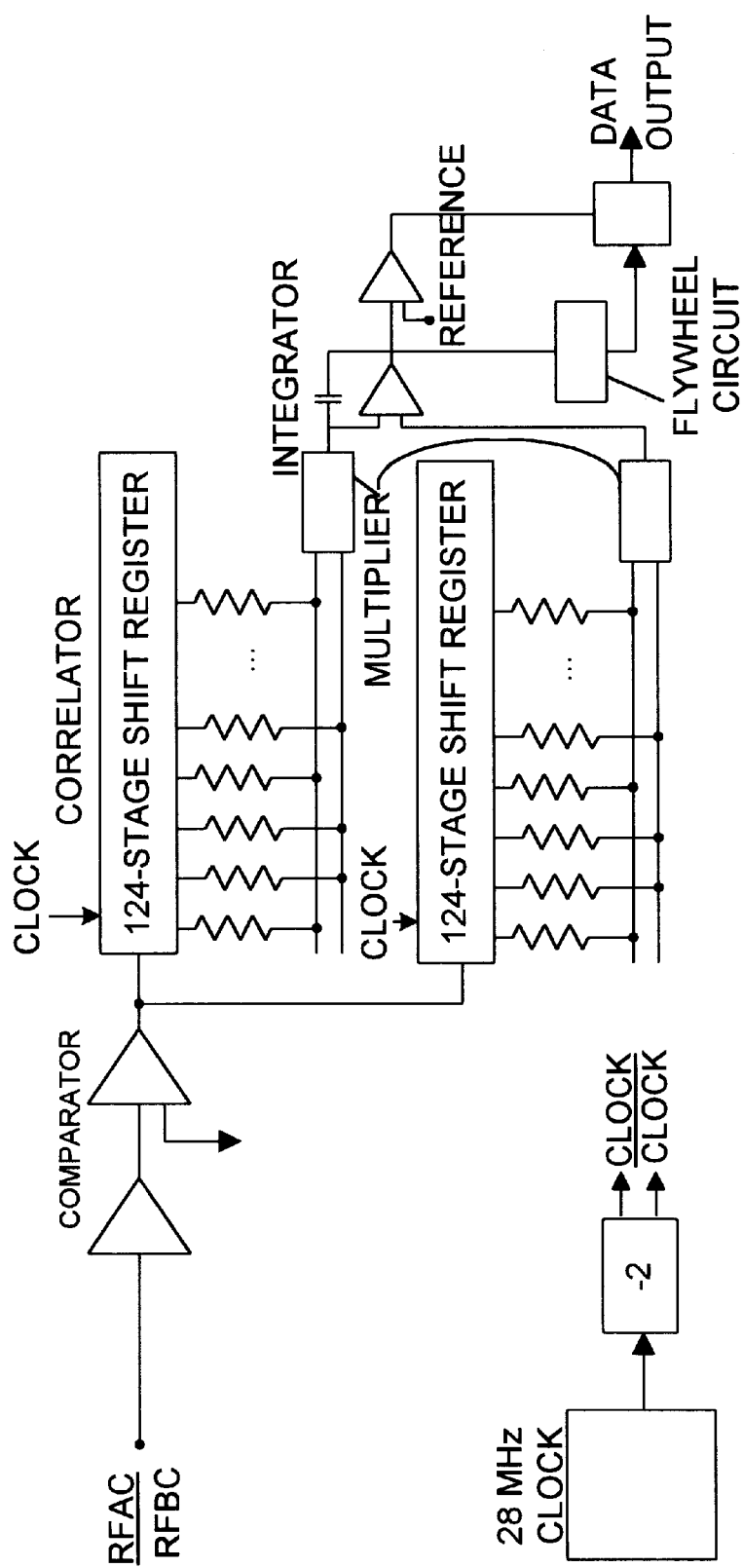
Figure 36:
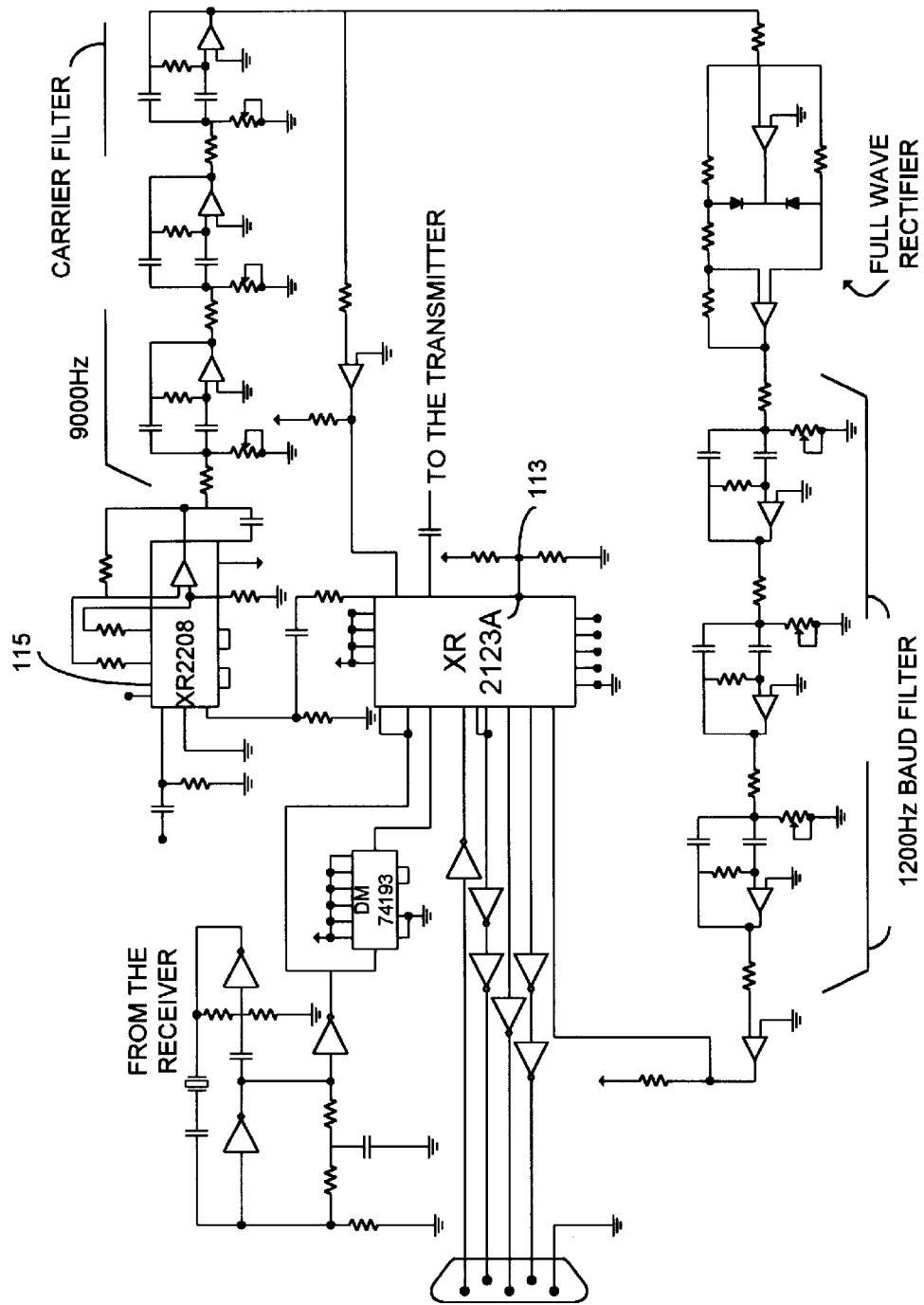
FIG. 36 phase shift keying modulator/demodulator which can be utilized with the present invention.

FIGS. 34 and 36 illustrate two complete modem configurations which can be utilized in the present invention. FIGS. 34 and 35 is a spread spectrum transmission and receiver modem. This circuit is suited for communication through high voltage AC and DC power lines and for communication through transformers. The spread spectrum modem can be used for error free communication over long distances.

FIG. 36 illustrates a phase shift keying transceiver modem circuit particularly applicable for phone line and LAN communication. This circuit includes an XR2123 modulator/demodulator 433, XR2208 Operation Multiplier 415, and DM74193 synchronous up/down counter 417. This circuit requires a smaller bandwidth for communication than FSK because it uses only one carrier frequency while changing sine and cosine waves. The carrier frequency must always be at least 10 dB above the noise.

OPERATIONAL EXAMPLE

The particular attributes of the apparatus and configurations of the present invention are perhaps best illustrated in view of the following comprehensive example described with reference to FIGS. 39–43. This example utilizes most of the coupler configurations and modems discussed above and illustrates how the communications apparatus and novel couplers of the present invention can be utilized in a comprehensive system using LAN, phone line, high voltage and low voltage power line communications, as well as communication through power line transformers.

FIG. 39 illustrates an example of the couplers of the present invention as they may be utilized by an electric power public utility for reading home power meters. In this example, each house 419 receiving electric power from utility would have a modem 421 and air coil transmitter and receiver coupler circuit 423 in accordance with the present invention coupled to the electricity meter 425. The coupler 323 would connect to the 240 low volt distribution transformer 426, via low voltage lines, situated on the utility pole 427 located adjacent to the house 419. The couplers will have the low voltage configuration which is capable of communicating through power line transformers such as discussed in section A.3. above. The system will utilize the transmitters, receivers, modulators/demodulators, or modem circuits disclosed in FIGS. 22, 26 and 27. The distribution transformer will be connected to one of the three 13.2 KV power lines 429 on the utility pole 427.

At the other end of the system situated at a local substation 431, a second substation modem 433 is connected to one of three couplers 435 in accordance with the present invention. The couplers are encased in resin, as disclosed above, and will preferably have the high voltage side transformer configuration set for the in FIG. 21. The substation 433 is itself connected via couplers 437 Such as disclosed in section A.11 to the large central computer 439 of the utility (generally a VAX) via phone lines. The substation 431 and computer 439 will communicate over the power or phone line at rates up to 10 K baud as set forth herein using the high speed couplers and the appropriate high speed modems.

When the utility desires to make a meter reading, the central computer 439 will issue an addressable command which is transmitted via a master modem 441 and coupler 437 to the particular substation at speeds up to 10 K baud over power or conventional phone lines 438. The substation will then transmit an addressable command to a particular meter via modem and couplers. The command is transmitted over the 13.2 KV line at speeds up to 1200 baud, through the distribution transformer, through the home couplers 423 and modern 421. A meter reading is recorded, transmitted by the home modem 421 through couplers 423, through distribution transformer 426, over the 13.2 KV power line 429 to the appropriate substation coupler 435 and to the substation modem 433. The system only requires between one and ten watts for power transmission in both directions.

Figure 40:
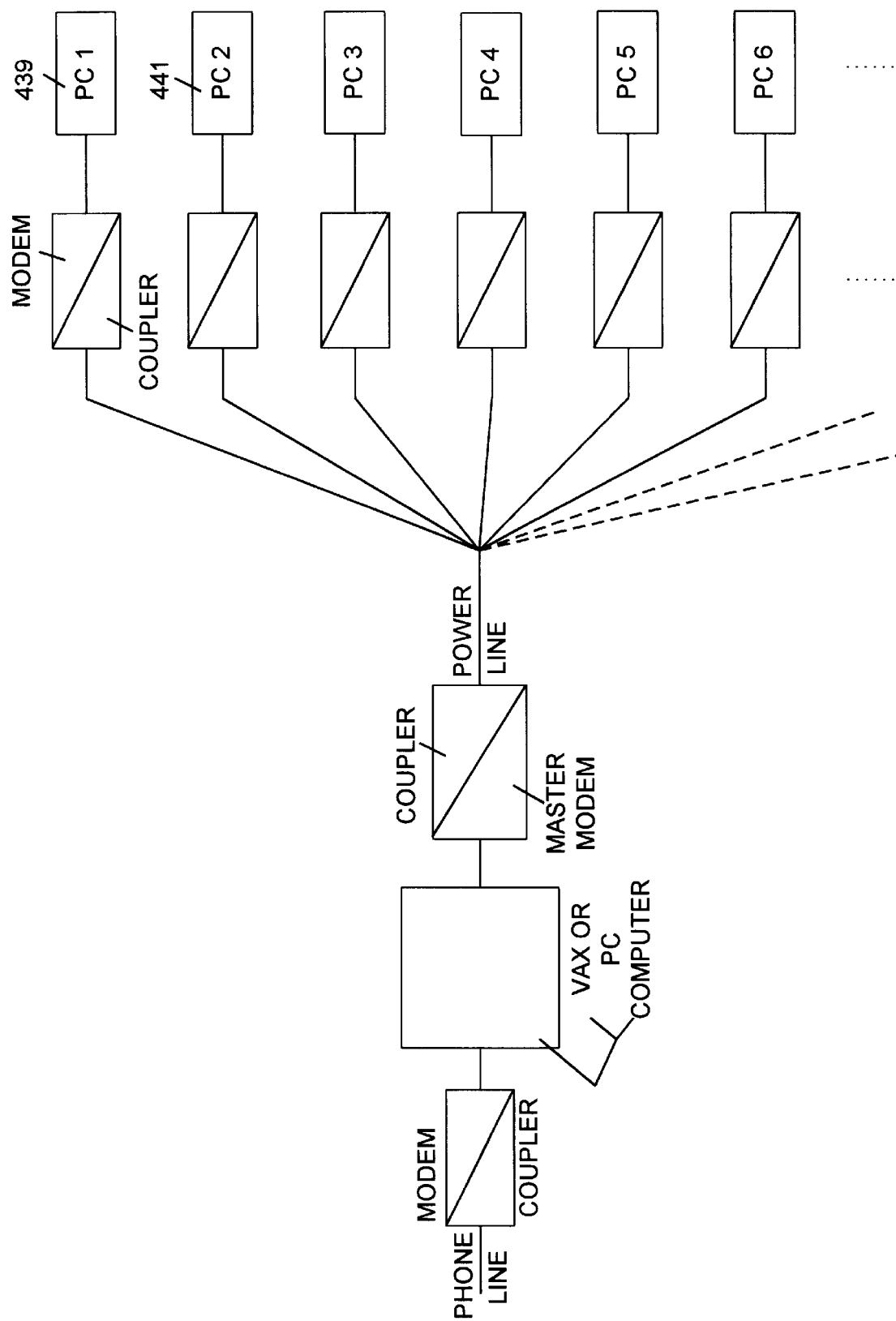
FIG. 40 is a block diagram illustrating the use of the couplers of the present invention within a LAN linked by power lines or conventional phone lines.

From the substation, the meter reading may be transmitted via conventional phone lines 438 to the central computer 439. Additionally, as shown in FIG. 40, the high speed LAN couplers of the present invention could be used within the utility to connect local workstations to the central computer 439. For example, a clerical worker situated at a work station may access the VAX computer through the power lines of the facility via modems and high speed LAN or phone line couplers of the present invention at data transmission speeds of up to 10 Kbaud.

FIG. 41 is a block diagram of an expanded system which may be utilized by a public utility to meter a multiplicity of substations. In this embodiment the central computer would simultaneously read a large number of meters via a master modem and multiplexer coupled to a multiplicity of couplers 443. As shown, the computer communicates with each substation (1, 2, 3, etc.) over conventional phone lines. The respective substations then communicate with the individual meters at 1200 baud via high voltage distribution line and through distribution transformers.

Figure 42:
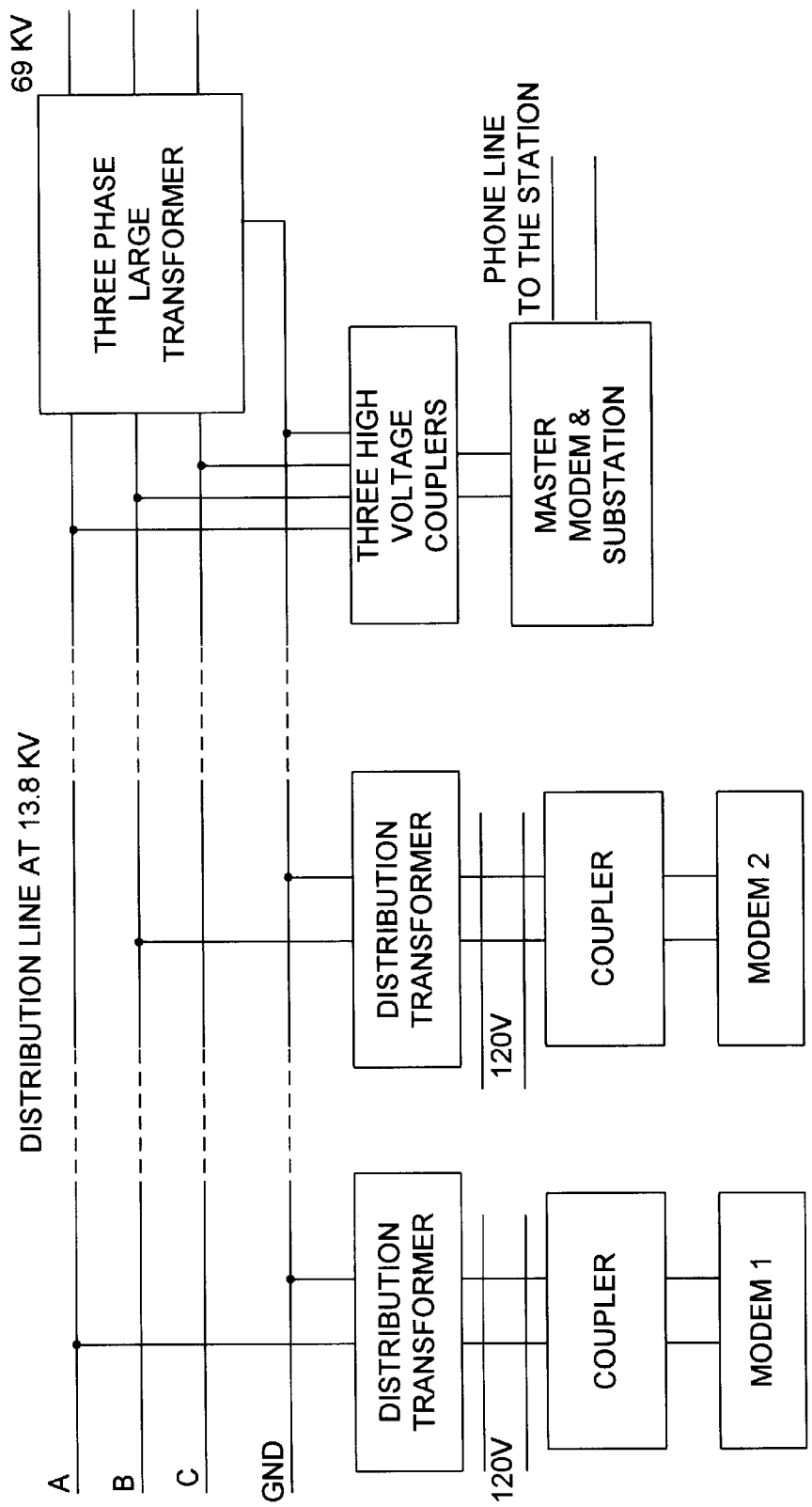
FIG. 42 is a simplified block diagram of the system of FIG. 36.
Figure 43:
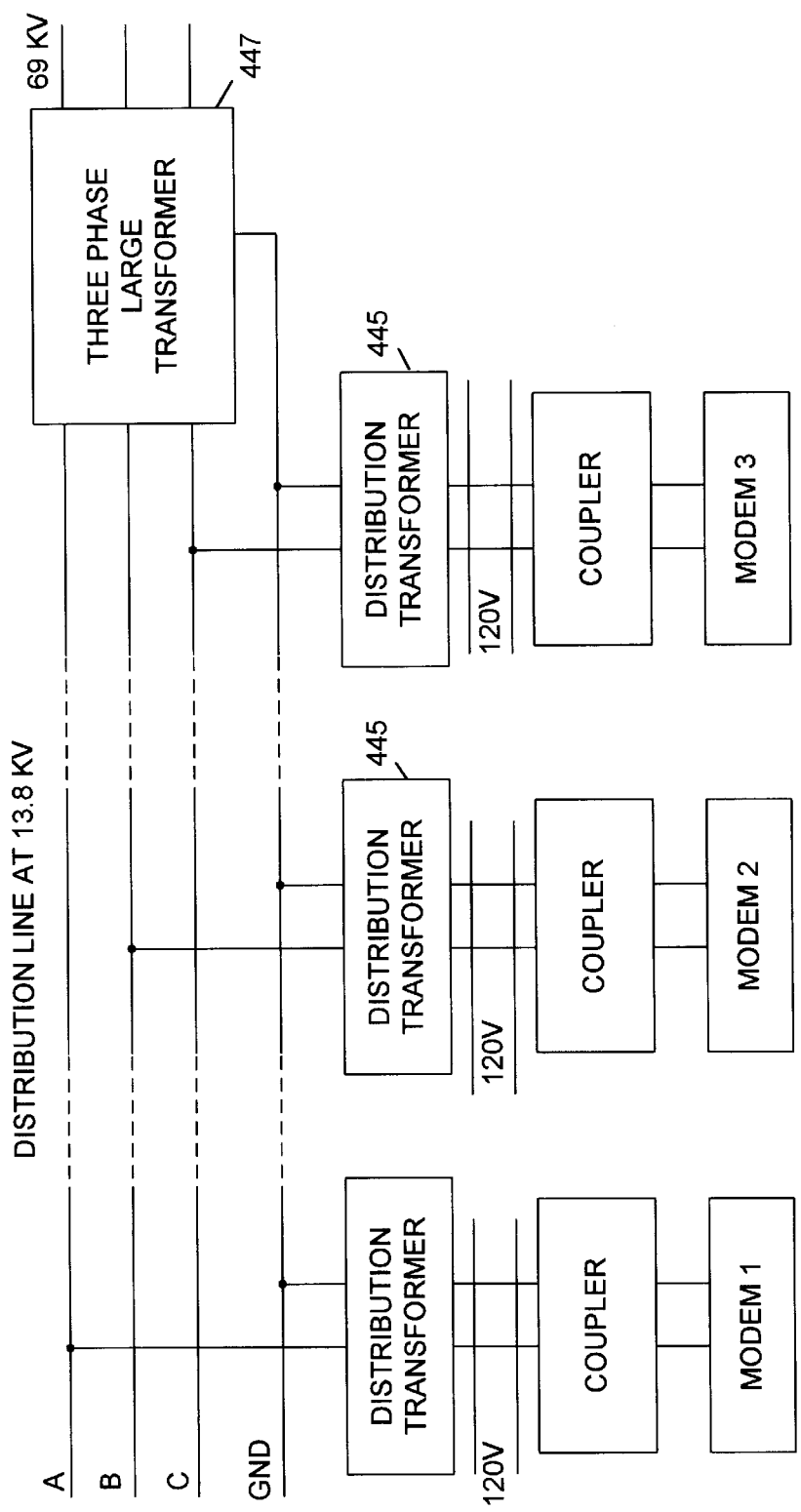
FIG. 43 is a block diagram of a power line communication system.

FIG. 42 is a simplified block diagram of the communication system of FIG. 39. FIG. 43 is a block diagram of how the couplers of the present invention can be utilized to communicate through two power line transformers 445 and through a three phase large transformer 447. In this configuration, the couplers will comprise low voltage couplers designed for communication through power line transformers as discussed above. It is to be noted that the couplers of the present invention will permit the simultaneous transmission and reception of more than one carrier frequency through the couplers. Hence, the couplers can be simultaneously utilized by an electric public utility for electric meter reading at a first frequency while a public water utility utilizes the couplers at a second carrier frequency for water meter reading.

Figure 29:
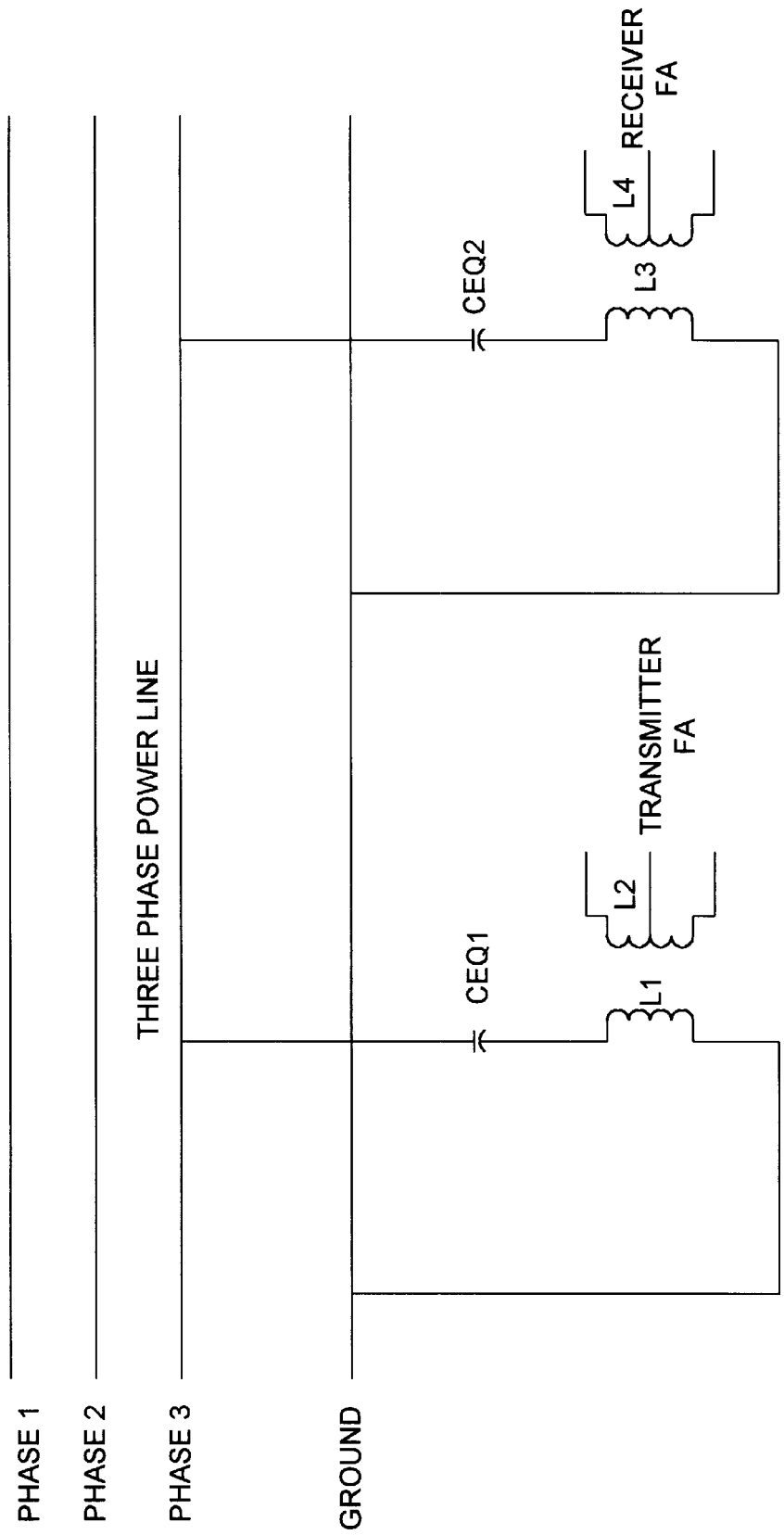
FIG. 29 is a schematic representation of a coupling for the power line from phase to ground.
Figure 31:
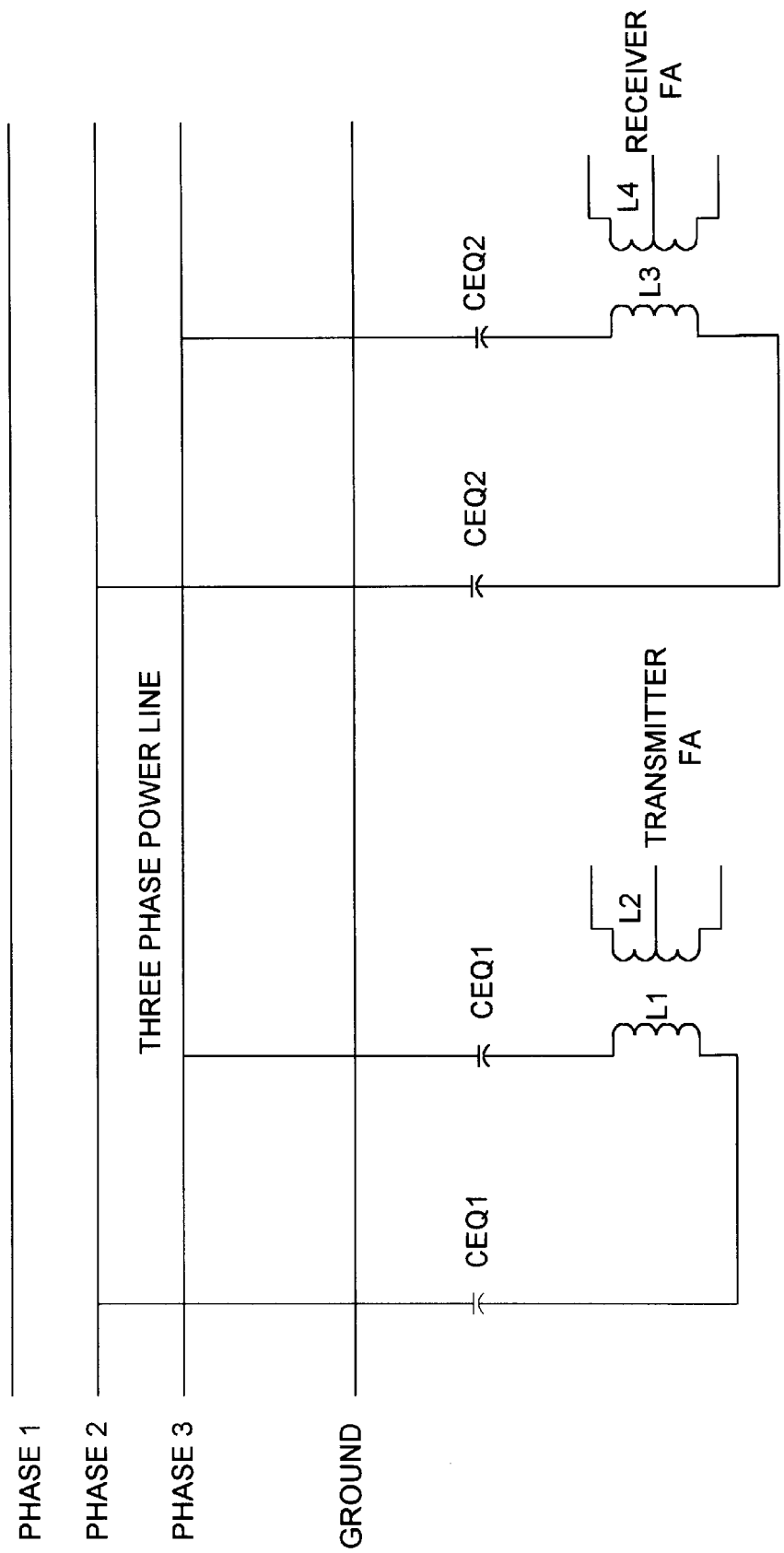
FIG. 31 illustrates a two phase coupling connection to the power line, phase to phase.

A final consideration of the present invention is the connection of the apparatus to a three phase power line. FIG. 29 illustrates the general case of coupling the apparatus to the power line, phase to ground. In this format, the carrier frequency is undetectable by other phase-ground coupling connections and each phase is isolated from each other for communication purposes. FIG. 30 illustrates a special three phase coupling connection to the power line, 3 phases to ground. This system utilizes all three phases from the power line and ground for communication. In this case, the carrier frequency is detectable on any phase-ground coupling connection. In this manner, the phases are interconnected for communicating purposes. FIG. 31 illustrates a special two phase coupling connection to the power line, phase to phase 447. This system utilizes two phases from the power line for communication. The carrier frequency is detectable only on the two phase coupling connection. In this configuration, only the coupled two phases are connected from communication purposes.

Figure 33:
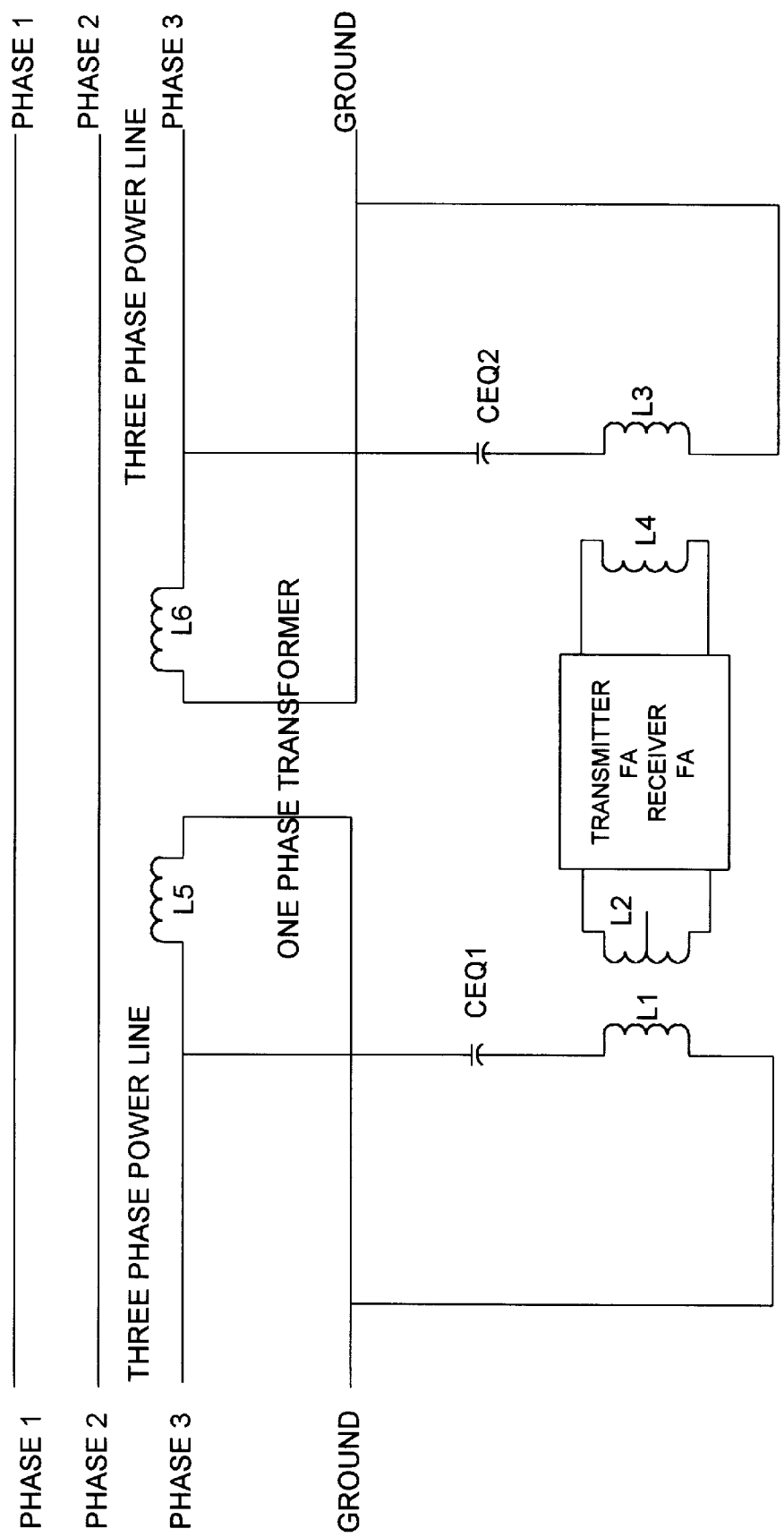
FIG. 33 shows a one phase transformer coupling of the type generally used in the United States.

FIG. 32 illustrates a three phase transformer coupling around delta and Y (Wye) transformers 449. This coupling system is generally utilized in Europe. The carrier frequency is detectable on the other power line. In this manner, two different high voltage power lines are connected to each other for communication purposes. Finally, FIG. 33 illustrates a one phase transformer coupling which is generally used in the U.S.A. In this manner, the carrier frequency is detectable on the other power line. Accordingly, two different high voltage power lines are connected to each other for communication purposes.

DETAILED DESCRIPTION OF THE PRESENT INVENTION

Figure 1:
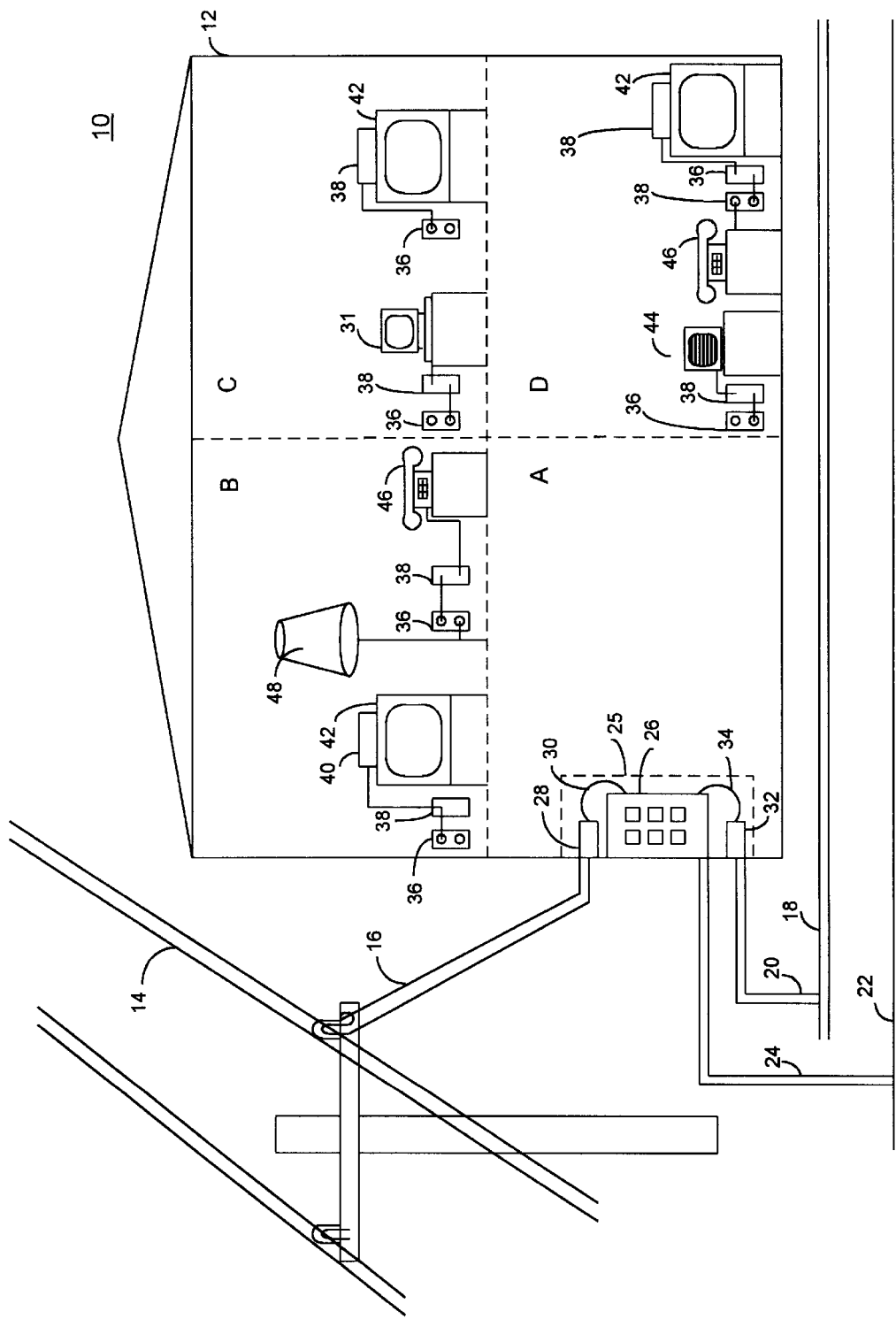
FIG. 1 shows a communication network in accordance with the present invention installed in a customer premises.

There is shown in FIG. 1 an exemplary communication network 10 operating in a house 12. Communication network 10 is constructed in accordance with the present invention. House (customer premises) 12 is shown connected to telephone line 14, video transmission line 18 (such as a cable television line) and AC power line 22. House 12 can be any building serving as a customer premises, such as an office building, storefront, residential home, etc.. Telephone line 14 and video line 18 are examples of information signal lines which carry selectable information signals. Other types of information lines include those previously discussed, as well as others which carry voice, video and or data information signals. It will be understood by those skilled in the art that cable television systems are a common form of video communication systems, but are not the only type of video communication systems with which the present invention may be practiced. Cable television systems are used as an example of a video communication system in this specification.

The selectable information signals on telephone line 14 are the separate telephone lines which may enter a house 12. Most homes have at least one telephone line. It is very common to have more than one telephone line to cover needs for both voice and data communication, for example. Each telephone line must be separately selectable. For home use, the selection of multiple lines is typically handled by a multi line telephone. A multi line telephone usually has several jacks, one for each line that the multi line telephone can handle. It may also have a single multi line jack, able to handle two, three or four lines, depending upon whether it accepts a two, three or four pair telephone jack. In an office setting, a telephone PBX system may handle the selection of multiple lines digitally. In either case, a physical device is used to select one or more lines (for conferencing) for operation at a particular location and time.

The selectable information signals of video line 18 are the video channels which can be individually tuned by either a video receiver. Using the example of cable television systems, the selectable information signals are the cable television channels and the video receiver is a cable-capable television set or a separate cable television tuner. It is not uncommon to have upwards of fifty selectable cable television stations accessible by a customer of a local cable television system. Recently, there has been a great deal of publicity concerning the possibility of increasing the number of accessible cable stations to more than five hundred at a given customer premises. Each of these television stations must be capable of being separately selected. Also, some of these stations, even in present cable television systems are called "pay-per-view", typically requiring the customer to either order a show, movie, or other event by a personal telephone call or an automatic-telephone call through the cable television tuner provided by the local cable television company.

In another embodiment of the present invention, video line 18 may be connected to a satellite dish )or other antenna) instead of to a local cable television system or other direct wired video service. The satellite dish would serve the same purpose as the local cable television system, namely providing access to a multitude of television channels.

Interactive television systems send signals directly over the cable to the cable television company without using the telephone lines. Interactive television would open up the possibility for communication with facilities such as libraries and schools.

Telephone line 14 is connected to house 12 via telephone tapping line 16. Video line 18 is connected to house 12 via cable tapping line 20. AC power line 22 is connected to house 12 via AC tapping line 24. Each of the three tapping lines is connected to house 12 at a distribution panel 25. Distribution panel 25 consists of a circuit breaker or fuse box 26 and at least one signal selector, such as telephone signal selector 28 and video signal selector 32. Circuit breaker or fuse box 26 could also include (or be substituted by) a telephone punch down block or series of coaxial cable line splitters, depending upon the particular installation and cabling over which the selectable information signals are transmitted throughout house 12.

In FIG. 1 telephone signal selector 28 is connected to circuit breaker box 26 via connection 30. Telephone signal selector 28 is designed to access several telephone lines and allow access to these telephone lines by devices capable of telephone line communication, such as telephones, located throughout house 12. Telephone signal selector 28 is similar in function to a multi line telephone or PBX system in selecting a telephone line(s).

Video signal selector 32 functions in a similar manner to that of telephone signal selector 28, except instead of selecting a telephone line, video signal selector 32 is designed to tune a cable television station. Video signal selector 32 is connected to circuit breaker box 26 via connection 34.

As circuit breaker box 26 is the working circuit breaker box for house 12, AC power via tapping line 24 is also connected to circuit breaker box 26. As described in Applicant's co-pending applications attached hereto in Appendices A and B, the selectable information signals used by various devices located throughout house 12 communicate over the standard AC electrical wiring (not shown) which exists in a house or building wired for AC electrical power. Both selectable information signals and AC power can be accessed at any AC outlet located in house 12. The actual wiring of a house such as house 12, is understood by those skilled in the art.

The selectable information signals and AC electrical power is shown entering house 12 in room A. Typically, these electrical lines enter a house in the basement and/or garage. Various devices using the information signal lines and power lines are shown in rooms B, C and D of house 12.

In room B, a television set 42 and cable television tuner 40 are shown. Although a separate cable television tuner 40 is shown, it should be understood that many cable television systems allow cable-ready televisions to operate without the need for an external tuner. Certain services, however, such as pay-per-view, typically require a separate cable television tuner, such as cable television tuner 40. These special tuners are designed to communicate with the local cable television system via telephone line for pay-per-view programming. Cable television tuner 40 constitutes a communication station of the present invention.

Cable television tuner 40 is connected to a power line coupler modem (PLCM) 38. PLCM 38 is used to communicate selectable information signals over the electrical wiring in house 12, between a communication station such as cable tuner 40 and a signal selector such as video signal selector 32. PLCM 38 is plugged into a wall outlet 36. Wall outlet 36 is a standard AC electrical outlet in the exemplary embodiment shown. Other electrical outlets could be used, depending upon the type of electrical wiring carrying the selectable information signals.

Using 16 Quadrature Amplitude Modulation (16 QAM) and/or 16 Phase Shift Keying (PSK) modulation formats, each video channel requires approximately 1.8 MHZ of bandwidth to achieve a data-flow rate of 6 Mbps. This is the data-flow rate which is necessary for video transmission. 14 channels can be selected in an exemplary embodiment of the present invention, using 1.8 MHZ of bandwidth per channel (plus 0.2 MHZ of bandwidth per channel for the channel selection control signal, equaling 2 MHZ total per channel) and a frequency range of 2–30 MHZ for video transmission (28 divided by 2 equals 14 channels). This requires individual communication stations to send a channel request signal to a separate tuner, such as video signal selector 32, which in turn, tunes the requested channel and transmits the selectable information signal (i.e., cable television channel signal) over the electrical wiring of a building such as house 12 at the frequency of the PLCM 38 of the requesting communication station.

A 200 KHz interactive reverse channel selection band is used to send the selection signal to video signal selector 32. This channel is capable of sending a 64–128 Kbps signal to video signal selector 32.

With different modulation formats and techniques or the addition of a greater frequency spectrum, it is possible for more than 14 channels to be transmitted in accordance with the present invention. 14 channels are used as an example in the embodiments described herein.

In another embodiment of the present invention, instead of using standard AC electrical wiring, existing telephone wire could be used for the transmission of selectable information signals between television tuner 40 and video signal selector 32. The present invention can use any electrical wiring for transmission of the selectable information signals. The ability to use any electrical wiring provides flexibility for users of the present communication network. A user is no longer limited to the particular outlet located in a particular position of a particular room. The user now has the flexibility to connect any sort of communication device to whatever outlet is available (AC electrical, telephone, cable, etc.) so long as the outlet in question is tied into a distribution panel such as distribution panel 25. Distribution panel 25 could have included a telephone punch-down block in place of or in addition to a circuit breaker box 26, for distributing information signals throughout house 12 using the telephone wiring. In this way, communication network 10 can be adapted to whatever wiring system is in place or which can be easily installed at a particular building or section of a building. Communication network 10 is not limited to using specific types of wiring for accessing particular communication/information services.

Room B of house 12 also contains a telephone 46 connected through a different PLCM 38 to a different wall outlet 36 than that used with television tuner 40. Lamp 48 illustrates the use of electrical devices in conjunction with communication devices. The selectable information signals modulated over the electrical wiring of house 12 have very high signal-to-noise ratios, as disclosed in Applicant's copending applications. There should be little or no interference between devices, as all selectable information signals are transmitted over separate frequencies.

Room C of FIG. 1 shows a computer 31 connected through still another PLCM 38 to another wall outlet 36. Although not shown, computer 31 may contain a separate modem which, in turn, is connected to the PLCM 38 shown. A PLCM 38 could also be specially designed to incorporate a modem for use with computers. An additional television set 42 is also shown in room C.

Computer 31 could be networked with other computers in house 12 (not shown), each computer connected to a separate PLCM 38 to network over the electrical wiring of house 12. In the present invention, LAN communications take place over the 120 KHz to 480 KHz frequency range, using a 6 coupler system in each PLCM 38 used for LAN communication, to achieve an effective bandwidth of 360 KHz. Each PLMC 38 used for networked computers would be tuned to transmit and receive over this frequency range.

Room D includes a facsimile machine 44 connected to another PLCM 38 plugged into another wall outlet 36. There is also shown in room D an additional television 42 and an additional telephone 46.connected at the same wall outlet 36.

Figure 2:
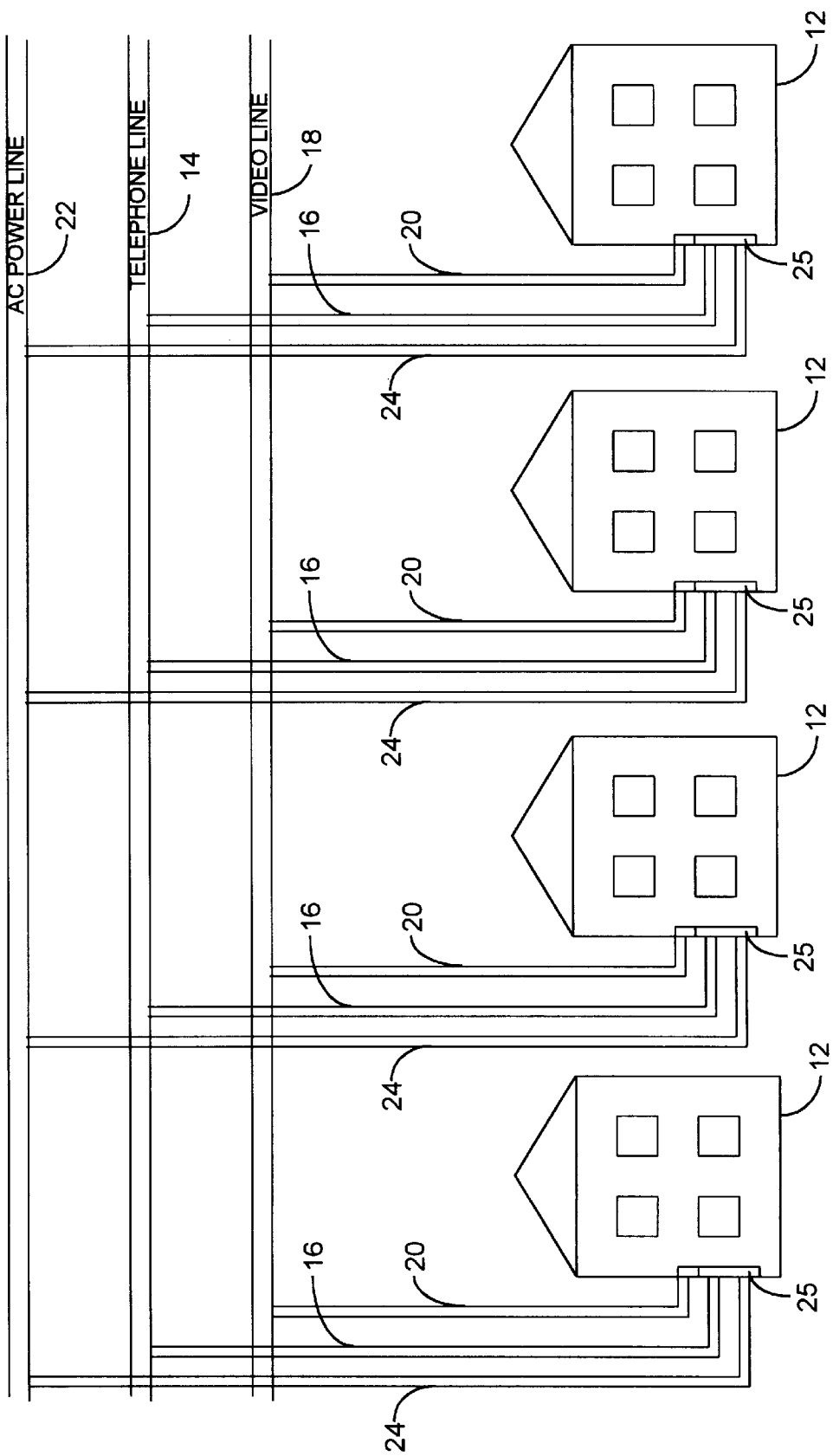
FIG. 2 shows several customer premises using a communication network in accordance with the present invention.

Several houses 12 are shown in FIG. 2, each connected to a video line 18, an AC power line 22 and a telephone line 14. Separate distribution panels 25 are used at each house 12. Because the present invention does not require rewiring of customer premises, existing circuit breaker/fuse boxes 26 (and/or telephone punch-down blocks) need only be connected to appropriate signal selectors 28 and/or 32 to provide interactive voice, video and data communication for customer premises.

Figure 3:
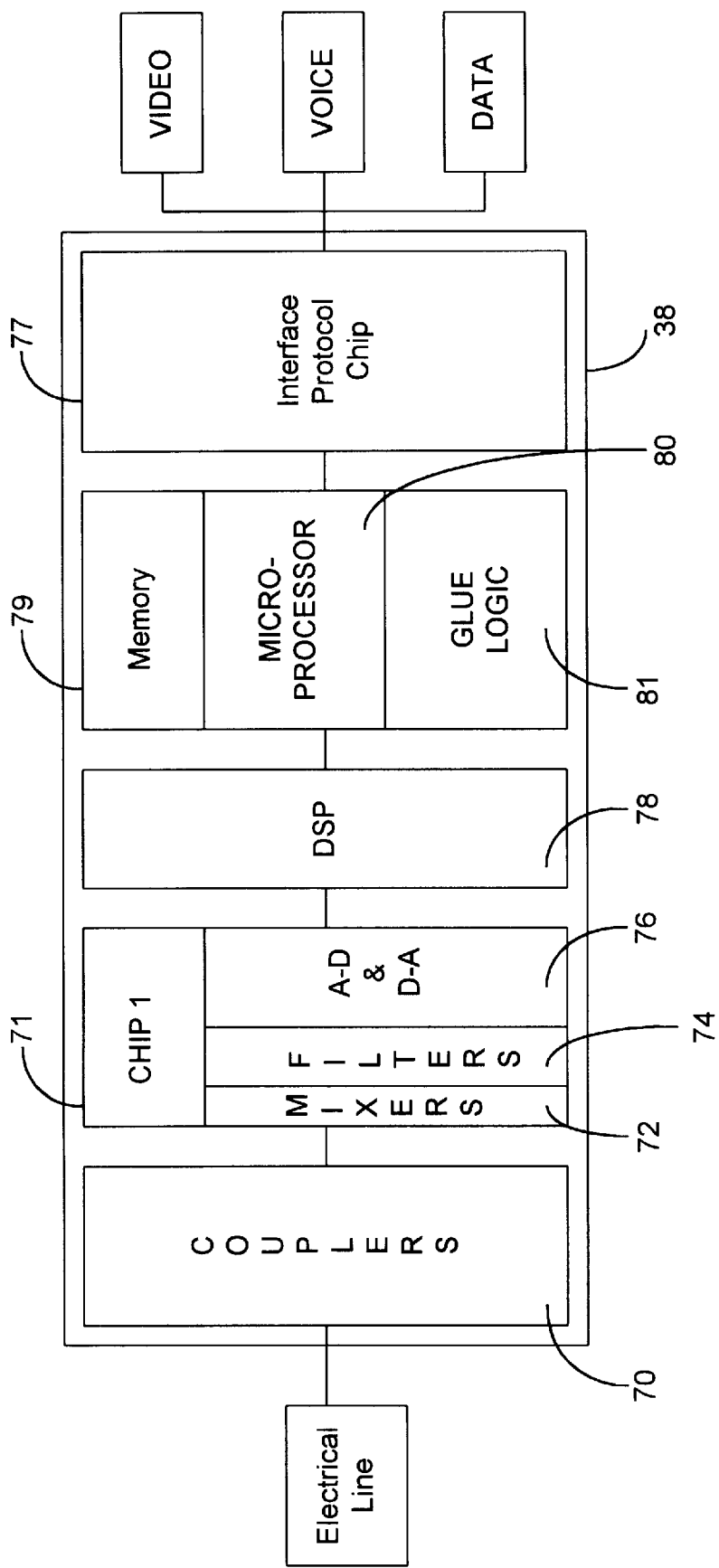
FIG. 3 shows a block diagram of an exemplary transceiver incorporating a dielectric core coupler used in accordance with the present invention.

There is shown in FIG. 3, a block diagram of an exemplary power line coupler modem 38 used for video, voice and/or data transmission. Video and data transmission are high speed transmissions. Video transmission requires a data flow rate of approximately 6 megabits per second (Mbps). Data transmission over a local area network (LAN) may achieve data-flow rates of 10 Mbps. As already set forth, it is possible to achieve data-flow of 6 Mbps for video signals, using a frequency bandwidth of 1.8 MHZ for each video channel.

PLCM 38 shown in FIG. 3 includes a coupler block 70. For high speed data communication, such as LAN communications, coupler block 70 is actually comprised of six dielectric-core couplers. Dielectric core couplers are disclosed in Applicant's co-pending patent applications. The dielectric-core couplers can be air-core couplers or may use another dielectric. The use of the multiple couplers within coupler block 70 allows the use of multiple modulated signals to provide the necessary data-flow rate for LAN and high speed data transmission. High speed data transmission is possible with the larger bandwidth (i.e., 360 KHz) provided by the six couplers. Each coupler provides a data-flow rate of approximately fifty Kbaud. Using 6 couplers provides a combined data-flow rate of approximately 300 Kbaud. Using a Quadrature Phase Shift Keying (QPSK) modulation format achieves increases the data transmission throughput to approximately 600 Kbps. Then, using a 16 Quadrature Amplitude Modulation (116 QAM) format, the 600 Kbps rate can be doubled to 1.2 Mbps throughput.

For LAN communication at data-flow rates higher than 1.2 Mbps (i.e., 10 Mbps), two or more of the video channels can be used with 16 QAM and/or 16 PSK modulation formats. Using two channels yields a bandwidth of 4 MHZ in the exemplary embodiment, when only approximately 3 MHZ of bandwidth is needed to achieve a throughput of 10 Mbps using 16 QAM/16 PSK modulation formats. This example illustrates another application for the high data-flow rate frequencies (2–30 MHZ) other than for video transmission.

Like the LAN application which uses the 120–480 KHz frequency range, the 10 Mbps LAN application is an inter-premises application. Computers on either LAN could, nevertheless, communicate with an information signal line outside the customer premises. One example of an outside communication for a LAN is inclusion in a Wide Area Network (WAN). Other inter-premises applications can involve intercoms (voice or video telephone) and building system monitoring. These applications can also be connected to outside information signal lines. One example is a video teleconference using several video telephones connected to an outside information signal line capable of handling video telephone information signals.

Mixer 72 mixes or divides out the sine and cosine components of the signal (I and Q components) for filtering and other signal processing. The sine and cosine components are mixed by mixer 72 if signal flow is going from the communication station to the AC wall outlet and separate the components if communication is going from the AC wall outlet to the communication station. Each of the split signals is simultaneously filtered through a separate low-pass filter 74. Low-pass filter 74 is tuned to filter out frequencies above 180 KHz for LAN/high speed data communication. Low-pass filter 74 has a cut-off frequency of 900 KHz for video transmissions.

Converter 76 converts analog signals to digital signals when receiving selectable information signals through coupler 70. For transmission in the opposite direction, converter 76 converts digital signals to analog signals. It will be understood by those skilled in the art that the present communication network can also be set up to operate in a fully digital manner. This would require each communication station to handle digital signal information.

In FIG. 3, mixers 72, filters 74 and converters 76 are contained in a single integrated circuit chip 71.

Digital signal processor 78 provides the digital filtering as well as the 16 PSIC and 16 QAM modulation/demodulation. Digital signal processor 78 is controlled by a separate microprocessor 80 which, in turn, has separate internal or external memory 79, such as an E-PROM or EE-PROM memory. Microprocessor 80 also uses additional "glue logic" 81 for operation. Microprocessor 80 and glue logic 81 may all be located on a single integrated circuit chip. Memory 79 may also be included on this single integrated circuit chip.

Interface protocol chip 77 contains the additional communication circuitry to allow connection to a desired communication station such as cable television tuner 40. Interface protocol chip 77 provides communication protocols to transmit information to and from communication stations, such as telephones and video receivers/transmitters. Example protocols include Ethernet, Toen Ring, ATM, SONET, RS-232 and others as are understood in this art.

Figure 4:
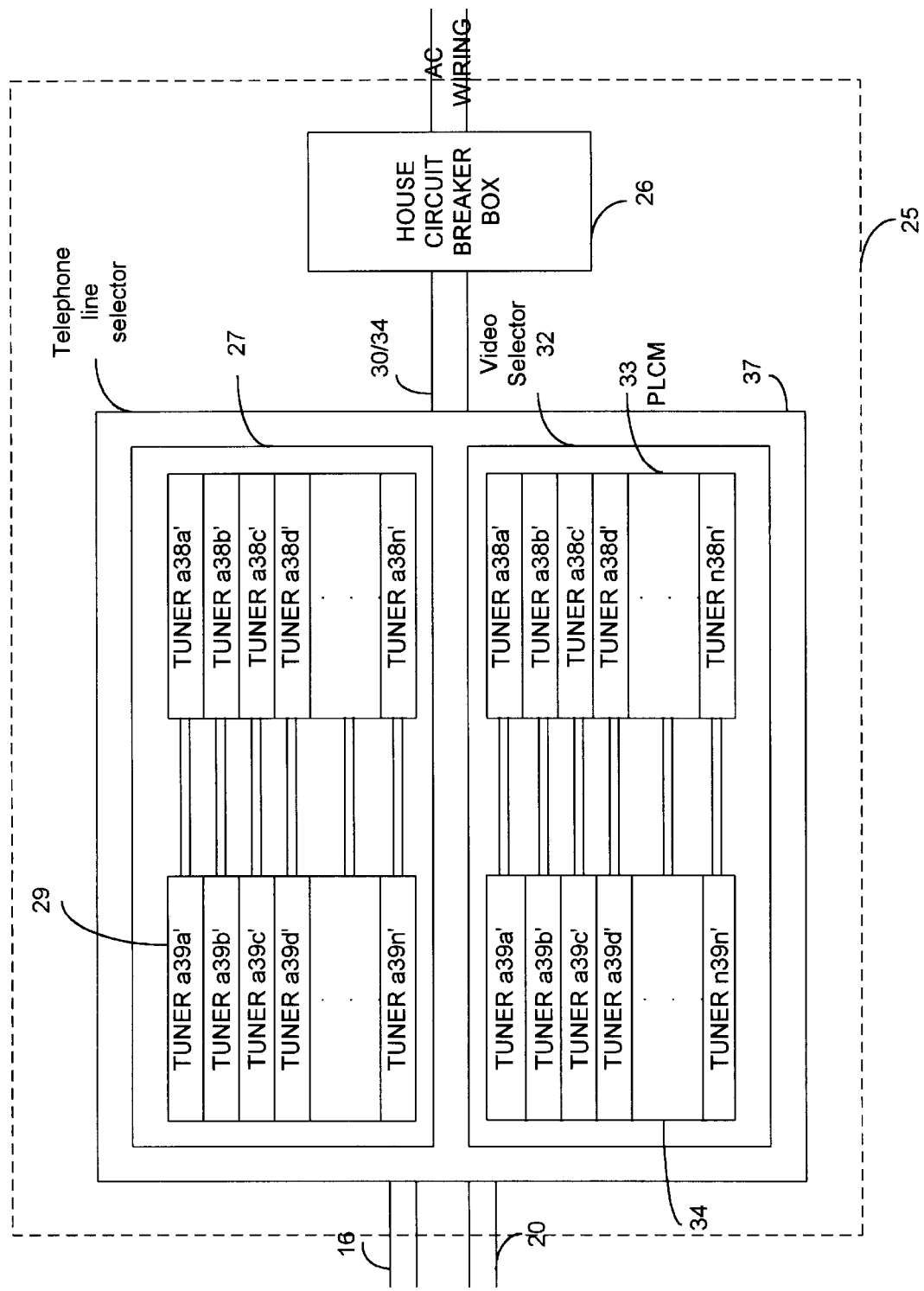
FIG. 4 shows a diagram of an exemplary distribution panel in accordance with the present invention.

There is shown in FIG. 4 an exemplary embodiment of a distribution panel 25. Distribution panel 25 includes a video signal selector 32 and a telephone signal selector 28 contained in a single case unit 37.

Video signal selector 32 contains a multi-PLCM unit 33 and a multi-tuner unit 34. Multi PLCM unit 33 contains a number of PLCM's 38a–38n, depending upon the number of accessible video channels being used. In the exemplary embodiments described above, 14 video channels can be accessed in a house 12. Accordingly, there can be up to 14 PLCMs' located in multi-PLCM unit 33. Each PLCM located in multi-PLCM unit 33 is equivalent to the PLCM 38 used with the communication stations in house 12. Each PLCM 38 used in house 12 for receiving video would operate on a frequency between 2 and 30 MHZ and halve a corresponding PLCM in multi-PLCM unit 33. In this way, there is a one to one relationship between a PLCM used in multi-PLCM unit 33 and a PLCM (such as PLCM 38) used in house 12. PLCM's 38a–38n can be in the form of "cards" fitted into slots (not shown) in multi-PLCM unit 33.

Each PLCM 38a–38n is connected to a corresponding tuner 39a–39n in multi-tuner unit 34. Each tuner 39a–39n is capable of tuning a selectable information signal, such as a video channel. Once a video channel is selected, the selectable signal information (the video information on the video channel) is transmitted through the corresponding PLCM in multi-PLCM unit 33, through the electrical wiring to the PLCM unit 38 in a room in house 12 and finally to the communication station (such as a cable television tuner) which requested the channel selection. Each tuner 39a–39n is controlled through the reverse control signal transmitted in the 0.2 MHZ frequency band associated with each 1.8 MHZ band for each video channel.

Telephone signal selector 28 is shown in a configuration similar to that of video signal selector 32. Telephone signal selector is comprised of a multi-PLCM unit 27 and multi-tuner unit 29. Multi-PLCM unit 27 is in turn comprised of PLCM'S 38a–38n. Each PLCM 38a–38n is connected to a corresponding tuner 39a–39n. As previously noted, for telephone service in a home, such as house 12, it may not be necessary to have a multi-tuner unit 29. Instead, all of the telephone lines would come into house 12, with each telephone line connected directly to a PLCM 38u'–38n'. All telephone lines would then be accessible from any electrical outlet without the need to send a requesting signal. To access a line would simply require using a PLCM 38 corresponding to the PLCM 38a–38n to which the telephone line is connected in telephone signal selector 28.

Telephone signal selector 28 and video signal selector 32 are shown connected to circuit breaker box 26 through connection line 30/34. Because telephone and video information is transmitted over different frequencies, it is possible to use a single connection line to circuit breaker box 26 as shown in FIG. 4. If separate signal selectors 28 and 32 are used, then separate connection lines 30 and 34 would be used as shown in FIG. 1.

Distribution panel 25 serves as network interface device between the information signal lines and electrical wiring on which the information signals are distributed.

Figure 5:
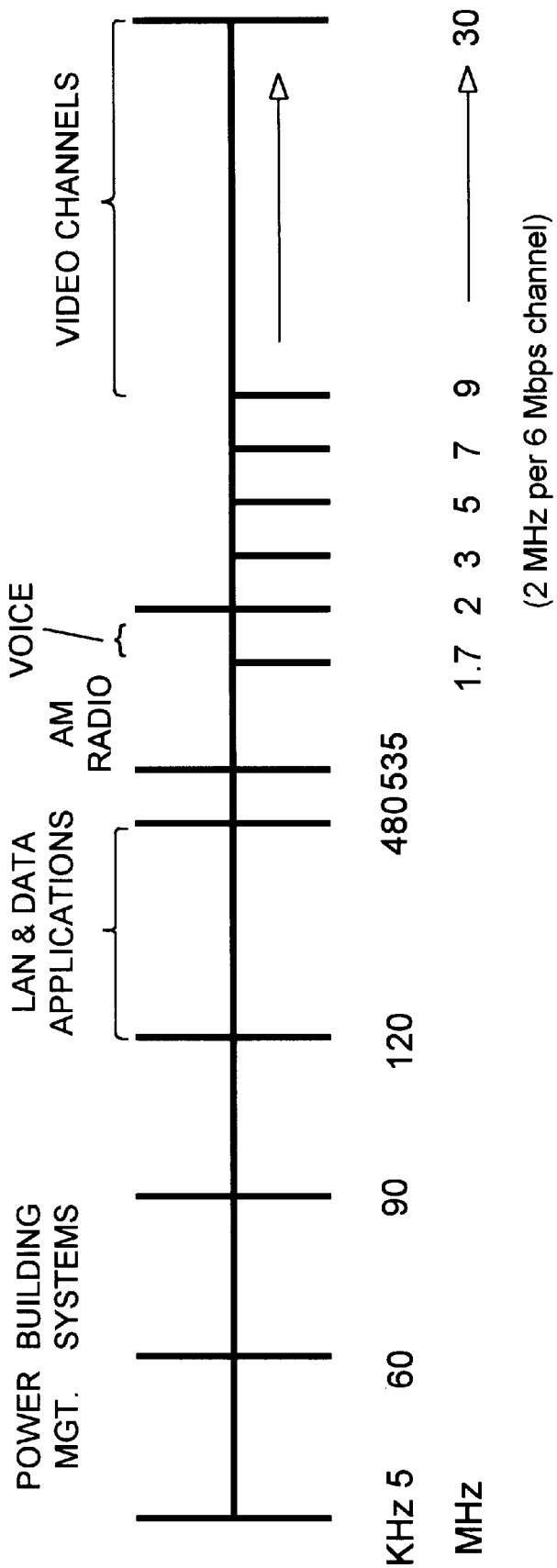
FIG. 5 shows a frequency spectrum used in accordance with the present invention.
Figure 6:
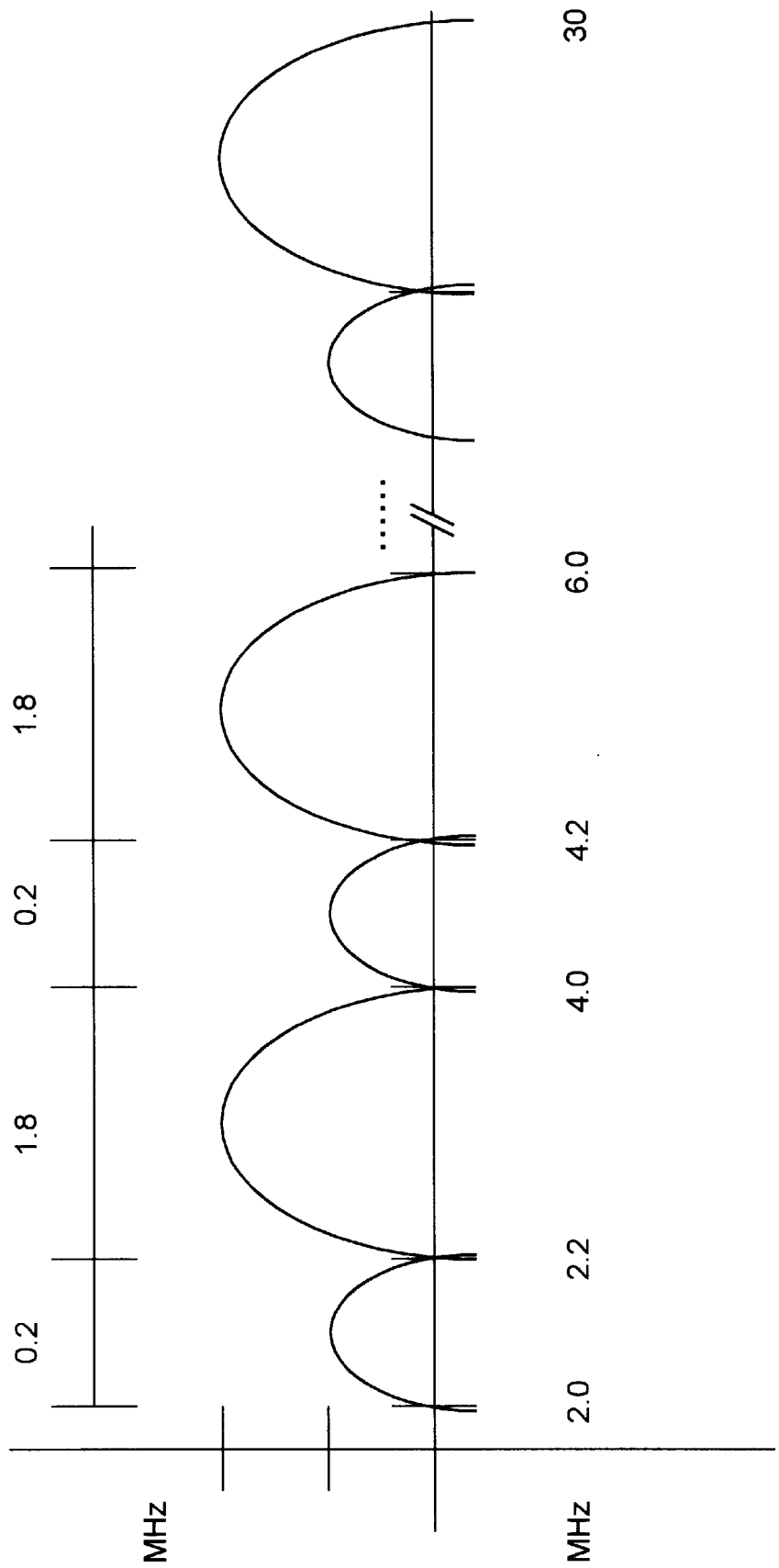
FIG. 6 illustrates the frequency characteristics of the present invention used for LAN communication.
Figure 7:
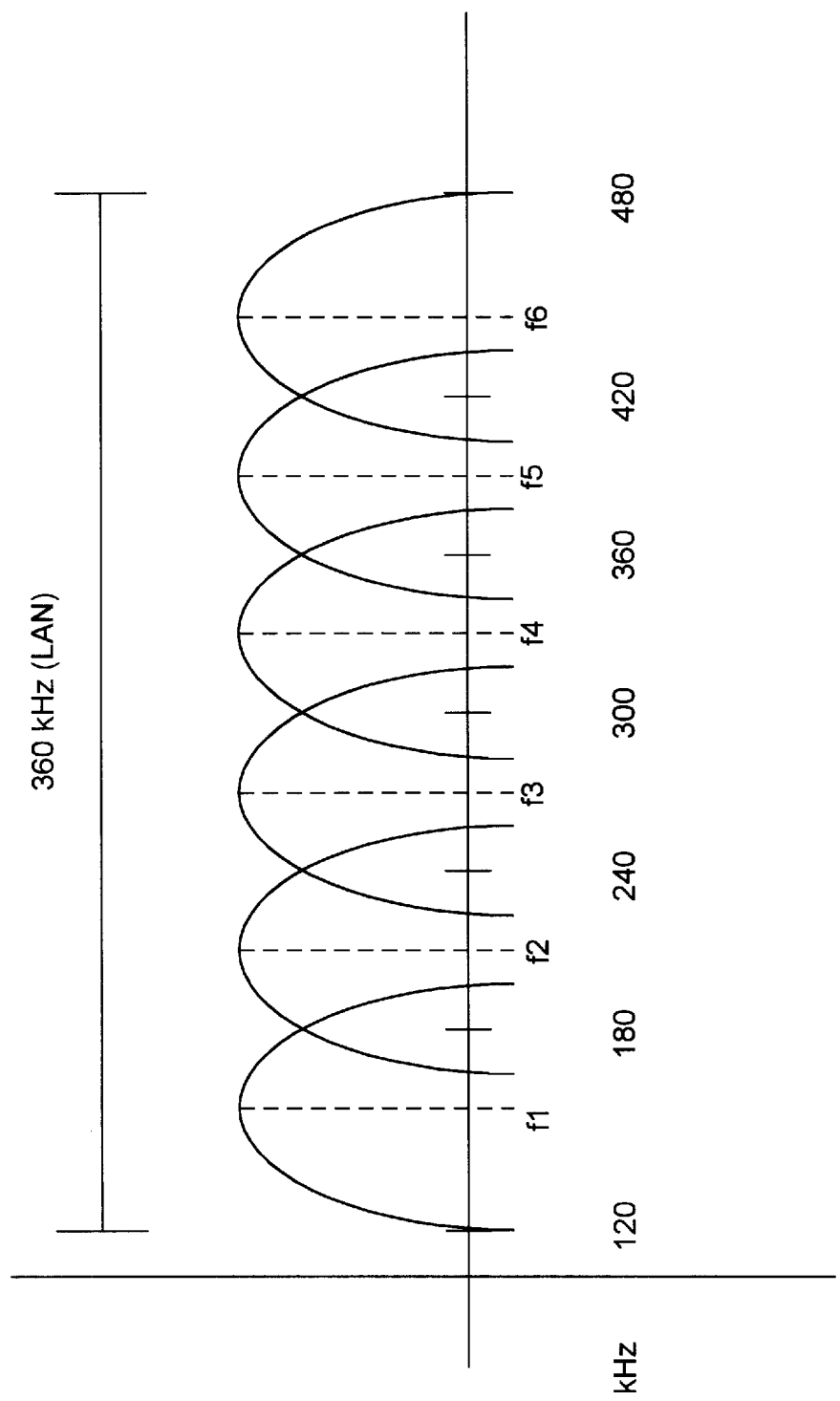
FIG. 7 shows the frequency characteristics of the present invention used for video communication.

There is shown in FIGS. 5, 6 and 7 illustrations of the frequency spectrum used in the present invention. LAN (high speed data) communications use the 120 KHz to 480 KHz frequency range, while video communications use the frequencies between 2 MHZ and 30 MHZ frequency range. Voice communication requires approximately 4 KHz of bandwidth. Therefore a sufficient number of telephone lines could be accessible between 1.7 MHZ and 2 MHZ. Building systems shown in FIG. 5 include HVAC, lighting, security and others which are controlled and/or monitored.

Video signals, as previously discussed, would have approximately 1.8 MHZ bandwidth. A 64–128 Kbps interactive reverse control signal is interspaced at 0.2 MHZ between each of the video signals (designated F1, F2 . . . F7) and is be used for selecting a video channel. This selection signal is transmitted to video signal selector 32 for switching to the appropriate video station. The selected video station is tuned and transmitted through the electrical wiring back to the particular video television tuner 40 which sent the selection signal. This is how a user in house 12 would select a television channel, for example.

Because of the spacing of each frequency between 2 MHZ and 30 MHZ, approximately 14 television stations could be tuned at any one time in a given house 12. For a multi-unit building such as an apartment building, each apartment has its own circuit breaker box and, thus, can have its own distribution panel. Each apartment, therefore, has its own 14 channel limit. Accordingly, any building or room having a separate wiring scheme (i.e., distribution panel) can be provided with a selection of 14 separate television sets which can be operated simultaneously.

It is also possible, if additional television sets are used, that the telephone wiring (if present) of a house 12 could be set up as a separate distribution panel from that used for the AC electrical wiring. This provides the typical house with a total of 28 possible televisions that can be operated at the same time.

An example interactive set-up for house 12 may include 4 television sets (for tuning and receiving signals only), 4 computers communicating over an outside line at high speed (thus each computer would be using one of the 14 "video" channels) and three video telephones (requiring two channels each—one channel for receiving and one channel for transmitting). A number of telephone lines may also be used, as there is enough room between the proposed range of 1.7 MHZ–2 MHZ for approximately 70 telephone lines (300 KHz divided by 4 KHz).

Figure 8:
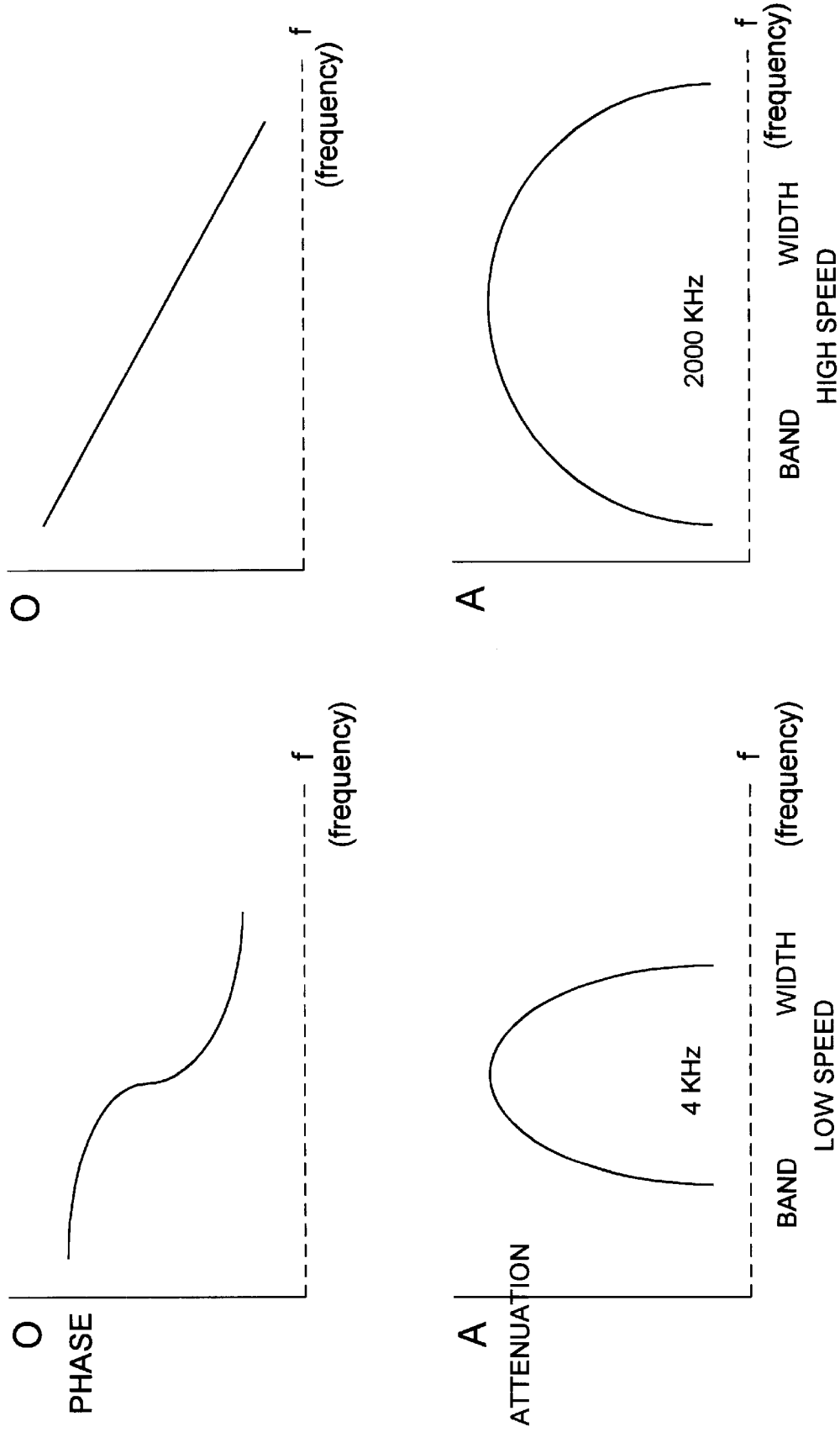
FIG. 8 shows phase and attenuation characteristics related to exemplary embodiments of the present invention.

There is shown in FIG. 8 illustrations of the phase and attenuation of low speed signal (voice) and high speed signals (video/high speed data).

Figure 9:
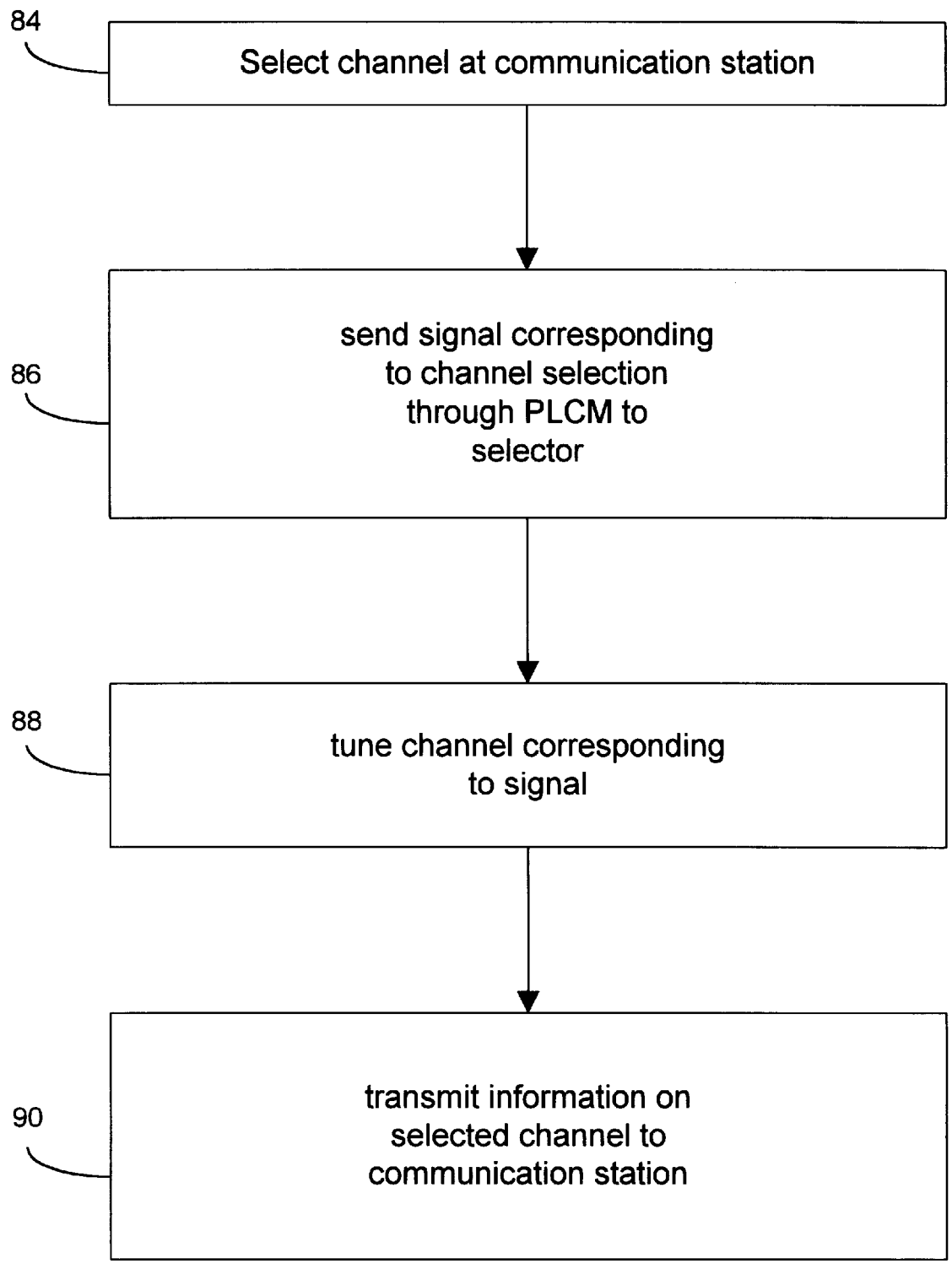
FIG. 9 is a flow chart of a method of selecting a channel for receipt by a communication device in accordance with the present invention.

There is shown in FIG. 9 a flowchart 82, showing steps for selecting selectable information signals (channel) in accordance with the present invention. In block 84, a desired channel is selected. This takes place at a communication station such as cable television tuner 40, for example, if the selection involves a cable television channel. This step applies equally to any selectable information signal to be selected.

In block 86, a control signal is transmitted through a PLCM 38, over the wiring to a signal selector, such as video signal selector 32. The particular signal selector tunes the appropriate channel corresponding to the requesting signal in block 88. The selectable information signals (i.e., cable television channel signal) is then transmitted back through the electrical wiring to the PLCM 38 and finally to the communication station which requested the selectable information signal.

While particular embodiments of the present invention are disclosed herein, it is not intended to limit the invention to such disclosure, and changes and modifications may be incorporated and embodied within the scope of the following claims:

What is claimed:

1. A communication network comprising:
   an information signal line carrying a plurality of selectable information signals;
   electrical line wired through a building;
   electrical outlets connected to said electrical line;
   an electrical line distribution panel connected to said information signal line and said electrical line for distributing said information signals over said electrical line to said electrical outlets in response to a selection signal;
   at least one dielectric core coupler impedance matched with said electrical line connected to said electrical outlets; and
   at least one communication station connected to said at least one dielectric core coupler for sending said selection signal and receiving said selectable information signals.

2. The communication network of claim 1 wherein said distribution panel is adapted to receive a selection signal from said at least one communication station to select one of said selectable information signals for transmission over said electrical line to said at least one communication station.

3. The communication network of claim 1 wherein said selectable information signals are distributed over said electrical line at a rate of substantially 6 Mbps.

4. The communication network of claim 1 wherein said information signal line is a coaxial cable.

5. The communication network of claim 1 wherein said information signal line is a fiber optic cable.

6. The communication network of claim 1 wherein said information signal line is a twisted pair telephone line.

7. The communication network of claim 1 wherein said electrical line is an AC electrical wire.

8. The communication network of claim 1 wherein said communication station is a cable television tuner.

9. The communication network of claim 1 wherein said communication station is a computer with an attached modem.

10. The communication network of claim 1 wherein said commmunication station is a telephone device.

11. The communication network of claim 1 wherein said distribution panel comprises a circuit breaker box or fuse box.

12. The communication network of claim 1 wherein said distribution panel comprises a transceiver adapted to distribute up to 14 separate selectable information signals throughout said building.

13. The communication network of claim 1 wherein said at least one dielectric core coupler is an air core coupler.

14. A method of receiving, over an electrical line, selectable information signals carried on an information signal line comprising the steps of:
   sending a selection signal corresponding to one of said selectable information signals through a dielectric core coupler impedance matched with said electrical line;
   receiving said selection signal at a distribution panel connected to said information signal line;
   interpreting said selection signal and sending said selectable information signal corresponding to said selection signal over said electrical line and through said dielectric core coupler to a receiving station.

* * * * *